(12) United States Patent
Garwood

(10) Patent No.: US 9,131,707 B2
(45) Date of Patent: Sep. 15, 2015

(54) DECONTAMINATION METHODS FOR MEAT USING CARBONIC ACID AT HIGH PRESSURES

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 0 days.

(21) Appl. No.: 12/968,045

(22) Filed: Dec. 14, 2010

(65) Prior Publication Data
US 2011/0171353 A1 Jul. 14, 2011

Related U.S. Application Data

(63) Continuation of application No. 12/207,300, filed on Sep. 9, 2008, now abandoned, which is a continuation of application No. 11/004,669, filed on Dec. 2, 2004, now abandoned, which is a continuation-in-part of application No. PCT/US03/17643, filed on Jun. 3, 2003.

(60) Provisional application No. 60/438,546, filed on Jan. 7, 2003, provisional application No. 60/433,526, filed on Dec. 13, 2002, provisional application No. 60/469,644, filed on Nov. 25, 2002, provisional application No. 60/427,516, filed on Nov. 19, 2002, provisional application No. 60/424,388, filed on Nov. 5, 2002, provisional application No. 60/422,949, filed on Oct. 30, 2002, provisional application No. 60/411,138, filed on Sep. 16, 2002, provisional application No. 60/391,702, filed on Jun. 24, 2002, provisional application No. 60/388,067, filed on Jun. 10, 2002, provisional application No. 60/385,710, filed on Jun. 3, 2002.

(51) Int. Cl.
| | | |
|---|---|---|
| A23P 1/00 | (2006.01) |
| A23B 4/16 | (2006.01) |
| A23B 4/20 | (2006.01) |
| A23B 4/24 | (2006.01) |
| A23B 4/26 | (2006.01) |
| A23L 1/015 | (2006.01) |
| A23L 1/31 | (2006.01) |
| A23L 3/015 | (2006.01) |

(52) U.S. Cl.
CPC ... *A23B 4/16* (2013.01); *A23B 4/20* (2013.01); *A23B 4/24* (2013.01); *A23B 4/26* (2013.01); *A23L 1/015* (2013.01); *A23L 1/31* (2013.01); *A23L 3/0155* (2013.01); *A23V 2002/00* (2013.01)

(58) Field of Classification Search
CPC .......... C11B 7/005; C11B 1/10; C11B 1/104; C11B 13/00
USPC ......... 426/315, 320, 321, 335, 532, 652, 417, 426/437, 442; 452/134
See application file for complete search history.

(56) References Cited

U.S. PATENT DOCUMENTS

| | | | | |
|---|---|---|---|---|
| 3,705,813 | A | * | 12/1972 | Vogel et al. ................. 426/2 |
| 3,773,175 | A | * | 11/1973 | Wallace ..................... 209/173 |
| 3,773,715 | A | * | 11/1973 | Wallace ..................... 524/141 |
| 3,780,191 | A | * | 12/1973 | Langer ...................... 426/231 |
| 4,171,164 | A | | 10/1979 | Groves |
| 5,147,672 | A | | 9/1992 | McLachlan |
| 5,290,959 | A | | 3/1994 | Rice |
| 5,393,547 | A | | 2/1995 | Balaban |
| 5,435,443 | A | | 7/1995 | Hohenester |
| 5,458,901 | A | | 10/1995 | Engler |
| 5,552,173 | A | | 9/1996 | Singh |
| 6,036,630 | A | | 3/2000 | Robey |
| 6,224,930 | B1 | | 5/2001 | Inglis |
| 6,265,006 | B1 | | 7/2001 | Inglis |
| 8,137,722 | B2 | | 3/2012 | Garwood |
| 2001/0007690 | A1 | | 7/2001 | Girsh |

(Continued)

FOREIGN PATENT DOCUMENTS

| | | |
|---|---|---|
| DE | 2628858 A1 | 12/1977 |
| EP | 0356165 A1 | 2/1990 |

(Continued)

OTHER PUBLICATIONS

Marsden, J.L., Phebus, R.K., Kastner, C.L. 1999. "Steam Pasteurization of Beef Trimmings Destined for Ground Beef." Downloaded from beefresearch.org Jun. 26, 2012.*

(Continued)

*Primary Examiner* — Nikki H Dees
(74) *Attorney, Agent, or Firm* — Christensen O'Connor Johnson Kindness PLLC

(57) ABSTRACT

A method for separating lean meat from lean meat-containing material includes combining a particulate material with fluid, subcritical carbon dioxide at a pH of about 7 or less and a pressure of about 600 psig. The material and fluid is introduced into the vessel and is separated into low density and high density fractions. The material from the low density fraction is removed via an outlet and has a higher percentage of fat than the material introduced into the vessel. The material from the high density fraction is removed via an outlet and has a higher percentage of lean meat than the material introduced into the vessel. The vessel can include a centrifuge or a vessel disposed toward the vertical having an upper and lower outlet, wherein the separation is achieved by the respective densities of the material, and the natural or an artificial gravity field.

11 Claims, 30 Drawing Sheets

(56) References Cited

U.S. PATENT DOCUMENTS

2002/0134317 A1    9/2002    Shane
2005/0042346 A1    2/2005    Garwood

FOREIGN PATENT DOCUMENTS

JP        58212740 A    12/1983
WO      03101210 A1    12/2003

OTHER PUBLICATIONS

Carbon Dioxide and Carbonic Acid. Date Unknown. Downloaded Aug. 8, 2013, from http://ion.chem.usu.edu/~sbialkow/Classes/3650/Carbonate/Carbonic%20Acid.html.*

Spilimbergo, S., and A. Bertucco, "Non-Thermal Bacterial Inactivation With Dense CO2," Biotechnology and Bioengineering 84(6):627-638, 2003.

Garwood, A.J.M., "Method for Separating Bone Fragments and Tallow From a Single Ingredient Stream of Beef by Controlling the Frozen Condition of the Beef and Immersing in Carbonic Acid at Elevated Pressures," U.S. Appl. No. 13/024,178, filed Feb. 9, 2011.

Garwood, A.J.M., "Methods for Separating Tallow From a Single Ingredient Stream of Boneless Beef Using Liquid Carbon Dioxide and Carbonic Acid," U.S. Appl. No. 12/697,592, filed Feb. 1, 2010.

Garwood, A.J.M., "Ultraviolet C Pathogen Deactivation Device and Method," U.S. Appl. No. 13/324,744, filed Dec. 13, 2011.

Garwood, A.J.M., and N. J. Garwood, "Harvesting Oil From Fatty Meat Materials to Produce Lean Meat Products and Oil for Use in Bio-Diesel Production," U.S. Appl. No. 12/520,802, filed Jan. 12, 2010.

Office Action (CA) mailed Jan. 23, 2013, issued in corresponding Canadian Application No. 2,589,649, filed Dec. 2, 2005, 3 pages.

\* cited by examiner

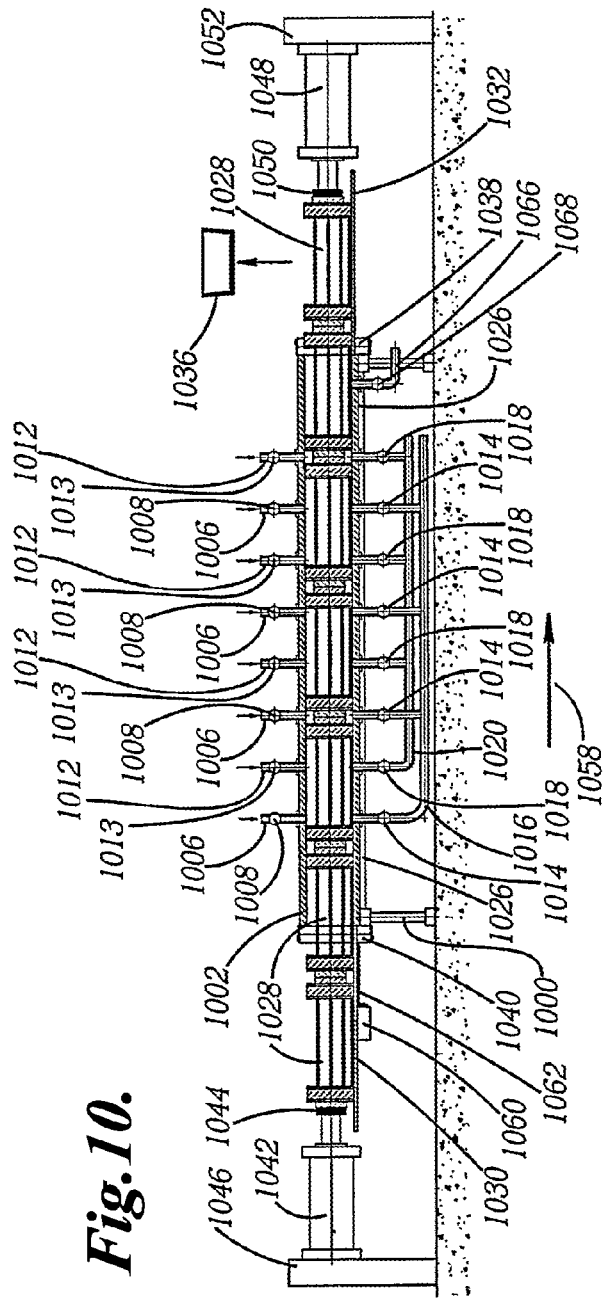
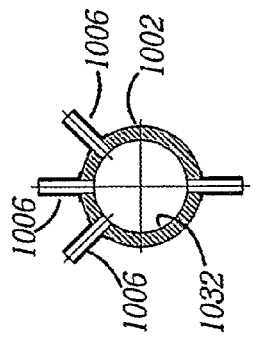
Fig.10.
Fig.11.

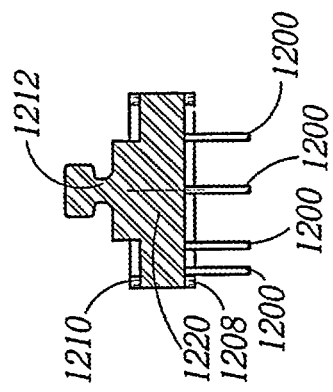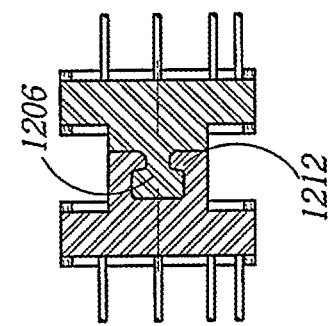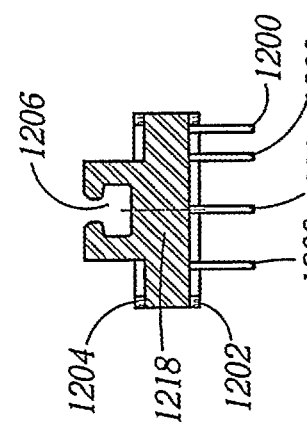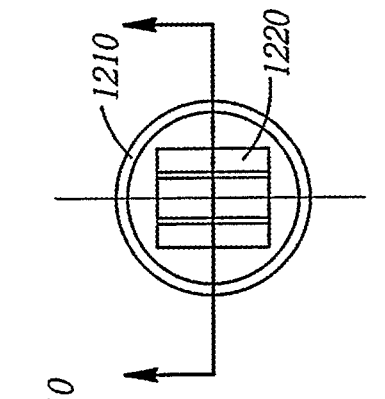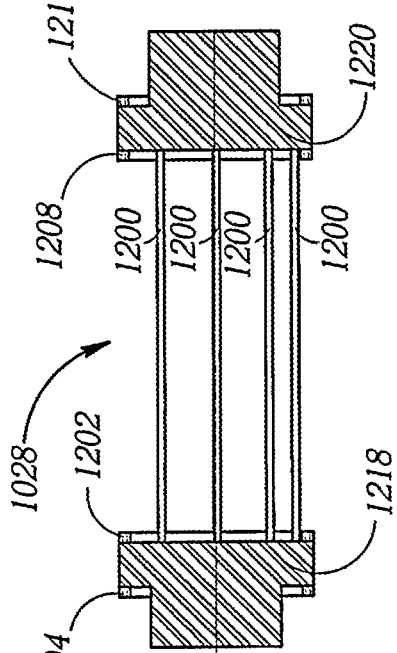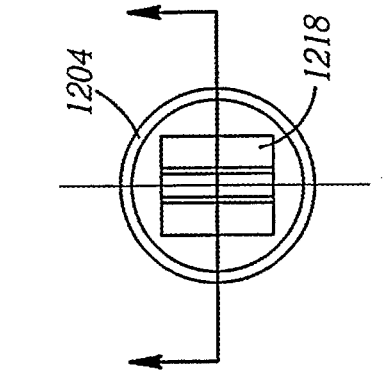

DECONTAMINATION METHODS FOR MEAT USING CARBONIC ACID AT HIGH PRESSURES

CROSS-REFERENCES TO RELATED APPLICATIONS

This application is a continuation of application Ser. No. 12/207,300, filed Sep. 9, 2008, which is a continuation of application Ser. No. 11/004,669, filed Dec. 2, 2004, which is a continuation-in-part of PCT/US03/17643, filed Jun. 3, 2003, which claims the benefit of U.S. Provisional Application Nos. 60/438,546, filed Jan. 7, 2003; 60/433,526, filed Dec. 13, 2002; 60/429,644, filed Nov. 25, 2002; 60/427,516, filed Nov. 19, 2002; 60/424,388, filed Nov. 5, 2002; 60/422,949, filed Oct. 30, 2002; 60/411,138, filed Sep. 16, 2002; 60/391,702, filed Jun. 24, 2002; 60/388,067, filed Jun. 10, 2002; 60/385,710, filed Jun. 3, 2002. All of the above applications are herein expressly incorporated by reference.

FIELD OF THE INVENTION

The present invention relates to the decontamination of any goods, solid or liquid, including meat, with the use of carbon dioxide at high pressure.

BACKGROUND

At a time when there is increasing consumer demand for natural, and if possible organic, foods, and an increasing regulatory requirement for the reduction or elimination of artificial chemicals and preservatives; it is alarming to note that many proposed methods for decontaminating meat rely on the addition of chemicals not normally found in such foods.

One such food is a beef product known as Lean Fine Textured Beef (hereinafter "LFTB"). LFTB can be harvested from discarded "fat" cut from carcasses. During the process of boning a carcass, the external fat layer can be removed. During the process, a significant amount of lean meat can be cut from the carcass and discarded with the fat. To recover the lean meat, the discarded fat can be heated to about 109° F. The heated fat can be processed in a centrifuge that separates the fat from the lean meat. The lean meat is then frozen and chipped into small flakes. The finished product, known as LFTB, is then stored in a frozen condition and can later be added to ground beef, for example. The temperature of the LFTB during the separation process does not exceed the temperature that a carcass would normally experience post mortem. As a result, pathogens and bacteria that are present on the surfaces of the carcass prior to boning can result in bacteria being present in the LFTB.

A need exists to more effectively kill, reduce or remove the microbial population on any processed meat, or any other good, liquid or solid, to eliminate sources of cross contamination and recontamination, while simultaneously allaying the concerns of using artificial chemicals. A need also exists to more effectively separate fat from lean meat.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method for separating lean meat from lean meat-containing material includes combining a particulate material having lean meat and fat with fluid, subcritical carbon dioxide at a pH of about 7 or less. The material and fluid is introduced into a vessel. The material is separated into low density and high density fractions within sections of the vessel. The material from the low density fraction is removed via a first outlet, and the material removed via the first outlet has a higher percentage of fat than the material introduced into the vessel. The material from the high density fraction is removed via a second outlet, and the material removed via the second outlet has a higher percentage of lean meat than the material introduced into the vessel. The vessel can include a centrifuge or a vessel disposed toward the vertical having an upper and lower outlet, wherein the separation is achieved by the force of the natural or an artificially created gravity field, such as in a centrifuge, acting on the material, and the fractions are formed based on the respective densities of the material. The separation may be carried out at elevated pressures, such as at a maximum of about 600 psig, or about 500 psig.

The density of the fluid can be controlled, and can either be increased or decreased to control the separation. The particle size of the material affects the efficiency of separation, since the smaller the particles, the more likely that the particle will be either mostly lean meat or mostly fat. For example, larger particles may have just enough of a majority of either lean meat or fat to separate in one direction or the other. As the particles are reduced in size, each individual particle will have a greater majority of either lean meat or fat, and will tend to separate quicker. At the very extreme, when particles are reduced to the molecular level, each particle will be either all lean or all fat.

In one embodiment, the fat content of the processed ground beef is determined by particle size, for example, by reducing the particle size, separation will be more thorough, and the lean meat will be lower in fat content. Therefore, the fat content of the lean meat product can be determined by controlling the particle size. The larger the particle, the more fat will be retained in the lean meat stream, and the smaller the particle, the less fat will be retained in the lean meat stream. The density of the fluid can also be manipulated to affect the separation efficiency.

In one embodiment, the fat content of quantities of meat derived from both cow and steer is removed leaving lean meat, and the fat that was removed is replaced by fat derived from steer to control the amount of fat content in lean meat product.

One embodiment of the present invention is directed to a method and apparatus for decontaminating goods, such as meat, by using a "shock" method (hereinafter AST) involving immersion of meat in a high pH alkaline solution followed by immersion in a low pH acid, such as carbon dioxide and water at higher than atmospheric pressures. Alternatively, the method can incorporate irradiation of meat.

In one embodiment, a decontamination method for goods, such as meat, is disclosed that exposes the goods to a low pH followed by exposure to irradiation, such as x-ray, gamma, or e-beam.

In one embodiment of the invention, the high pH solution can include calcium and hydroxide ions.

In one embodiment of the invention, high pH alkali such as calcium hydroxide solution is sprayed onto meat portions in a manner so as to ensure a substantially complete covering of the outer surfaces of the meat. The pH at the surface of the meat is elevated to a pH of about 12 to about 14. The bacteria are subjected to the high pH and are either killed by the high pH or become acclimatized to it. After the meat has been exposed to high pH conditions for an effective period of time, the meat can then be immersed in a low pH acid, such as can be provided with blending carbon dioxide and water at a suitable temperature and pressure. High pressure causes the formation of carbonic acid. The probability of killing bacteria is almost certain since the rapid change of pH from about 12 to about 3 shocks the bacteria, and they are unable to acclimatize to the rapid pH change. Such microorganisms killed may be *E. coli* 0157:H7, *Salmonella, Listeria monocytogenes*, and other pathogens.

In another embodiment, an alkali metal chlorite is added, either as a solid or in solution, to the meat that is to be decontaminated, prior to exposure of the meat to an acid, such as carbonic acid, that is generated by dissolving carbon dioxide in water at a suitable high pressure to cause a lowering of the pH. The benefit of applying an alkali metal chlorite prior to addition of the acid and not with the acid is that the alkali metal chlorite is not wasted prior to the time when it is needed. Applying a solution of a chlorite together with an acid will result in a waste of sodium chloride. Representative alkali metals include potassium and sodium.

The microbiocidal effect is noticeable at acidic pH values below about 7.0 and more pronounced below about 4.0. The microbiocidal effect is maximized when the pH of the alkaline solution is about 12 to about 14 and is followed by immersion in a solution of dissolved carbon dioxide in water such that the pH of carbonic acid is less than 7, or about 2 to about 3.

In another embodiment, the surface of the meat can be kept substantially at about 28° F. to about 40° F. to avoid freezing. Chilling of the meat can be accomplished by using the carbon dioxide in a form that provides substantial latent heat of evaporation such as a dense gas, liquid or solid.

Exposure of meat to oxygen can produce undesirable brown color in meat due to oxidation. It is therefore desirable to substantially prevent oxygen from contacting goods, such as meat. Eliminating the presence of oxygen as much as possible during processing, handling, storage, and packaging can produce meat having an extended storage or shelf life.

In another aspect of the present invention, a process to reduce bacteria, including *E. coli* 0157:H7 and other bacteria and pathogens, to a level within desirable limits, while also simultaneously controlling the water content in meat and adjusting the fat content in meat, is provided. Furthermore, beef trim that has been removed from beef cuts and carcasses during the normal process of disassembly and is either presently disposed of by rendering, or alternatively processed by Beef Producers of Iowa (hereinafter "BPI") to produce a product known as lean finely textured beef (hereinafter "LFTB"), can be processed according to the invention.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

The foregoing aspects and many of the attendant advantages of this invention will become more readily appreciated as the same become better understood by reference to the following detailed description, when taken in conjunction with the accompanying drawings, wherein:

FIG. 10 shows a schematic illustration of an apparatus according to the present invention;

FIG. 11 shows a schematic cross-sectional illustration of an apparatus portion according to the present invention;

FIG. 17 shows a schematic illustration of a cage according to the present invention;

FIG. 18 shows a cross-sectional illustration of the cage of FIG. 17;

FIG. 19 shows a cross-sectional illustration of the cage of FIG. 17;

FIG. 20 shows a cross-sectional illustration of the cage of FIG. 17;

FIG. 21 shows a cross-sectional illustration of the cage of FIG. 17;

FIG. 22 shows a cross-sectional illustration of mated cages of FIG. 17;

DETAILED DESCRIPTION

Figure 1:
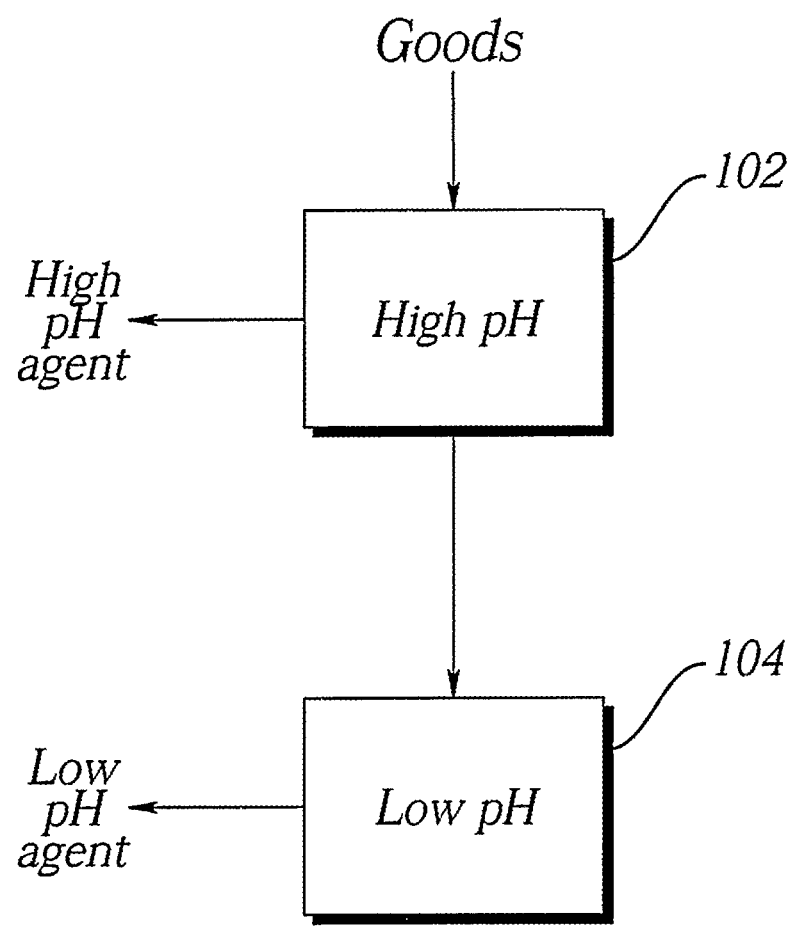
FIG. 1 shows a block diagram of a process according to the present invention.

The decontamination, pasteurization, and processing apparatus and methods described below can be for goods, such as meat, boneless or otherwise, with the optional use of any additional substance(s), liquid(s) and/or gas(es), which use carbon dioxide and water in any selected, relative, and/or measured quantities and at any suitable pressure, combined together in an effective manner so as to produce carbonic acid. Additionally, the water (moisture) content of the goods, such as beef or poultry meats, can be measured and controlled according to the methods disclosed.

One aspect of the invention provides water content standards for meat. The water content standards can be used to approximate the naturally occurring level of moisture in any meat. The composition of fresh boneless meat, harvested from an animal, can be reduced to substantially two components, lean meat, and fat. Both lean meat and fat can contain a large percentage of water. A more extensive analysis of meat, harvested from any animal used as food intended for human consumption, can include elements such as hydrogen, oxygen, carbon, and metals such as iron, calcium, sodium and potassium. Elements that comprise the meat harvested from the animal can be measured and stored in a computerized system and database that can be accessed for the beneficial evaluation of the data and also to establish water content standards for meat composition to enable the definition of limitations of any particular element or compound that can cause harm to any human that may consume the meat. For example, limits of the metal mercury are already established. Water can represent the largest single component by weight of the meat or fat. Water can evaporate readily when exposed to air, and particularly when exposed to refrigerated air. Water loss in refrigerated air may be as much as about 1% to about 2% for every 24-hour period when the fresh meat is exposed to the refrigerated air. Water loss can occur throughout the duration of meat processing. Water loss can represent a significant loss, and thus reduce profits. Accordingly, it is desirable to avoid and/or control the water content in meats. The present invention can provide methods for the control of the water content in meats.

The present invention provides a method that includes measuring the water content of fresh meats harvested from animals. The data derived from the measurements can be transferred to a computerized database for use in developing a set of water content standards (standards) that can provide the water composition for any meat from any group of animals that are related by one or more characteristics. The standards can then be used as a reference to control the water content at any given level of meat harvested from an animal belonging to the corresponding group or category, even when the water content of the meat is not directly measured. The standards are derived from data previously obtained from different animals constituting the same group of animals as the animal from which the meat was harvested.

In order to enable the continued improvement and accuracy of the standards, the data can be integrated and/or transferred between several databases that are used in the meat production industries. In particular, a corporation known as Global Animal Management, Inc., (hereinafter "GAM") has developed a system enabling the collection and storage of data associated with, for example, genetics, ancestry, birth, lifespan, food consumption, food conversion efficiencies, medications, and growth characteristics. The GAM system can evaluate the performance of medications and any variations in performance. Solutions can be found and problems resolved that otherwise may never have been identified. The GAM database can be directly interfaced or integrated with the standards database according to the invention, to enable the evaluation of other factors that will enable resolution of problems. Another company called Systems Integration Trading, Limited, (hereinafter "SITL") provides equipment and methods that can be incorporated with the present standards database of the invention. Additionally, a corporation based in Germany and known as E+V Technology GmbH, (hereinafter "EVT") has developed a carcass grading and classification system. The EVT system uses data acquired from a single digital image to determine the size, weight, conformation and other qualities of an animal carcass. The accuracy and speed of the EVT system is vastly more accurate and efficient than the corresponding accuracy and productivity of data and measurements acquired manually with human labor. Data and measurements are accumulated in the database over a period of time, and wide variations in carcass data enable rapid classification of every carcass. This is achieved by comparing the data acquired from the digital image of the carcass with the historical data which establishes the "best fit" and then classifies the carcass to be used in the most efficient manner.

The systems noted above can be combined and/or integrated for the sharing and processing of data.

According to the invention, water content data is categorized and/or associated with data detailing any notable characteristics of the animals. All animals in any one grouping have at least one characteristic that is shared between all animals. For example, animals may be categorized according to an age range, weight, sex, genetic composition and birthplace and the measured water content data is compiled in a computer database. Any number of categories can be established and the water content measurement data of meat samples extracted from animals from the same grouping can be collated so that it can be compared, combined and/or used with other data acquired from other databases, such as the GAM and EVT databases.

Measurement data acquired from animals can be transferred and stored in the standards database so as to create a suitably extensive database data that is representative of each category of animal, enabling the determination of the naturally occurring water content in meat that can then be used for the accurate control of water content in meat.

The database created according to the invention can include animal composition data detailing the elements and/or compounds constituting any meat derived from the animal. The water content of fat as distinct and separate from lean meat or muscle can also be analyzed and the associated data for selected animals recorded in the database accordingly. Data detailing the analysis of the composition of lean meat or muscle for all animals in all categories can also be recorded and such information used in any manner, such as to control the water content.

RFID devices can be injected into an animal, or attached to a tag to an animal extremity to identify an individual animal. Another system utilizes an animal's eye retina to enable accurate identification of an animal. Data associated with each animal can then be recorded in a database.

In one embodiment of the present invention, an animal is grouped into a category before slaughter, or immediately thereafter, and assigned a water content standard representing the natural water proportion of the meat or the fat. The animal can be processed according to any method and at all times, any products derived from the animal can be tracked to the animal, and the water content throughout processing can be measured and adjusted to within any percentage. For example, in one embodiment, the meat flow rate is measured along with any water added to the meat, and the water content of the meat is also measured. Typically, the meat may have lost some water through evaporation or otherwise. The added water may exceed the difference between the natural proportion of water (as determined by the water content standard) and the measured water content of the meat. Thus, to reduce the water content of meat to its natural proportion, water can be removed. The removed water is measured and metered to leave behind that amount that will not cause the meat to have any water in excess of the allowable. Thus, after processing, the meat contains its natural proportion of water or any other desired amount. The meat may be further measured after processing to ensure the water content is within the desired amount. Alternatively, in other embodiments, rather than achieving the natural proportion of water in meat, the amount of water can be any amount allowed that can also exceed the natural proportion. The meat can be packaged in a low oxygen environment wherein the oxygen level is lower than air, and the package can be provided with a label indicating the amount of added water or the amount of water that is in the meat.

Referring now to FIG. 1, one embodiment of a method according to the invention is schematically illustrated. The method includes treating the goods with any suitable high pH agent that can be a gas or liquid, such as sodium hydroxide solution, potassium hydroxide solution, ammonium hydroxide solution, or calcium hydroxide solution and that produces a high pH, as depicted in block 102. The method is then followed by a secondary step depicted by block 104, including exposure to a low pH agent that can be a gas or liquid, such as a carbonic acid solution of carbon dioxide and water in any selected, or relative quantities and at any suitable pressure, and combined together in an effective manner so as to produce carbonic acid of a suitably low pH.

The processes disclosed herein may be applied to any meat. The processes can also be applied to paper pulp for bleaching purposes and/or for killing any type of molds that may otherwise survive the normal process of paper production or the production of timber building products manufactured from wood chips. Any goods may be processed with the apparatus and methods disclosed herein. Representative examples of liquid and solid goods that can be processed and/or decontaminated by the apparatus and methods disclosed herein are listed below. Some solids may also be regarded and processed in a manner that is suitable for liquids (such as ground meats) and some liquids may be regarded and processed in a manner that is also suitable for solids. Representative goods are listed below under the headings of 1) "Substantially Liquids;" and 2) Substantially Solids":

1) "Substantially Liquids" includes: meats; sausage; seeds and grains; animal feeds; slurries; paper pulp used in production of paper products (slurries); water for drinking; water (e.g., contaminated water); sewage.

2) "Substantially Solids" include: salami, meats; hams; frankfurters; poultry (whole, dressed and poultry pieces); vegetables and fruits [hard and soft] (e.g., lettuce, cauliflower, tomatoes, apples, melon, pears, oranges, broccoli); fish (whole sea fish and freshwater, gutted or otherwise); beef primal portions (e.g., strip loins, round, rump, tenderloin); timber or wood chip raw materials used in building materials; waste food products (e.g., waste from hotels, restaurants for recycling into animal feeds).

The term GRAS refers to "Generally Regarded As Safe" and is understood and used by the USDA, FDA, and those in industry to describe substances that can be used with goods as additives. Representative examples of GRAS substances are: sodium hydroxide, sodium chloride, sodium chlorite, potassium chloride, and potassium chlorite. These substances can be added in any form, before, during, and after treatment with carbon dioxide and water according to the invention.

The term "alkaline solution" includes a solution of an alkali substance, such as ammonium hydroxide, sodium hydroxide, potassium hydroxide, calcium hydroxide, tri-sodium phosphate, and any other suitable alkali. These substances can be added in any form, before, during, or after treatment with carbon dioxide.

The term "gas pressure" or "water pressure" refers to any pressure that is suitable or effective for the particular application, and may be controlled within any of the following pressure ranges, or at any other suitable or effective pressure:

gas at a pressure of about 0 psia to about 200 psia;
gas at a pressure of about 200 psia to about 500 psia; or
gas at a pressure above about 500 psia.
water at a pressure of about 0 psia to about 200 psia;
water at a pressure of about 200 psia to about 500 psia; or
water at a pressure above about 500 psia.

Representative approximated values of carbon dioxide density, pressure, temperature and corresponding pH are shown in the following table (Table 1):

TABLE 1

| $CO_2$ Density | Pressure (PSIA) | Temperature ° F. | pH |
|---|---|---|---|
| — | 14.7 | 60 | 5.7 |
| 0.67 | 510 | 32 | 3.7 |
| 0.94 | 725 | 32 | 3.2 |
| 0.67 | 570 | 40 | 3.5 |
| 0.67 | 660 | 50 | 2.8 |
| 0.91 | 750 | 40 | 2.99 |
| 0.86 | 690 | 50 | 3.4 |

One embodiment of the present invention includes a method for the treatment of goods, such as meat, with a high pH, alkaline solution, followed by treatment with a low pH, acid solution, wherein the acid can have a "temporary" low pH value. The pH of the acid can be below about 7, including a pH of about 1 to about 3. Optionally, the high pH alkaline solution or the low pH acid solution can include a GRAS substance. The acid can have a temporary low pH for the period of time during which it is being used to decontaminate the meat. The pH of carbon dioxide and water, for example, will increase when the pressure is reduced; thus, the low pH level can be temporary. Water and carbon dioxide can be mixed in any proportions, such as 3 moles of carbon dioxide mixed with 2 moles of water. The pH of carbon dioxide and water is about 4 to about 5 when about 0.1 mol. (4.4 g) of carbon dioxide are mixed with about 10 mol. of water (180 g), and about 2 to about 3 (pH) when about 20 mol. of carbon dioxide (88 g) are mixed with about 10 mol. of water. However, in order to achieve these low pH levels, the carbon dioxide should be capable of dissolving into the water, which occurs at a pressure of about 750 psia at about 10 degrees centigrade, for example. Exposure of goods, such as meat, to carbon dioxide and water, can be followed by exposure to overwhelming quantities of liquid or dense carbon dioxide for the purpose of decontamination. Table I shows the effects of temperature and pressure on pH. In addition, low pH levels can be achieved by adding compounds, such as sodium chlorite, sodium chloride, and sodium hydroxide. Other substances can be naturally occurring gases, which can evaporate when the process of decontamination has been completed and the finished and processed product is exposed to ambient atmospheric pressure. Alternatively, naturally occurring liquid or solid processing agents, such as water and/or salts, such as sodium chloride, can be used. Any substances that will weaken pathogens and render them labile can be used.

The use of high pressure carbon dioxide, enabling enhanced solubility in water to create carbonic acid having a pH less than about 3.0, can be regulated to effectively achieve the desired kill rates while eliminating the potential deleterious effects of retaining low pH acid in the goods. In one embodiment, lactate and ethanol, in suitable quantities, are added to the goods intended for processing, in combination with carbonic acid at high pressure. After the process has been completed, the pH of carbonic acid can be increased when the pressure is lowered to atmospheric pressure. This provides a significant advantage when compared with the use of acid that remains highly acidic at atmospheric pressure, such as hydrochloric acid.

Additives such as sodium chlorite, ethanol, acetate, citrate, and organic acid(s), such as citric acid, can also be used by adding selected quantities, at the appropriate stage, which may be applied in multiple, sequential stages, to achieve the desired results.

The decontamination system according to one embodiment of the invention can include a first high pH stage apparatus and a second low pH stage apparatus. The low pH apparatus can use carbon dioxide at a pressure above ambient pressure to produce carbonic acid.

Figure 2:
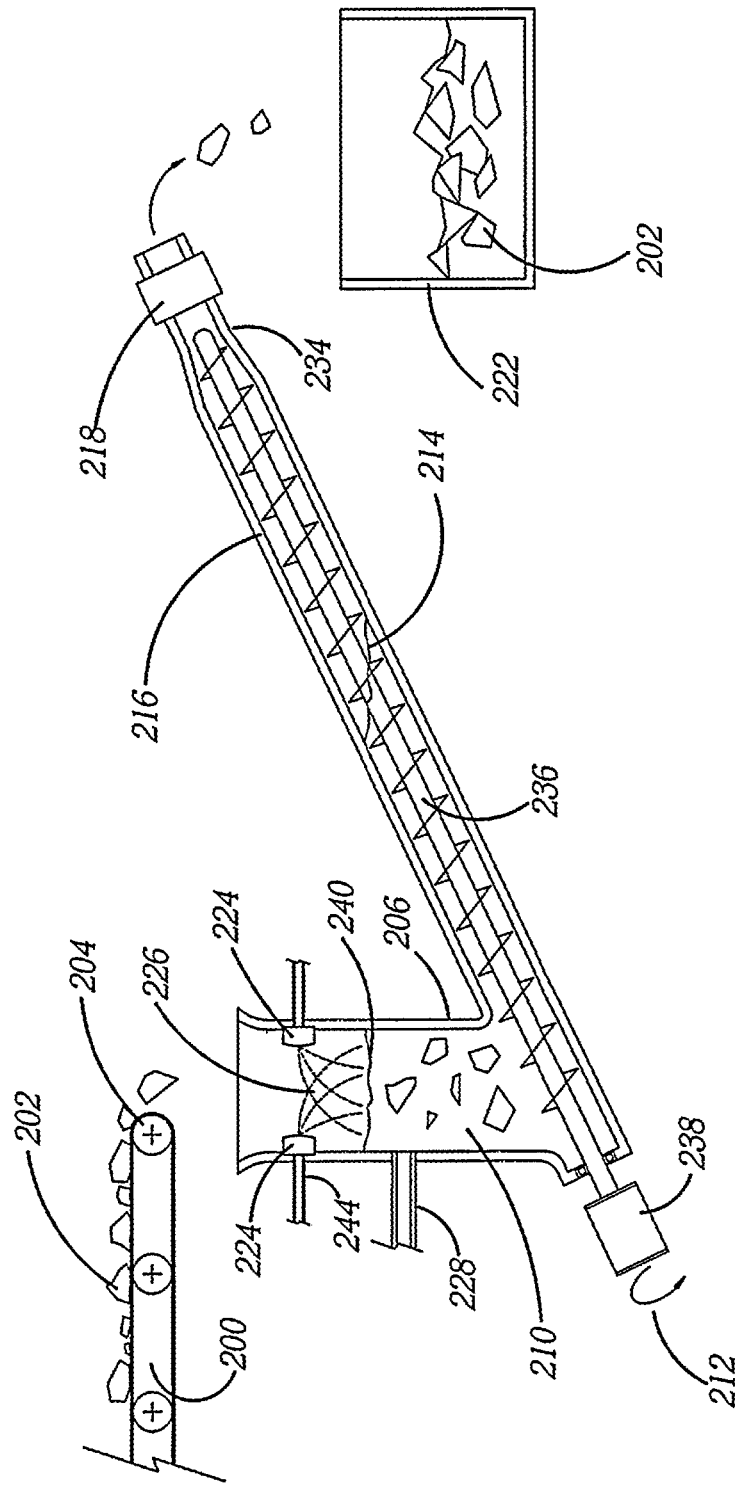
FIG. 2 shows a schematic illustration of an apparatus according to the present invention.

Referring now to FIG. 2, a schematic illustration of one embodiment of an apparatus that can be used to treat goods, is illustrated. The apparatus includes an inclined conduit portion 216. The inclined conduit portion 216 houses an internal screw conveyor 236 that is driven by a variable speed motor 238. The motor 238 drives screw conveyor 236 in the direction shown by arrow 212. The conduit 216 is arranged to transfer meat 202 along the inside thereof and subsequently through a constriction portion 234 located at the end portion of the conduit 216. A fat measuring device 218 (such as a Safeline-AVS x-ray device), is fitted to the constriction portion 234. The upper end portion of conduit 216 is open to allow passage of meat 202 into a container 222 located beneath the opening.

A vertically disposed container section 206 is connected (at the opposite lower portion of the conduit 216). The container section 206 has an open end located directly under a conveyor 200. The opposite lower end of container section 206 is open to the inclined conduit 216 so as to allow the passage of meat from the vertical container section 206 into the inclined conduit 216.

The continuous, horizontally disposed belt conveyor 200 is arranged to carry the meat 202, directly from a carcass disassembly room, for example. The conveyor 200 is arranged so that one end will terminate above the opening of the container section 206. When the conveyor belt 200 passes around the conveyor belt roller 204, the meat 202 will drop downwardly and into the open end of the vertically disposed container section 206.

The container section 206 includes an inlet port 228 for the introduction of any suitable high pH alkaline solution. Any number of spray nozzles 224 can be installed along the interior walls of container section 206. Spray nozzles 224 can provide a spray 226 of high pH solution thereby exposing the surfaces of the meat to the high pH solution.

Alkaline solution can be maintained in the inclined section 216 and in the vertical container section 206 at any suitable level, depicted by numbers 214 and 240, respectively, with the use of any suitable level instrumentation. A drain (not shown) can be located at any convenient location to drain solution from the container 206 or inclined conduit 216. The variable speed drive motor 238 can control the amount of exposure time of the meat to the high pH solution by increasing or decreasing the speed of rotation of screw 236. When the meat exits the constriction portion 234 of the inclined conduit section 216, the meat falls into the storage container 222. From the storage container 222, the meat 232 can be transferred to any pressurized low pH stage apparatus described below. Alternatively, the storage container 222 may be omitted, in which case the meat exiting the apparatus can pass directly into the low pH stage apparatus. In other embodiments, there may be one or a plurality of operations before and after the high pH and the low pH stage apparatus. These auxiliary unit operations can perform various functions on the meat, such as treating, decontaminating, irradiating, mixing, blending, grinding, and the like.

Referring yet again to FIG. 2, the transfer screw 236 is driven by motor 238, in such a way that pieces of meat are carried through the conduit 216, after having been immersed in liquid 210, wherein liquid 210 is a high pH alkaline solution, such as calcium hydroxide or ammonium hydroxide solution. Portions of meat 202 are transferred through the liquid 210, and ejected from the end of conduit 216 through constriction 234. The constriction 234 can ensure that the meat portions are compressed prior to passing through fat measuring device 218. The fat, water, and lean meat content of the meat portions can be measured prior to depositing in container 222.

Figure 3:
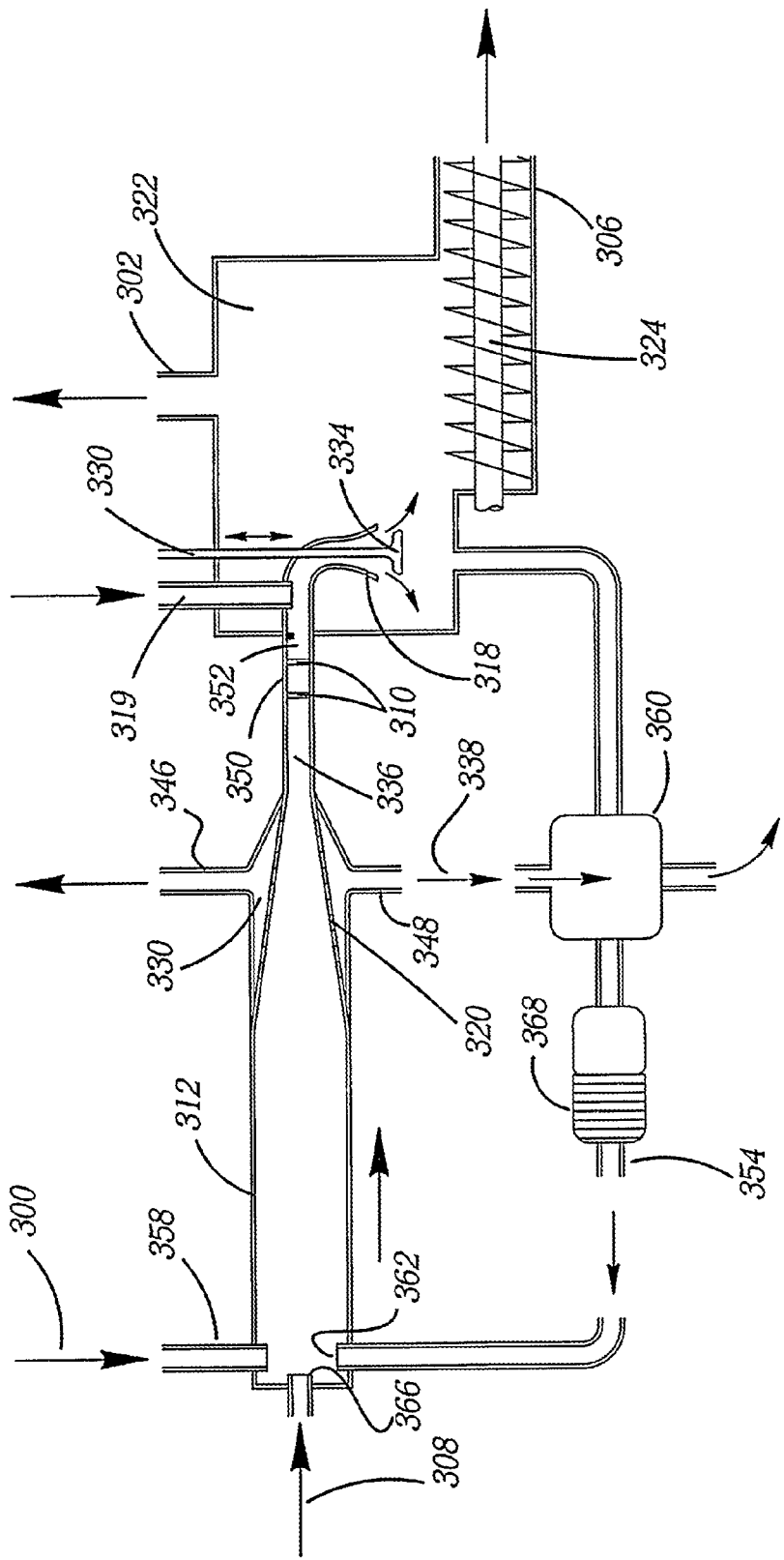
FIG. 3 shows a schematic illustration of an apparatus according to the present invention.

Referring now to FIG. 3, one embodiment of an apparatus for decontaminating goods is illustrated. The apparatus can use any gas or blend of gases, which can also include the addition of any salt or solution thereof or any suitable substance in measured quantities, at any suitable pressure and temperature. In one embodiment of the apparatus, the apparatus can be used as a low pH stage apparatus that follows the high pH stage apparatus, such as the one illustrated in FIG. 2. In one embodiment, carbon monoxide may also be added. In yet another embodiment, organic acids, such as anti-oxidants, including citric acid, may also be added in solution. The pH within the apparatus can be varied according to the pressure of the carbon dioxide contained therein.

Referring still to FIG. 3, the apparatus includes a first processing vessel 312 having an entry port 366 for the goods 308, such as meat, and an entry port 358 for carbon dioxide and water 300. The vessel 312 can be operated at any pressure ranging from about 500 psia to about 800 psia. The vessel 312 includes a transfer screw (not shown) to transfer the goods from one end of the vessel to the opposite end of the vessel 312. In one embodiment, this screw can have paddles, or other means, to cause the boneless meat to blend and mix with the carbonic acid produced from carbon dioxide and water. The screw can operate at a speed that will provide adequate retention time within the vessel to kill microorganisms, including pathogens or bacteria, which reside on the meat. The vessel 312 can include a narrowing section 320 that leads to a conduit 336 of reduced diameter. The conduit 336 can have one or more grinding heads 310. The conduit 336 can open into a second vessel 322 through valve 318. The second vessel 322 can be operated at a reduced pressure as compared with the first vessel 312. The second vessel 322 can be operated at a pressure from about ambient (about 14.7 psia) to slightly below the pressure of vessel 312. The vessel 322 can have a conduit 302 located at an upper portion of vessel 322 for any gas or moisture to exit the second vessel 322. The vessel 322 can also have a conduit 306 for meat to leave vessel 322.

In one embodiment, liquid carbon dioxide and liquid water are injected into port 358 at a pressure from about 200 psia to about 500 psia. The amount of liquid and carbon dioxide can be measured. Water can also be measured and introduced along with the carbon dioxide. Alternatively, the carbon dioxide and the water can be introduced at two distinct and separate injection ports. The amount of carbon dioxide can be based on the desired pH in vessel 312 or based on the pressure desired in vessel 312 or based on the quantity of water. Water can be any percent, such as 2%, of the mass flow rate of meat, plus any additional moisture that may be lost through evaporation. The water can additionally include salts, such as sodium chloride or sodium chlorite.

Carbon dioxide can be vented as a result of the drop in pressure in vessel 322. Carbon dioxide vents through port 302. The vented carbon dioxide may carry moisture. The decontaminated meat can be transferred out of the vessel 322 through port 306 and further processed in any desired manner.

In another embodiment, a rotating screw can be provided at the exit of vessel 312, at the union of the high pressure vessel 312 with the low pressure vessel 322. The rotating screw can be arranged to allow for decompression, and pressure reduction, gradually. To this end, the rotating screw can have gradually increasing volume between the flights of the screw.

Continuing to refer to FIG. 3, the narrowing section 320 of vessel 312 can have perforations. An annular space 330 can be provided between the perforated section and the exterior wall of vessel 312. Ports 346 and 348 leading from the annular space 330 are arranged to allow gases and liquids to be extracted therefrom. The gases and liquids can then be recycled after conditioning in vessel 360, where the liquids may be removed from the gas. The gas is compressed by compressor 368. Compressed gas can be transferred via conduit 354 and recycled by injection into vessel 312 through port 362. Meat can be transferred along conduit 350. Recycled carbon dioxide as from conduit 354 can be combined with water and injected into port 362. The quantity of water added can be directly proportional to the quantity of meat processed. The water can be about equal to the amount of moisture loss that has occurred or will occur during processing. The quantity of water added may also be controlled to not exceed any legally allowed amount as directed by the United States Department of Agriculture (USDA) or any other such responsible federal or state government body of any country. After compression and grinding of the meat in conduit 350, the meat then passes into conduit section 352. The pressure at conduit section 352 can be about 50 psia less than the pressure at perforated section 320. Port 319 is provided to inject goods, such as LFTB. The meat, that may include LFTB, can be transferred into vessel 322 after passing through valve 318. The pressure at perforated section 320 is affected by the rate of flow through grinders 310 and the pressure at conduit 352 can be controlled by the opening and closing of the valve 313. Valve plug 334 can mate with valve 318 so as to close conduit section 352. Valve plug 334 is rigidly attached to rod 330 such that an opening and closing force can thereby be applied to rod 330. The opening and closing force applied to rod 330 is sufficient to open and close the valve thereby preventing any goods from passing through or allowing the passage and the drop in pressure. Screw 324 in vessel 322 is arranged to transfer the meat away from vessel 322.

Meat is introduced into the high pressure vessel 312 through the injection port 360 by a variable speed pump (not shown). The meat is pumped at a pressure which can range from about 200 psia to about 850 psia. Instruments to measure level, flow, pressure, and temperature are located on all the appropriate conduits and vessels. In this manner, the amount of liquid or gaseous carbon dioxide and/or alternatively, the amount of water, can be controlled at a measured quantity based on the measured quantity of meat. The meat can be transferred in a continuous rate which may be adjusted as required by the variable speed pump, and the amount of carbon dioxide and water can be adjusted continuously and at a rate that corresponds and/or is proportionally related to the rate of the meat.

The retention time within the processing vessel 312 can be adjusted by the variable speed motor that drives the transfer screw within vessel 312 to ensure that the desirable number of microorganisms is destroyed. This number may exceed 5 log. The process can be capable of destroying at least a number of microorganisms equal to 10 to the log 5 ($10^5$). The process can also meet HACCP minimum standards.

Carbonic acid is the acid that is generated by the combination of carbon dioxide and water. However, under standard temperature and pressure conditions, the resultant acidic solution is only mildly acidic, having a pH of about 6. In one embodiment, the pressure in the high pressure vessel 312 can be about 500 psia and the temperature can be about 0° C. At this temperature and pressure, the pH of the liquid is about 3 to about 4. The pH can be controlled by adjusting the pressure in the high pressure vessel 312. For example, pressure can range from about 200 psia to about 850 psia, or greater than 850 psia.

The carbon dioxide can decontaminate and chill the meat and then evaporate leaving no residue other than water in vessel 322.

Figure 4:
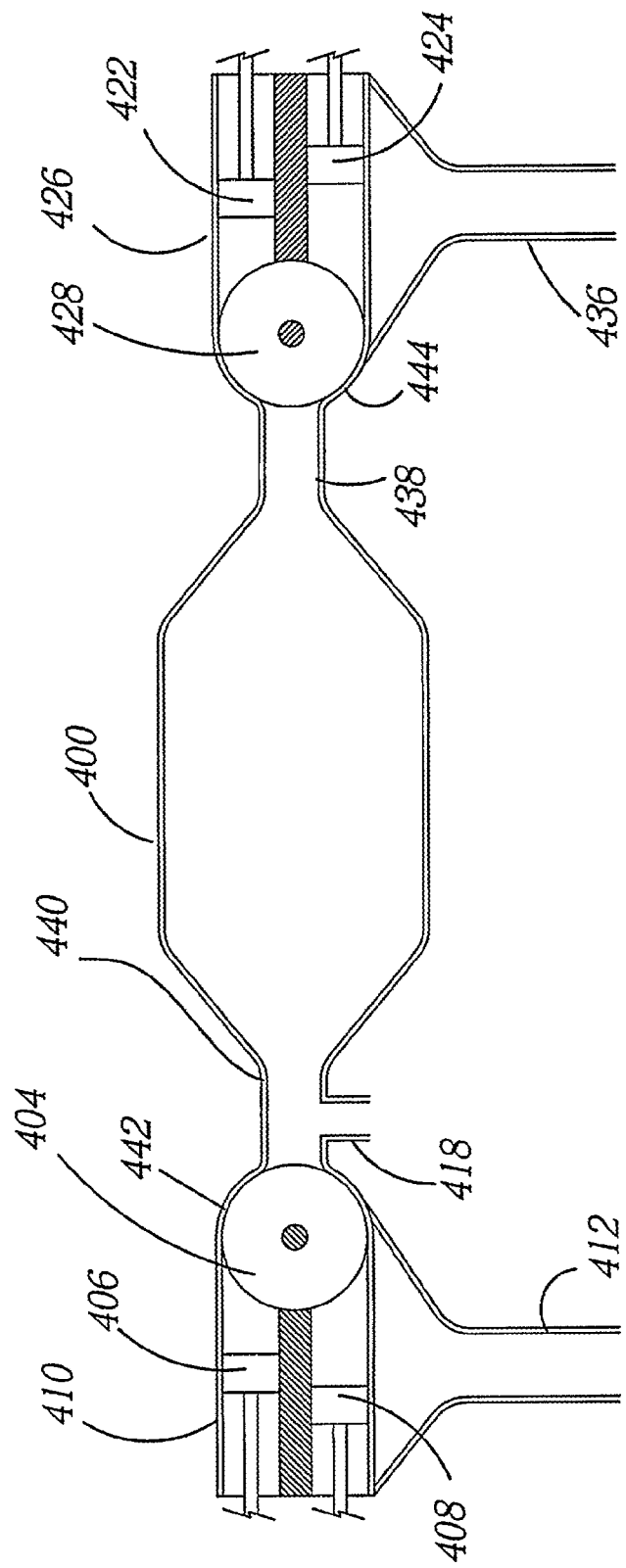
FIG. 4 shows a schematic illustration of an apparatus according to the present invention.

Referring now to FIG. 4, a cross section through one embodiment of an apparatus that can be used for decontaminating goods, such as meat, and lean fine textured beef (LFTB), is shown. The apparatus may be used as the low pH stage apparatus, following a high pH stage apparatus. Meat, such as LFTB, can be loaded into a vessel, and water can be blended with the LFTB so that the combined water and LFTB have a texture of a paste that can be pumped. The paste is then transferred along conduit 412. The apparatus of FIG. 4 comprises an injection pump 410, and an extraction pump 426, and a pressure vessel 400, interposed between pumps 410 and 426, and connecting them together via conduits 440 and 438. Each pump has a set of pistons. Pistons 406 and 408 of injection pump 410 operate in concert with valve 404, held within housing 442. The twin cylinders and valve that comprise injection pump 410, can be supplied by Marlen Research Corporation. Pistons 406 and 408 reciprocate alternately, extracting LFTB paste from a vessel and compressing the LFTB to a selected pressure, such as about 850 psia, and injecting the LFTB via valve 404 into conduit 440. The LFTB can be pumped at a selected mass flow. Extraction pump 426 operates similarly to injection pump 410, to extract LFTB from pressure vessel 400, at a rate about equal to the rate of injection. Extraction pump 426 also comprises two pistons, 422 and 424, with valve 428, held within housing 444. Extration pump 426 extracts LFTB from conduit 438, and transfers the LFTB into conduit 436. The LFTB can be transferred into any vessel via conduit 436.

Referring again to FIG. 4, port 418 is connected directly to a source of carbon dioxide that may be liquid or gas, and can be at a pressure greater than about 850 psia. Carbon dioxide can be transferred via port 418 to contact the LFTB within vessel 400. The carbon dioxide transferred into vessel 400, blends with the LFTB and water also injected into vessel 400 by injection pump 410. The mass flow rate of LFTB and carbon dioxide can be controlled in direct proportion to each other at selected mass flow rates. The carbon dioxide gas blends with LFTB and water, thereby producing carbonic acid. The flow rates provided by injection pump 410, extraction pump 426, and the carbon dioxide gas supply via port 418, are arranged so as to make sure that the pressure within pressure vessel 400, is maintained at about 850 psia. At this pressure, the pH of the carbonic acid and water that blends with the LFTB inside pressure vessel 400 can be about 2 to about 3. Bacteria that may be present with the LFTB upon injection into pressure vessel 400 can be in direct contact with the highly acidic carbonic acid also contained within pressure vessel 400. The process can be controlled such that the retention time of the LFTB with water and carbon dioxide (carbonic acid), is sufficient to ensure that substantially any bacteria that is present on the LFTB, is killed. After processing, the decontaminated LFTB transferred by extraction pump 426, into conduit 436, can be blended with other ingredients thus avoiding cross contamination of the other ingredients.

Figure 5:
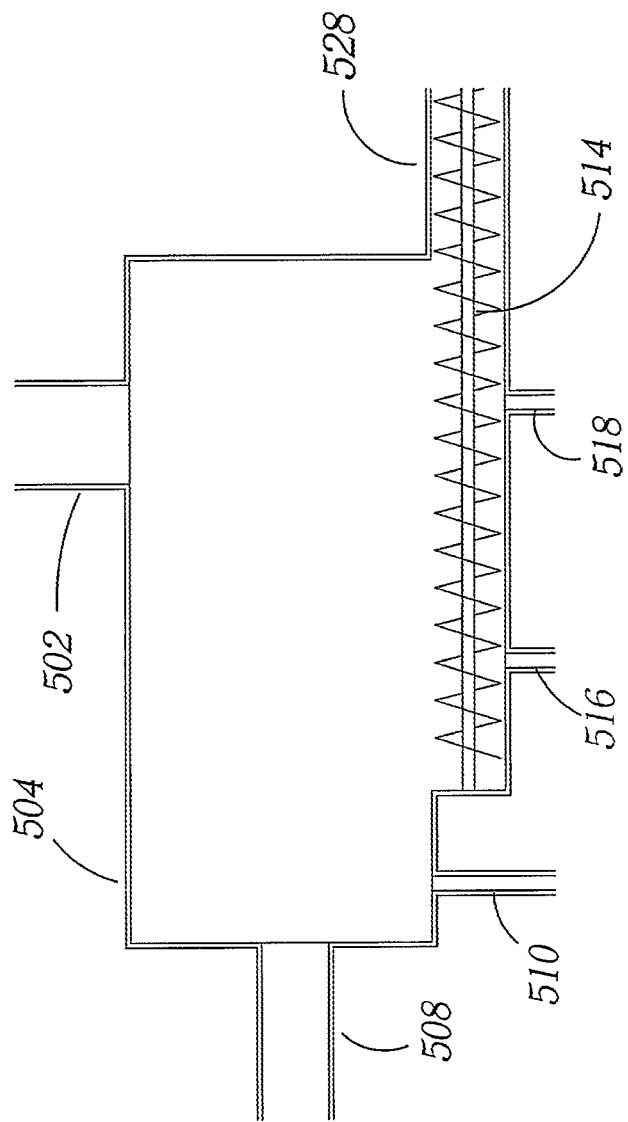
FIG. 5 shows a schematic illustration of an apparatus portion according to the present invention.

Referring now to FIG. 5, one embodiment of a low pressure vessel 504 is shown. Vessel 504 is similar in operation to vessel 322 of FIG. 3, and may be substituted therewith. Vessel 504 has conduit 502 on the upper side of vessel 504 to allow venting of gases. These gases may be exhausted directly to atmosphere, or alternately processed before venting. Conduit 508 can be attached to a source of decontaminated meat. Meat, such as ground beef, can be transferred into vessel 504, via port 508. Port 510 may be connected to a source of decontaminated LFTB, such as may have been processed with the apparatus described in association with FIG. 4. The rate of mass flow of LFTB transferred via conduit 510 is related to the rate of mass flow of meat transferred via conduit 508. Meat injected via conduit 508, and LFTB injected via conduit 510, can blend together as a consequence of agitation caused by the screw 514, and the expansion of the carbon dioxide gas carried with the LFTB. Liquid or gas carbon dioxide can be further injected via ports 516 and 518 that can impinge on screw 514. The carbon dioxide gas will cause cooling of the meat and LFTB as it expands in vessel 504, prior to exhausting via conduit 502. The chilled and blended meat and LFTB is then carried from vessel 504, via conduit 528 by transfer screw 514. Conduit 528 can be directly connected to other processing or packaging equipment so as to enable further processing or packaging of the meat and LFTB.

Figure 6:
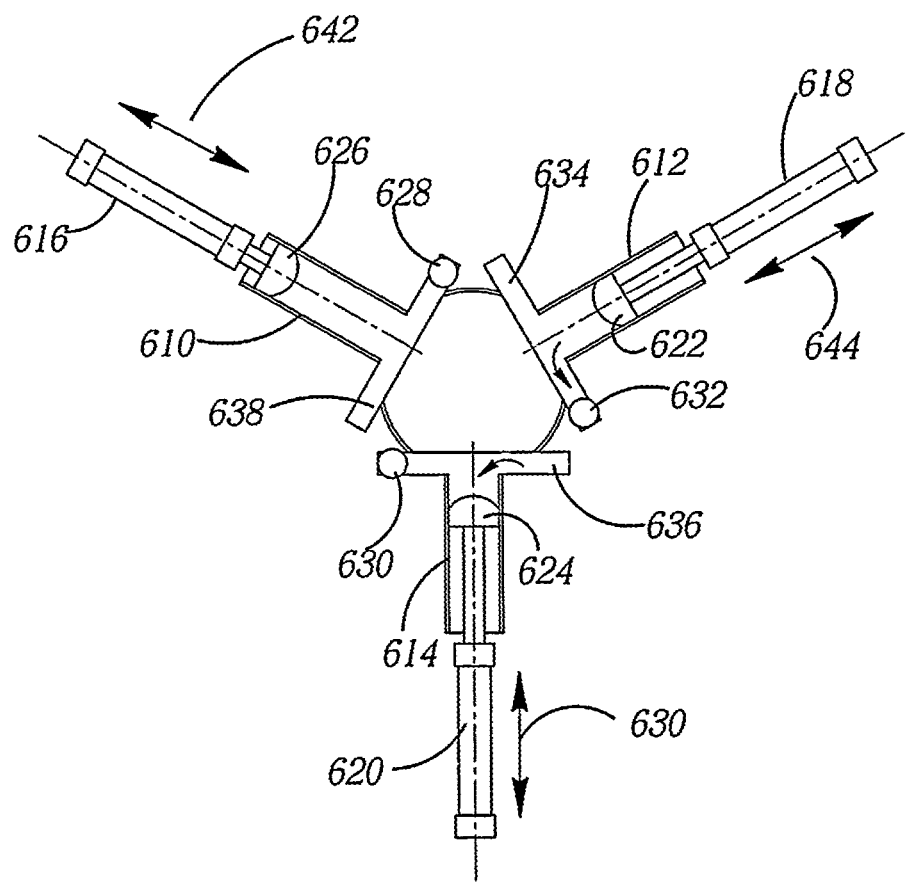
FIG. 6 shows a schematic illustration of an apparatus according to the present invention.

Referring now to FIG. 6, an apparatus that can be used to continuously decontaminate goods, such as meat, is illustrated. The apparatus can be used as the low pH stage apparatus, following a high pH stage apparatus. A series of three cylinders with pistons are arranged radially around a central point. Cylinders 610, 612, and 614, are arranged with internally mounted pistons 626, 622 and 624, respectively therein. Hydraulic cylinders 616, 618, and 620 are connected via connecting rods to pistons 626, 622, and 624, respectively, such that pistons can reciprocate forwards and backwards as shown by arrows 642, 644, and 630. Inlet conduits 638, 634, and 636, arranged perpendicular to cylinders 610, 612, and 614, respectively, can carry meat into the cylinders. Valves 628, 632, and 630 are arranged at the opposite end of the inlets 638, 634 and 636, to both allow and prevent the flow of meat from within the corresponding cylinders during the reciprocating cycles.

With reference to the cylinder 614 with piston 624, meat can be injected via conduit 636. Meat can be pumped until cylinder 614 is filled, and piston 624 is fully retracted in hydraulic cylinder 620. Valve 630 is closed during filling. With respect to cylinder 610, and piston 626, meat has already filled cylinder 610. However, valve 628 remains closed. Piston 626 is in the fully retracted position. Cylinder 612 with piston 622 has valve 632 in an open condition allowing meat that has been processed with carbonic acid at high pressure and retained for an effective period of time, to be transferred out of cylinder 612 by movement of piston 622. The three cylinder and piston assemblies can be operated sequentially wherein one cylinder can be filled with meat, one cylinder can be in the process of being filled, and one cylinder can be in the process of being emptied.

Figure 7:
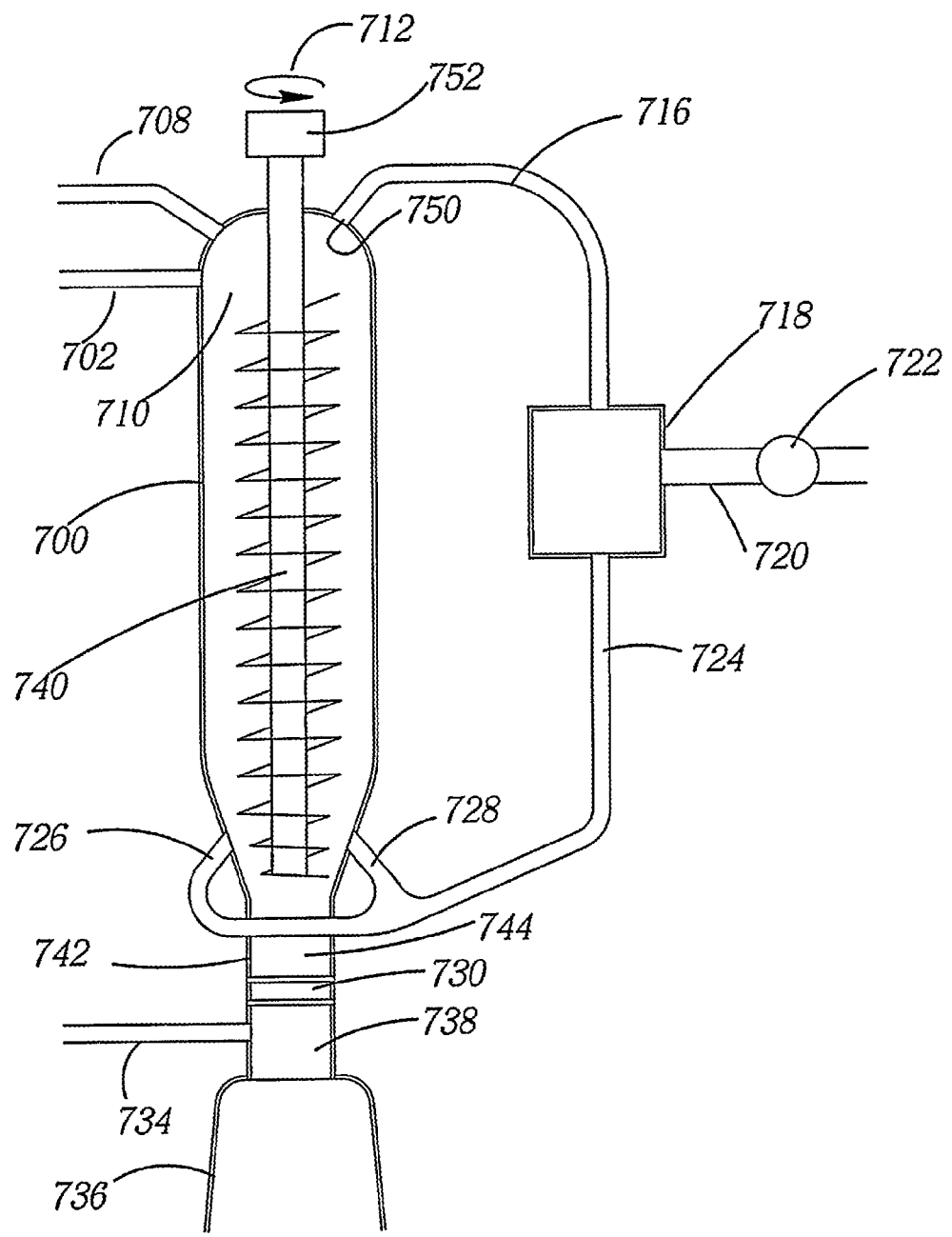
FIG. 7 shows a schematic illustration of an apparatus according to the present invention.

Referring now to FIG. 7, an apparatus that can be used to decontaminate goods, such as meat, is illustrated. The apparatus can be used as the low pH stage apparatus, following a high pH stage apparatus. A vertically disposed pressure vessel 700 is arranged with ports. A centrally and vertically disposed stirring mechanism 740 is attached to a variable drive motor 752 such that stirring mechanism 740 rotates slowly in the direction shown by arrow 712. Conduit 742 is at the exit end of vessel 700. A grinding plate 730 is mounted in conduit 742 with space 744 on the upstream side of grinding plate 730 and space 738 on the downstream side of grinding plate 730. Conduit 742 can connect vessel 700 with an expansion vessel 736. Conduit 734 empties into space 738 so that goods, such as meat or LFTB, can be pumped into conduit 742. Port 708 on vessel 700 allows the transfer of meat under high pressure, such as about 850 psia. Conduit 702 is arranged to allow the injection of carbon dioxide and water into vessel 700. A compressor 718 is connected to an inlet conduit 716, which discharges to an outlet conduit 724. A pressure release conduit 720 is also provided. Pressure release conduit 720 is fitted with a pressure release valve 722, which allows the escape of gas when the pressure exceeds a pre-selected pressure. Carbon dioxide gas compressor 718 extracts carbon dioxide gas via port 750 from inside the vessel 700. After compression of the carbon dioxide gas by compressor 718, the compressed gas is then re-circulated into pressure vessel 700, via conduit 724 through ports 726 and 728 at the base of the vertically disposed pressure vessel 700 at a selected mass flow rate. Meat is injected into the pressure vessel 700 via conduit 708 at a selected mass flow rate. Carbon dioxide and water is injected via port 702 into vessel 700 at a selected mass flow rate. The meat will be exposed to and blend with the water and carbon dioxide. The meat can fill vessel 700 to a pre-selected level before grinder plate 730 commences grinding. In this way, the meat will be retained within pressure vessel 730, for an effective time period which will expose the meat to carbonic acid and kill bacteria. The vessel 700 operates at high pressure, such as about 850 psia. Carbon dioxide gas at a pressure of about 850 psia is lighter than the meat and water contained within vessel 700. At this pressure, the density of carbon dioxide will be about 0.8 g/cc, which is less than the density of meat and water, and will therefore tend to accumulate at the upper end of the vertically disposed pressure vessel 700. Port 750 is so located and arranged to allow extraction of the carbon dioxide gas via conduit 716. Compressor 718 will elevate the pressure of carbon dioxide by about 25 to about 50 psi, and then recycle the compressed gas via conduit 724, through ports 726 and 728. The dense carbon dioxide gas will flow upwardly and blend with the meat that is agitated by agitator 740, and in doing so will ensure that water contained within vessel 700 is saturated with carbon dioxide, forming highly acidic carbonic acid. The carbonic acid will destroy pathogens that may be present at the surface of the meat. After an effective period, such as about 10 minutes, the meat can be extracted from the pressure vessel 700 via conduit 742, through grinder 730 that will be arranged to grind at a selected rate about equal to the rate of meat injection via conduit 708. If so desired, LFTB, having been processed according to the process described in association with FIG. 4, can be injected via port 734. Pressure and temperature within pressure vessel 700 can be adjusted to provide the pH effective to kill microorganisms, such as bacteria.

Figure 8:
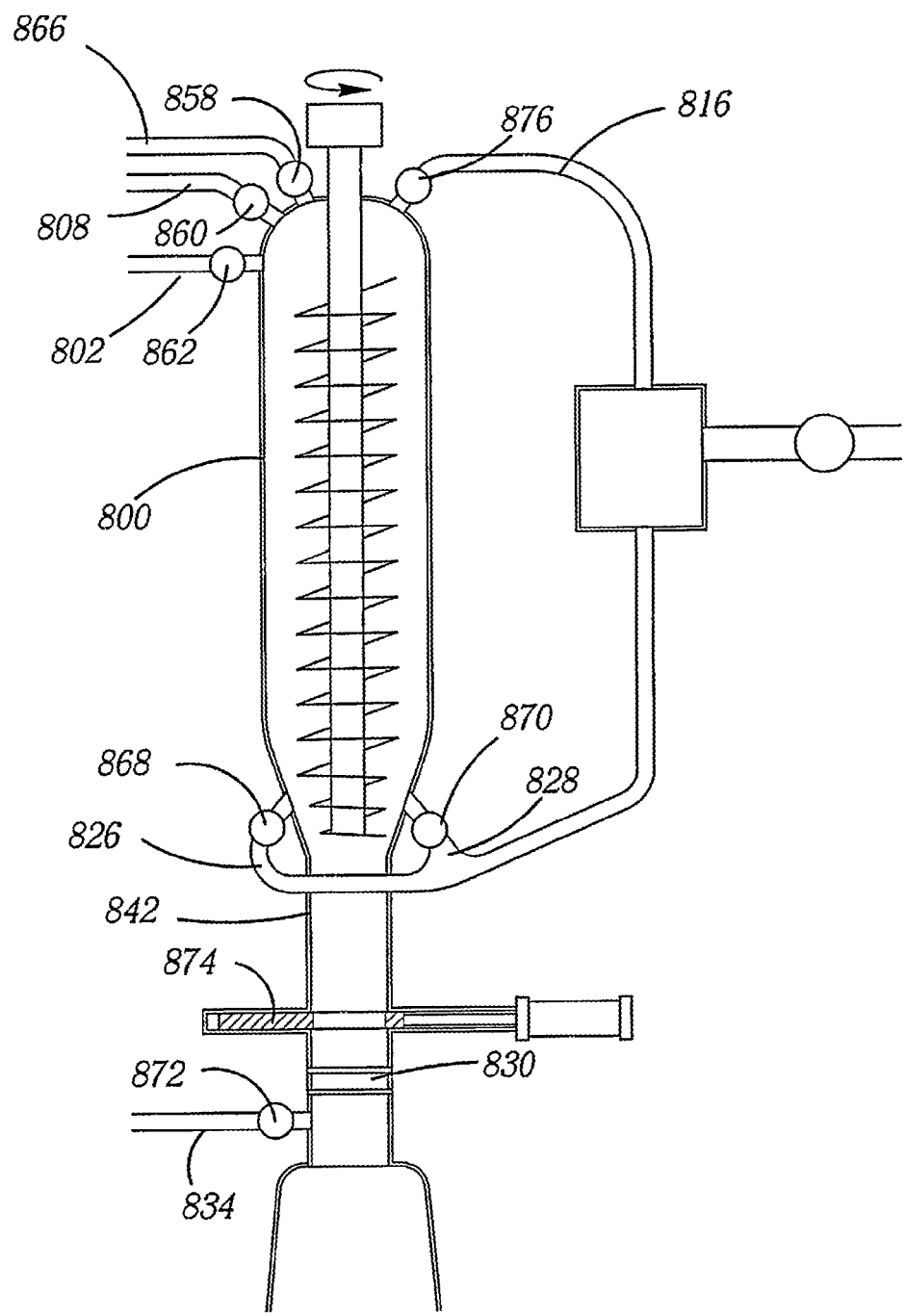
FIG. 8 shows a schematic illustration of an apparatus according to the present invention.

Referring now to FIG. 8, an apparatus for processing and decontaminating goods, including meat, is shown. The apparatus shown in FIG. 8 resembles the apparatus described in association with FIG. 7, however some additional components have been provided as described below. Conduit 866 with valve 858 is shown connected to the upper end of pressure vessel 800. Conduit 866 can automatically and suddenly allow the injection of any liquid or gas, such as high pressure carbon dioxide gas or liquid, into vessel 800 by operation of valve 858. Conduits 808 and 802 are shown with valves 860 and 862, respectively. Also, conduits 826 and 828 are shown with valves 868 and 870, respectively, and conduit 816 is shown with valve 876. Additionally, conduit 834 is shown with valve 872, and conduit 842 has a gate valve 874, wherein valve 874 is interposed between grinder 830 and vessel 800. The purpose of the valves is to isolate vessel 800 to allow the retention of meat under pressure. The arrangement of valves as shown in FIG. 8 allows meat, carbon dioxide, and water, to be transferred into vessel 800 and held under high pressure for an effective period. Water and carbon dioxide can be added to vessel 800 via conduit 802. Meat can be added to vessel 800 via conduit 808. At this time, the pressure inside vessel 800 is about 500 psia. Carbon dioxide gas transferred through conduit 866 will be at such pressure so as to elevate the pressure within vessel 800, to a pressure of about 850 psia to about 1000 psia. By so doing, the pH of the carbon dioxide and water (carbonic acid), will decrease in a short amount of time to a pH less than about 3. The increase in pressure can be produced suddenly by opening valve 858 to cause a sudden and substantial pH reduction. Pathogens, such as *E. coli* O157: H7, can be killed rapidly by "shocking" the organisms in this manner (i.e., the sudden and substantial lowering of the pH of an acidic solution, with which the organisms are in contact). Such a condition can cause death of these pathogens within a few seconds. Other pathogens, such as *salmonella*, can also be killed in this manner.

Figure 9:
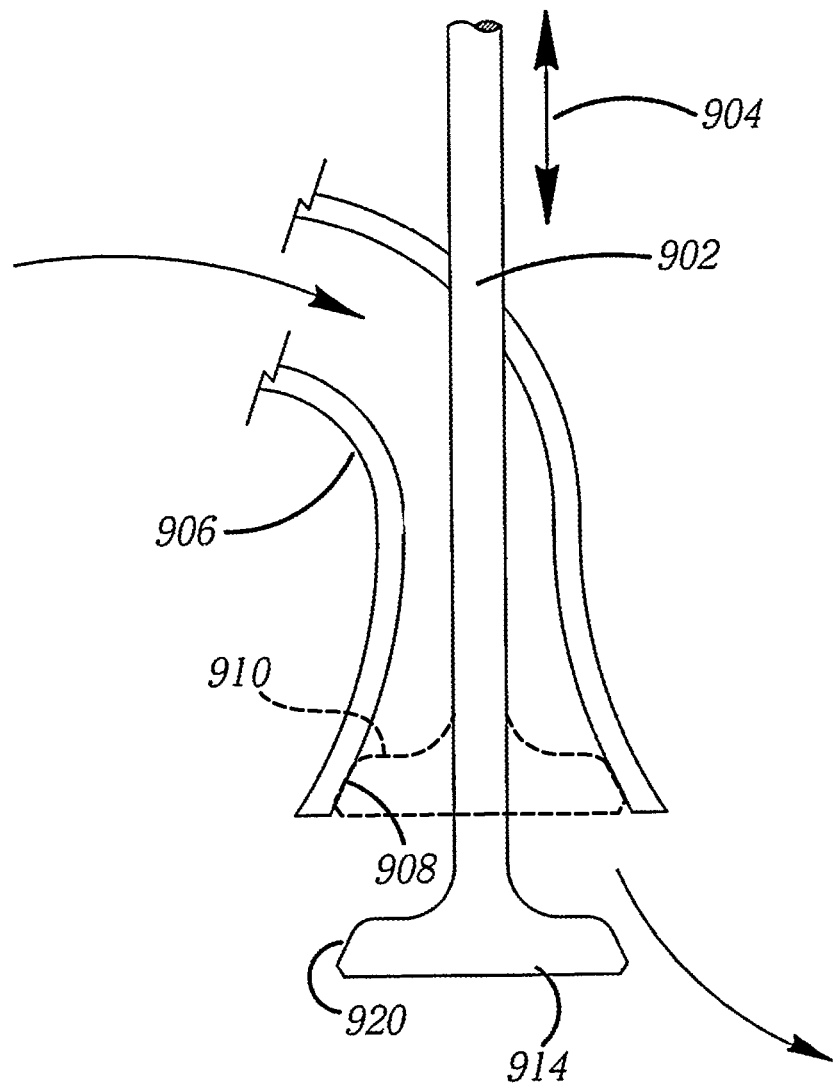
FIG. 9 shows a schematic illustration of a valve according to the present invention.

Referring now to FIG. 9, an embodiment or a valve is shown. Annular valve plug 914 is rigidly attached to a shall 902 and is arranged so as to reciprocate up and down in the directions shown by arrow 904, by a powered driver, such as a hydraulic cylinder capable or providing opening and closing forces. Conduit 906 terminates in a bell-shaped opening with an annular internal surface valve seat 908 that mates with annular external surface 920 of valve plug 914. Valve plug 914 can be positioned in either the fully open position (shown in solid line), or the fully closed position (shown in dashed lines 910), wherein annular surface 920 of valve plug 914 is in direct contact with internal annular surface of valve seat 908. When valve plug 914 is in the open position, meat can exit conduit 906. The valve described in association with FIG. 9 is similar to valve 318 shown in association with FIG. 3.

Referring now to FIGS. 10 and 11, an apparatus for continuously processing and decontaminating goods, such as meat, is shown. A horizontally disposed conduit 1002 is mounted to a frame 1000 that is rigidly fixed to concrete or other suitable flooring. A series of conduits fitted with valves are provided along the upper section of conduit 1002 so as to allow direct passage to the interior of conduit 1002. Hydraulic cylinders 1042 and 1048 are rigidly mounted to backing plate frames 1046 and 1052 on opposite ends of the conduit 1002, respectively. Pads 1044 and 1050 are attached via piston rods to the hydraulic cylinders 1042 and 1048, respectively. The hydraulic cylinders are arranged in line with conduit 1002 and on opposite ends thereof, in such a manner, that a compressive force can be applied between pads 1044 and 1050. Cages 1028 are located within conduit 1002 and between pads 1044 and 1050. Each cage 1028 comprises two end plates connected by bars, which will be more clearly described below in association with FIGS. 12-16. Each end of a cage comprises a piston that fits in an airtight manner within the bore of conduit 1002. The cages can be transferred through conduit 1002. The cages are placed end to end, so as to make contact with each other and are held under compression between pads 1044 and 1050. Conduit 1002 allows at least one cage to be completely outside of conduit 1002 at either end for insertion and removal. Baskets 1036 can be filled with goods and then located and held within the cages. Baskets can be manufactured from an open mesh material with an opening along one side and a hinged door that can be closed to cover the opening in such a manner so as to retain goods therein. Baskets can be placed inside cages and transferred with the cages along the inside of conduit 1002. The pistons of cages comprise seals that are arranged in such a way that the seals intimately contact the inner surface of conduit 1002. In operation, the oil pressure in hydraulic cylinder 1042 can be elevated to a pressure above the pressure that is within hydraulic cylinder 1048 and allows pad 1044 to move in the direction of arrow 1058 and causes the cages similarly to move in the same direction. Clamp 1040 can be mounted to the inlet end of conduit 1002 and clamp 1038 can be mounted to the exit end of conduit 1002. Clamps 1040 and 1038 can be operated by powered means so as to clamp between two adjacent cages, and in doing so prevents any lateral movement of the cages, when desired. Hydraulic cylinders 1042 and 1048 can be withdrawn completely, allowing the removal of one cage in contact with pad 1050, at the exit of conduit 1002 and the relocation of another cage at the entrance to conduit 1002. A loaded basket is placed in a cage to be located at the entry end to conduit 1002, and pistons 1042 and 1048 are again extended so as to compress the cages together. At this time, clamps 1040 and 1038 are withdrawn, allowing hydraulic cylinder 1042 to be operated by higher pressure than hydraulic cylinder 1048, thereby transferring the assembly of cages. This indexing process is repeated sequentially and each time a cage with basket is removed, a cage loaded with a basket, is placed at the entry to the conduit 1002 on the guide 1030. In this way, cages with baskets containing goods are progressively indexed along the bore of conduit 1002 for processing. A series of conduits 1006 with valves 1008 allow the injection of water and carbon dioxide into conduit 1002. Carbon dioxide and water can be injected via conduits 1006 at a pressure of about 500 psia, while conduits 1012 and valves 1013 can be arranged to inject water and carbon dioxide at a pressure of about 1000 psia. Conduit 1016 and valves 1014 can be arranged to allow the exhausting of lower pressure carbon dioxide and water, and conduit 1020 with valves 1018 can be arranged to exhaust the higher pressure carbon dioxide and water. In this manner, the goods in each cage can be exposed to a series of relative low and high pH mixtures of carbon dioxide and water. Carbon dioxide and water from conduits 1006 at low pressure can be allowed to pass into the sections of conduit 1002 isolated between the two ends of a cage, and then exhaust through conduit 1016 when valve 1014 is open. Valves 1014 and 1018 can then be closed, and after transfer of cages in the direction shown by arrow 1058, higher pressure carbon dioxide and water from conduits 1012 can be transferred into the space isolated by the two ends of the same cage and then exhaust through conduit 1020 when valve 1018 is open. As cages with baskets and goods therein are transferred along conduit 1002, a series of low pressure treatments followed by high pressure treatments, can be provided, thereby exposing goods in baskets to varying levels of pH, in a rapid and "shocking" manner. By alternately exposing goods to low and high pressure, with corresponding high and low pH, pathogens and undesirable bacteria that may be present on the surface of goods contained in baskets can be killed. Immediately prior to the transfer of any cage, out of conduit 1002 and onto support section 1032, valve 1068 in conduit 1066 can be opened to allow any gas contained in the cage to equilibrate with atmospheric pressure prior to transfer out of conduit 1002. FIG. 11 shows a cross section through conduit 1002 and injection ports.

Figure 12:
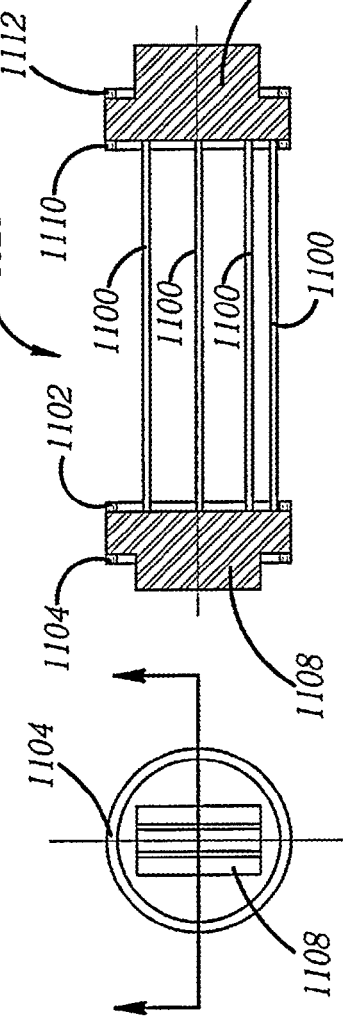
FIG. 12 shows a schematic illustration of a cage according to the present invention.
Figure 13:
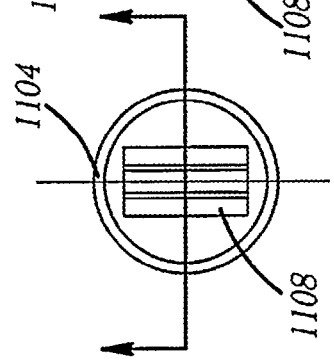
FIG. 13 shows a cross-sectional illustration of the cage of FIG. 12.

Referring now to FIGS. 12, 13, 14, 15, and 16, various end and cross sectional views are shown of a representative cage 1028 as disclosed for use in association with the apparatus of FIG. 10. End piece 1108 and end piece 1116 are connected by rods 1100. End pieces 1108 and 1116 are circular as shown in the respective end views. Seals 1104 and 1102, and seals 1110 and 1112 are fitted to end pieces 1108 and 1116, respectively. End pieces 1108 and 1116 are arranged to fit snugly, like pistons, such that seals will firmly contact the internal surface 1032 of conduit 1002 shown in FIG. 11. In this way, the assembled cage as shown in FIG. 12, can be transferred along conduit 1002, to withstand respective high and low pressure mixtures of carbon dioxide and water, whereby seals 1104, 1102, 1110, and 1112 contact surface 1032 in a pressure-tight manner.

Figure 16:
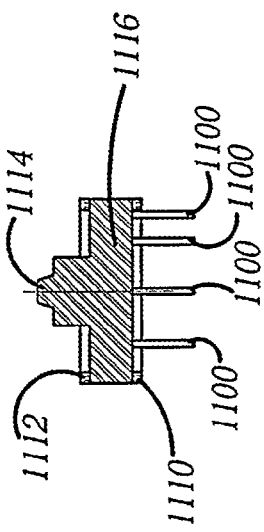
FIG. 16 shows a cross-sectional illustration of the cage of FIG. 12.
Figure 15:
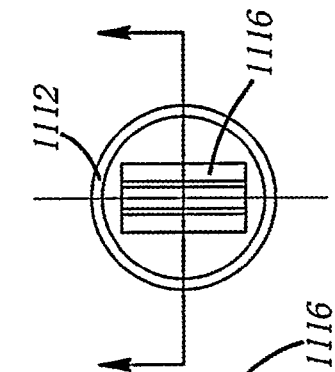
FIG. 15 shows a cross-sectional illustration of the cage of FIG. 12.
Figure 14:
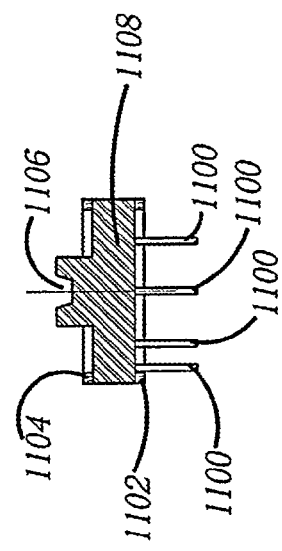
FIG. 14 shows a cross-sectional illustration of the cage of FIG. 12.

Referring now to FIG. 14, a slot 1106 is profiled in the end piece 1108 so as to mate with a ridge 1114 of an adjacent end piece 1116, as shown in FIG. 16, when the respective end pieces 1108 and 1116 are located in conduit 1002. In this manner, cages can be held interlocked together such that when drive shaft 1062 is rotated by drive motor 1060, the interlocked cages, will rotate. Goods in baskets located in cages, can be rotated so that the outer surfaces of any goods contained in the baskets will be exposed to the carbon dioxide gas and water used in the process.

Referring now to FIGS. 17, 18, 19, 20, 21 and 22, cages are shown with end pieces 1218 and 1220 connected by rods 1200, that allow for interlocking adjacent cages. Seals 1204 and 1202 are fitted to end piece 1218, and seals 1208 and 1210 are fitted to end piece 1220. End piece 1218, as shown in FIGS. 18 and 19, is arranged with a slot 1206 that can mate with a corresponding tab 1212 of end piece 1220 as shown in FIG. 21, so that interlocking between adjacent cages takes place as can be seen in FIG. 22. This configuration allows rigid coupling of adjacent cages. It should be noted that when cages are either removed from the exit end of conduit 1002 shown in FIG. 10, or loaded at the entry end of conduit 1002 in FIG. 10, slot 1206 and tab 1212 are aligned so as to allow for connection or disconnection. This can be achieved by the correct positioning by drive motor 1060, and monitoring the actual location of cages, which can be indicated by a proximity strip 1026 running the full length of conduit 1002. Proximity strip 1026 is arranged in direct external contact with conduit 1002 in such a way that will allow the detection of the precise positioning of the end pieces of each cage so as to position cages at the respective high and low pressure stations. Additionally, RFID tags may be located and attached to each cage, thereby providing a way of detecting the location of each cage and basket.

Figure 23:
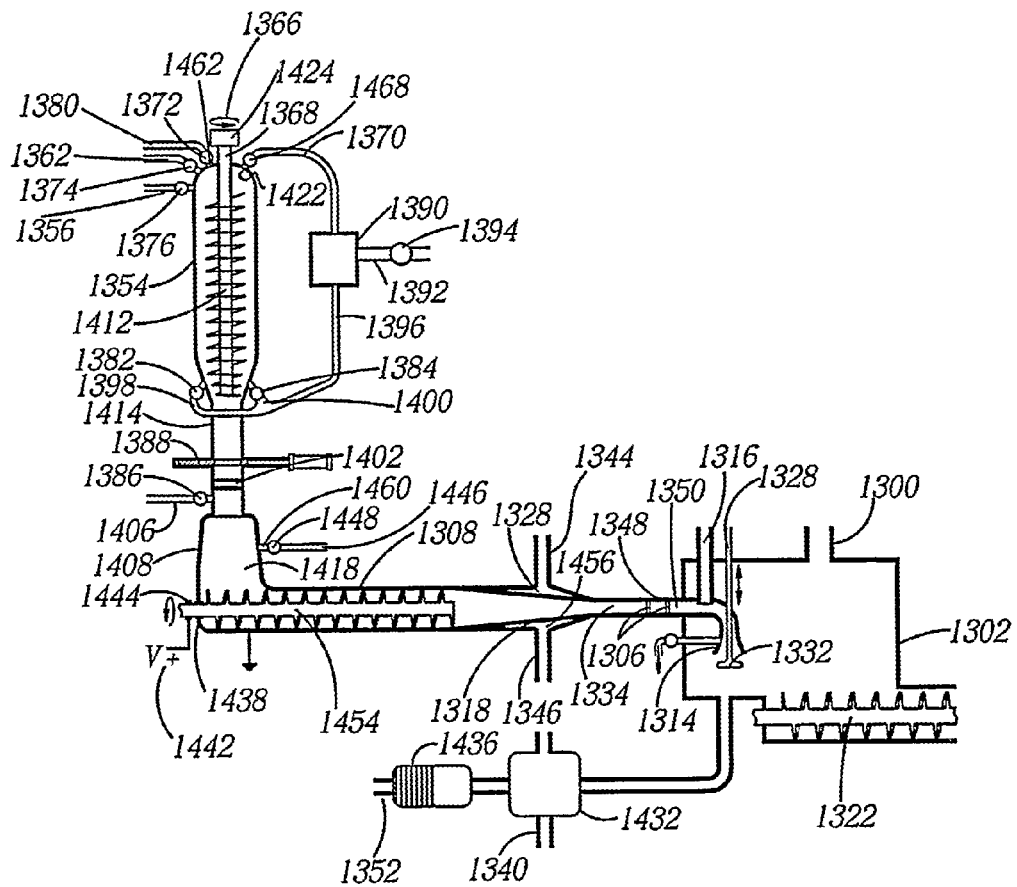
FIG. 23 shows a schematic illustration of an apparatus according to the present invention.

Referring now to FIG. 23, a cross sectional view through an embodiment of an apparatus that can be used to decontaminate goods, including meat, is shown. The apparatus shown in FIG. 23 combines some of the previously described vessels. For example, vessel 1354 can operate similarly to the vessel 800 described in association with FIG. 8. Vessels 1308 and 1302 can operate similar to vessels 330 and 322 of FIG. 3, and vessel 504 of FIG. 5. The apparatus is arranged to decontaminate goods in a multiple stage process. Conditions can be provided in the vessels so that the goods can be exposed to a first treatment, in a first vessel, and then to a second treatment, in a second vessel, that can be similar or different to the first treatment. If so desired, a third treatment may be provided in a third vessel and so on. The vertically disposed pressure vessel 1354 is arranged with a series of ports that communicate directly with the inside of vessel 1354. A centrally and vertically disposed stirring mechanism 1412 is attached to drive motor 1424 such that the stirring mechanism 1412 can be rotated in direction of arrow 1366. Meat can be introduced into the vessel 1354 through the conduit 1362 by a pumping apparatus (not shown), such as a Marlen Pump of Marlen Research Corporation, of Overland Park, Kans., USA. The meat is pumped at a pressure which can range anywhere from about 200 psia to about 600 psia, or greater. Mass flow control valves, flow measurement, pressure, temperature or other instruments are located on the appropriate conduits to measure and control meat, carbon dioxide, and water going into vessel 1354. In this manner, the amount of liquid or gaseous carbon dioxide and/or alternatively, the amount of water and selected additives can be controlled at a measured quantity based on the measured quantity of meat. A constant ratio of meat, carbon dioxide gas (or liquid), and water can be transferred into vessel 1354 at a selected and continuous combined rate of mass flow.

Conduit 1414 connects vessel 1354 with vessel 1408. A grinding plate 1402 can be mounted in conduit 1414. Alternatively, the grinding plate can be omitted. A conduit 1406 is connected to conduit 1414 so that goods, such as LFTB, can be introduced. Vessel 1408 is connected to conduit 1308. An insulated screw 1454 is mounted within conduit 1308 to transfer goods through conduit 1308, and which can also elevate the pressure to about 1050 psia. The vessel 1308 can be operated at a pressure from about 500 psia to about 1050 psia. The transfer screw 1454 can additionally be configured to induce mixing of the goods and can be attached to an electrical power source 1442. The transfer screw 1454 can be arranged with insulation 1438 so that power source 1442 can be attached to a collar 1444 in such a way that electrical current will flow through the transfer screw 1454 which is in direct contact with goods. In this way, an electrical current of variable and selected voltage can be passed through the goods, as the goods are transferred through conduit 1308. The vessel 1308 includes a gradually narrowing perforated section 1318 that leads to a conduit 1334 having a reduced diameter. Conduit 1334 can have one or more grinding heads 1306 provided therein. The conduit 1334 opens into the vessel 1302 via valve 1314. The perforated section 1318 is located downstream of transfer screw 1454, so that goods being transferred are compressed while passing through the perforated section 1318. The perforated section 1318 is surrounded by annular spaces 1328 and 1456 enclosed within conduit's 1308 exterior walls, which in turn are connected to conduits 1344 and 1346. Conduits 1344 and 1346 leading from the annular spaces are arranged to allow gases and liquids to be extracted from the meat, prior to grinding. These extracted gases and liquids can be subsequently recycled after conditioning in vessel 1432, where liquids may be removed from the gas via conduit 1340. The gas can be compressed to a suitable pressure by compressor 1436. Gas compressed by compressor 1436 can be transferred via conduit 1352 and can be recycled by injection into either of vessels 1354 and 1308 at ports 1462 and 1460, respectively, or at any other suitable port. Meat that is transferred along conduit 1308 can be compressed before grinding and then transferred along conduit section 1350 after grinding. The pressure at conduit section 1350 can be about 50 psi less than the pressure at conduit section 1334. An inlet port 1316 is provided along conduit section 1350, so as to allow the injection of goods, such as LFTB (Lean Fine Textured Beef) therein, at a suitable and controlled rate. The meat, which may include LFTB, is transferred into vessel 1302 after passing through valve 1314 and around valve plug 1332. The pressure in conduit 1334 at the location immediately upstream of grinders 1306 is affected by the rate of flow through grinders 1306. The pressure at section 1350 immediately downstream of grinders 1306, is controlled by the valve 1314. Valve 1314 can enable the complete closing at the exit end of conduit 1350. Valve 1314 is rigidly attached to rod 1328 that can provide opening and closing forces. The opening and closing force applied to rod 1328 is sufficient to completely close the valve thereby preventing any goods from passing through. In this way, the pressure drop that occurs when the goods are transferred into vessel 1302 will occur at the end of conduit 1350 immediately prior to transfer through the valve 1314, thereby allowing any chilling or freezing caused by the rapid decompression of carbon dioxide to occur at the point of exit. Screw 1322 mounted in the lower interior section of vessel 1302, is arranged to extract meat from vessel 1302. Recycled gas from compressor 1436 can be transferred for repeated use by combining with water and other selected substances, and injected into vessel 1408 via port 1460. The water added to the meat can be directly proportional to the quantity of meat. The amount of water can include the moisture loss that will occur as a result of processing the meat, after harvesting from the animal, and prior to packaging. The quantity of water added may also be controlled so as not to exceed any allowed amount, such as directed by the USDA (in the USA) or any other responsible Federal or State Government body.

The vessel 1302 is operated at a lower pressure as compared with the vessel 1308. The vessel 1302 is operated at a pressure from about ambient pressure or about 14.7 psia to about 20 psia or alternatively the pressure can be any pressure that is lower than the pressure in vessel 1308. The vessel 1302 has a conduit 1300, located at an upper location to exhaust any evolved gas or entrained moisture, from vessel 1302.

Liquid or gas carbon dioxide, and water at a pressure from about 200 psia to about 500 psia can be injected into vessel 1354 through port 1356. Carbon dioxide and water can be measured. The amount of carbon dioxide can be based on the pH desired in the vessel, or on the pressure desired so as to induce such desired pH, or based on the quantity of water or meat. The water can include the water that is anticipated will be lost through evaporation or otherwise. The vessel 1308 receives the liquid carbon dioxide, the liquid water, and the meat from vessel 1354 and 1408. Sodium chloride solution or any other suitable substance can be provided in vessel 1408 via conduit 1446, and in such quantities that will assist in lowering the pH of the carbon dioxide and water to about 1 to about 2. Screw 1454 causes the goods to blend and mix with the carbon dioxide, water and salt solution at a pressure of about 1050 psia. The goods are carried forward and at a speed that will provide adequate retention time within the vessel 1308 to ensure adequate killing of microorganisms, including pathogens or bacteria that reside on the goods. The sodium chloride or other salt compounds can be washed with water or other suitable washing agent after processing.

The goods can be ground by grinders 1306. One embodiment of the apparatus includes one or more meat grinders 1306 disposed between vessel 1308 and vessel 1302. If more than one grinder is used, a coarse grinder can be followed by a fine grinder.

Following grinding, the contents of the vessel 1308, including meat, carbon dioxide, water, and salt, are emptied into the vessel 1302, that operates at a lower pressure relative to vessel 1308. The pressure in vessel 1302 can range from about atmospheric pressure (14.7 psia) to slightly below the pressure of vessel 1308. Carbon dioxide is vented through port 1300 from the vessel 1302. The vented carbon dioxide may carry moisture that can be compensated for with the addition of water. The meat can be transferred out of the vessel 1302 and further processed in any desired manner.

In another embodiment, a screw can be provided in conduit 1334 that allows for the gradual depressurization by increasing volume as meat travels down the screw.

The pressure and temperature in vessel 1354 are about 500 psia and about 10° C. At this temperature and pressure, the pH is about 3 to about 4. The pH can kill microorganisms, including bacteria and pathogens, and can also cause acid resistant organisms, such as some strains of *E. coli* 0157:H7, to be weakened in the normal homeostasis process. After an effective residence period in vessel 1354, the meat can be transferred via conduit 1414 and vessel 1408 into vessel 1308. Sodium chloride or sodium chlorite solution added to the carbonic acid solution can cause the lowering of the pH in conduit 1308 to about 1 to about 2. Organisms that have been subjected to the conditions in vessel 1354 are then exposed to a lower pH in vessel 1308. Under these conditions, organisms that may have survived the energy exhausting conditions in vessel 1354 will not be able to survive the higher acidic conditions in vessel 1308. The pH can be controlled by adjusting the pressure of the vessels 1354 and 1308 and adding other pH adjusting substances. For example, some embodiments can use a pressure as low as about 200 psia, alternatively, some embodiments may use a pressure of greater than about 500 psia or some embodiments can use any pressure ranging from about 200 psia to about 1050 psia. Additionally, by passing an electrical current through the goods in conduit 1308, the organisms will be subjected to conditions that will inhibit their capability to maintain an internal pH.

One advantage of the methods described herein is that carbon dioxide can be used both to decontaminate and chill the meat, and afterwards, the carbon dioxide can evaporate leaving no residue other than water and in some cases a small amount of residual salt. The water added that is injected into the vessels 1354 and 1308 can be calculated and controlled, so that at the end of processing, the meat will have an allowable amount of water that can be the natural proportion of water, as determined by the standards or otherwise.

Conduit 1362 of vessel 1354 allows the transfer of meat under high pressure, such as about 500 psia. Conduit 1356 is arranged to allow the injection of carbon dioxide and water. A compressor 1390 is connected to an inlet conduit 1370, an outlet conduit 1396 and a pressure release conduit 1392. The pressure release conduit 1392 is fitted with a pressure release valve 1394, which allows the escape of gas when the gas exceeds a pre-selected pressure set point that will cause venting of gas. Alternatively, carbon dioxide gas can be recycled after release into conduit 1392. Carbon dioxide gas compressor 1392 extracts carbon dioxide gas via port 1422 from vessel 1354. After compression, the carbon dioxide gas is then re-circulated into vessel 1354, via conduit 1396 through ports 1400, and 1398 at the base of the vertically disposed vessel 1354. Meat is injected into the pressure vessel via conduit 1362 at a selected mass flow rate. Carbon dioxide and water is injected via conduit 1356 at selected flow rates. The meat will become exposed and blend with the water and carbon dioxide in vessel 1354 through the use of agitator 1412. The meat will substantially fill vessel 1354 to a predetermined level before gate valve 1388 is opened. Carbon dioxide will be lighter than the meat and water contained within vessel 1354 and will therefore tend to accumulate at the upper end of vessel 1354. Port 1422 is located and arranged to allow extraction of the carbon dioxide gas via conduit 1370. Compressor 1390 can elevate the pressure by about 25 psi to about 50 psi and then recycle the compressed gas via conduit 1396, and conduits 1348 and 1400. The carbon dioxide gas will reticulate upwardly and blend with the meat within pressure vessel 1354. The meat is agitated by apparatus 1412. The carbon dioxide gas will mix with the water contained within vessel 1354, forming acidic carbonic acid. The carbonic acid will destroy or weaken pathogens that may be present at the surface of the meat. After an effective period, the meat can be extracted from pressure vessel 1354 via conduit 1414, and transferred into vessel 1408 at a selected rate about equal to the rate of meat that is injected into vessel 1354. The method of transfer from the relatively lower pressure vessel 1408 to the higher pressure in conduit 1308, is by way of a rotating screw 1454. The transfer mechanism can both transfer the meat and also elevate the pressure of the contents within conduit 1308. If so desired, LFTB having been processed according to the process described in association with FIG. 4, can be injected via port 1406, so as to blend with the meat in vessel 1408.

Conduit 1380 with valve 1372 is shown at the upper end of pressure vessel 1354. Valve 1372 can selectively allow injection of any liquid or gas, such as carbon dioxide at an elevated pressure, into vessel 1354 when valve 1372 is switched to an open position. Conduits 1362 and 1356 are shown with valves 1374 and 1376. Conduits 1398 and 1400 are shown with valves 1382 and 1384, and conduit 1370 is shown with valve 1468. Additionally, conduit 1406 is shown with valve 1386, and a gate valve 1388 is shown in conduit 1414, wherein the valve 1468 is interposed between vessel 1354 and vessel 1408. The purpose of valves 1376, 1374, 1372, 1468, 1382, and 1384, and gate valve 1388, is to isolate vessel 1354 so as to be able to retain the meat within vessel 135 for an effective period. The meat, water, and carbon dioxide are injected into vessel 1354 via conduits 1362 and 1356 at a pressure of not more than 500 psia after closing gate valve 1388 and valves 1376, 1374, 1372, 1382, 1384, and 1468. After substantially filling vessel 1354 with meat, water, and Carbon dioxide, valves 1376 and 1374, and 1372 can be closed. In this condition, the pressure inside vessel 1354, is approximately 500 psia. Valve 1372 remains ready to open so that high pressure carbon dioxide gas and/or liquid carbon dioxide can be transferred into vessel 1354. Carbon dioxide gas transferred through conduit 1380 will be at such pressure and volume so as to elevate the pressure within vessel 1354, to a pressure substantially higher than 500 psia, such as about 850 psia or even as high as about 1050 psia or more. By doing this, the pH of the carbon dioxide and water (carbonic acid), will decrease in a short amount of time to a level of about 2 to about 3 pH.

The increase in pressure can be produced suddenly to produce a sudden and substantial pH reduction. When sodium chloride or other pH adjusting substance is present, the pH may be as low as about 1 to about 2. A sudden lowering of the pH of the liquid in contact with the meat can cause a rapid death of pathogens, and decontamination of the meat. Other pathogens such as *salmonella* can also be killed in this manner. By processing meat with the multiple stage methods disclosed herein in association with FIG. 23, the pathogen organisms that may be present on the surfaces of the meat can be killed without causing excessive damage to the meat. The general principle in the embodiments disclosed in association with FIG. 23 is to weaken organisms in a first vessel, by exposure to an environment that will cause the organisms to expend significant amounts of energy in their normal homeostasis process of maintaining pH, and then, in a second vessel, exposing the organisms to a second, more severe condition, thereby causing death to the organisms. The process can allow extended exposure in the first vessel at a relatively lower pH of about 2 to about 5 during which the organism is forced to use high levels of energy while the meat is substantially unaffected, followed by a relatively brief exposure at a very low pH of about 1 to about 3 that will kill the bacteria in a short time.

Figure 24:
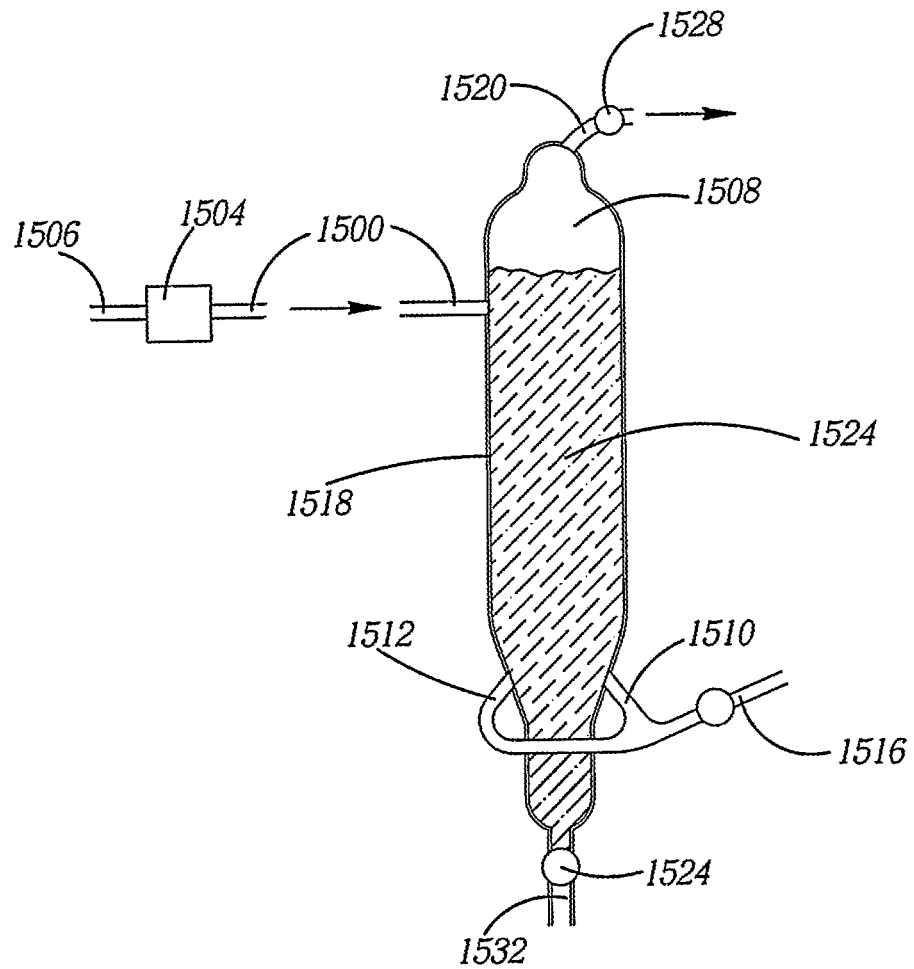
FIG. 24 shows a schematic illustration of an apparatus according to the present invention.

Referring now to FIG. 24, a cross section through one embodiment of an apparatus that can be used to carbonate water at high pressure of about 200 psia to about 2000 psia, is shown. A pressure vessel 1518 is connected to a high pressure water supply via conduit 1500, and a high pressure carbon dioxide supply via conduits 1516, 1510, and 1512. A conduit 1532 with valve 1524 is located at the base of pressure vessel 1518, and a conduit 1520 with valve 1528 is located at the upper end of pressure vessel 1518. Water is transferred at high pressure through conduit 1500, by high pressure pump 1504. Water is transferred to pump 1504 via conduit 1506. Water under high pressure substantially fills pressure vessel 1518. High pressure carbon dioxide gas is injected into vessel 1518, via conduit 1516, and through conduits 1512 and 1510 opening directly into vessel 1518. Carbon dioxide gas injected in such a manner will cause carbon dioxide to dissolve in the water 1524. Excess carbon dioxide gas will accumulate in the space 1508 above the level of the water. Conduit 1520 is connected to a compressor such that carbon dioxide gas can be withdrawn from vessel 1518, via conduit 1520. After compression, the carbon dioxide can be recycled by injection through conduit 1516. Carbon dioxide gas can be recycled to ensure that the water 1524 is saturated with carbon dioxide gas, forming carbonated water and carbonic acid that can be transferred from vessel 1518 via conduit 1532, into any apparatus arranged to decontaminate goods with the use of carbonic acid. Carbonated water that is selectively withdrawn from vessel 1518 as required by opening valve 1524, can be used in equipment disclosed herein, as an alternative or in addition to carbon dioxide gas.

Figure 25:
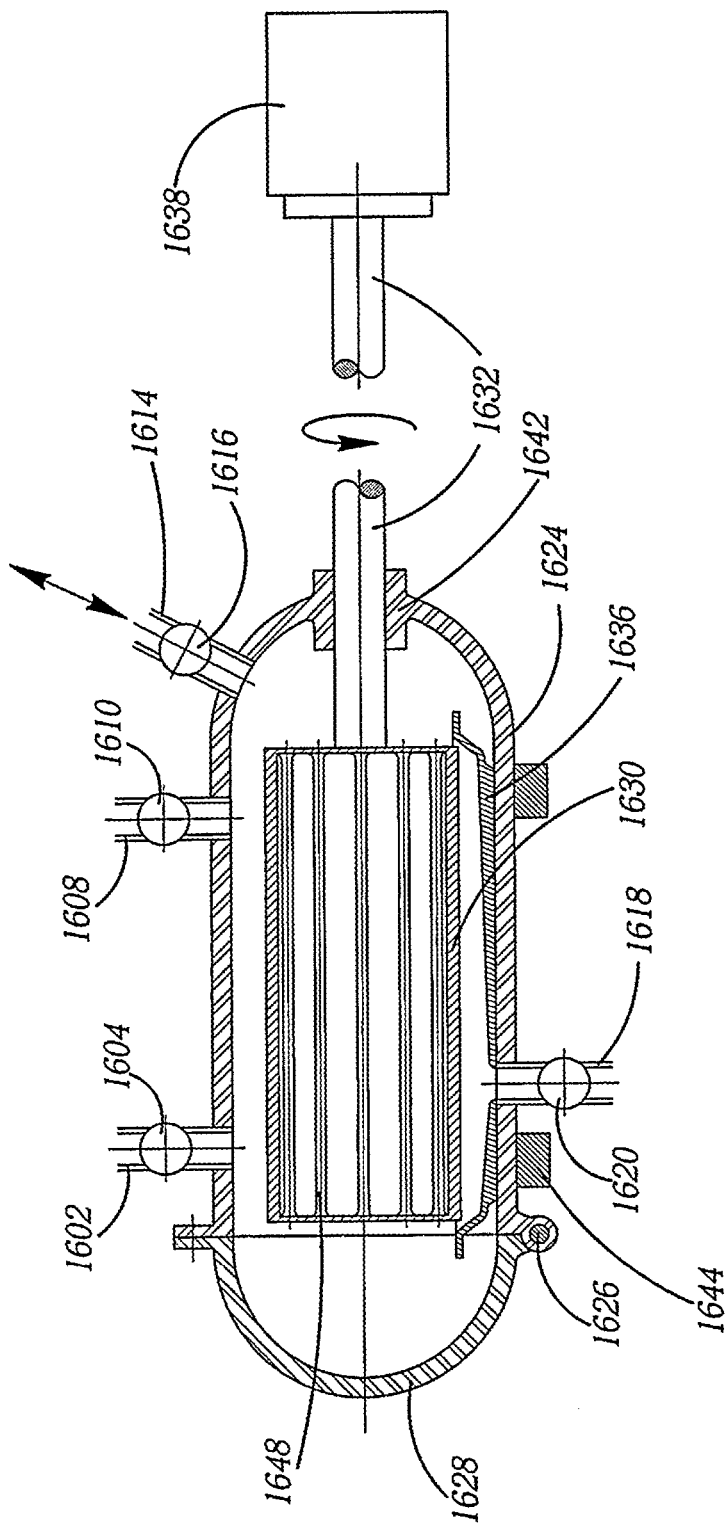
FIG. 25 shows a schematic illustration of an apparatus according to the present invention.

Referring now to FIG. 25, an apparatus used to decontaminate goods, such as meat, is illustrated. The apparatus can be used as a low pH stage apparatus following a high pH stage apparatus. A pressure vessel 1624 is mounted on frame members 1644. End piece 1628 is connected to pressure vessel 1624 by hinge 1626, such that when in a closed position, flanges around the circumference of pressure vessel 1624, and end piece 1628, create an airtight seal. Clamps (not shown) are provided to ensure that pressure vessel 1624 and end piece 1628 are held firmly and securely together in an airtight and liquid tight condition. Ports with valves are provided on vessel 1624 that can enable complete isolation and sealing of vessel 1624. Frame 1630 is encased within vessel

1624. Frame 1630 is attached to shaft 1632 connected to variable speed motor 1638. Frame 1630 is arranged such that a cage 1648 can be securely located within the frame 1630, and readily removed there from so as to allow replacement with similar cages. Cage 1648 can be pre-loaded with goods, such as meat or vegetables, prior to placement in frame 1630. Frame 1630 is attached to drive shaft that penetrates pressure vessel through opening 1642. Opening 1642 is configured to be gas tight around shaft 1632. Motor 1638 drives shaft 1632, and therefore frame 1630. Conduits 1602 and 1608 are fitted with valves 1604 and 1610, respectively. Valves 1604 and 1610 are arranged to be operated allowing atomized water (carbonated or otherwise) to be sprayed into the vessel 1628. Conduit 1614 and valve 1616 are connected to a vacuum pump and/or a source of high pressure carbon dioxide gas or liquid. Conduit 1618 is fitted with valve 1620 and provides communication between dish 1636 in vessel 1624 and a waste disposal vessel (not shown) that will allow for the removal of excess liquids that accumulate in dish 1636. Goods, such as meat, can be loaded into cage 1648. After loading cage in vessel 1624, and closing and sealing vessel 1624, vessel 1624 is evacuated by opening valve 1616 and applying a vacuum to conduit 1614, while valves 1620, 1604, and 1610, are in a closed position. After evacuation of vessel 1624, carbon dioxide gas is injected via conduit 1614, at a pressure of at least about 500 psia. Motor 1638 is switched on so as to drive shaft 1632, thereby rotating frame 1630 and cage 1648. Atomized water can then be sprayed into vessel 1624, via conduits 1602 and 1608, in such a manner so as to ensure the surfaces of the goods are wetted. Carbon dioxide can dissolve in the atomized water, forming carbonic acid. The pressure within vessel 1624 may be at any pressure, such as greater than about 500 psia, to lower the pH to an effective level. This process can be continued for an effective time period, so as to ensure that substantially all pathogens, or unwanted bacteria that may be on the surface of goods in cage 1648, are killed. Following this process, the pressure of gas in vessel 1624 can be reduced to a pressure about equal to atmospheric pressure, and the vessel 1624 can be opened to allow removal of cage 1648 and subsequent replacement with another cage, similarly loaded with goods. At this time, valve 1620 can be opened to allow liquids that may have accumulated in dish 1636 to be removed via conduit 1618 away from vessel 1624. Following replacement of cage 1648, and the resealing of vessel 1624, valves 1620, 1604 and 1610, can be closed and the evacuation of vessel 1624, can be repeated. Carbon dioxide is injected into vessel 1624, followed by spraying atomized water through conduits 1602 and 1608. Alternatively, water followed by carbon dioxide can be applied.

Figure 26:
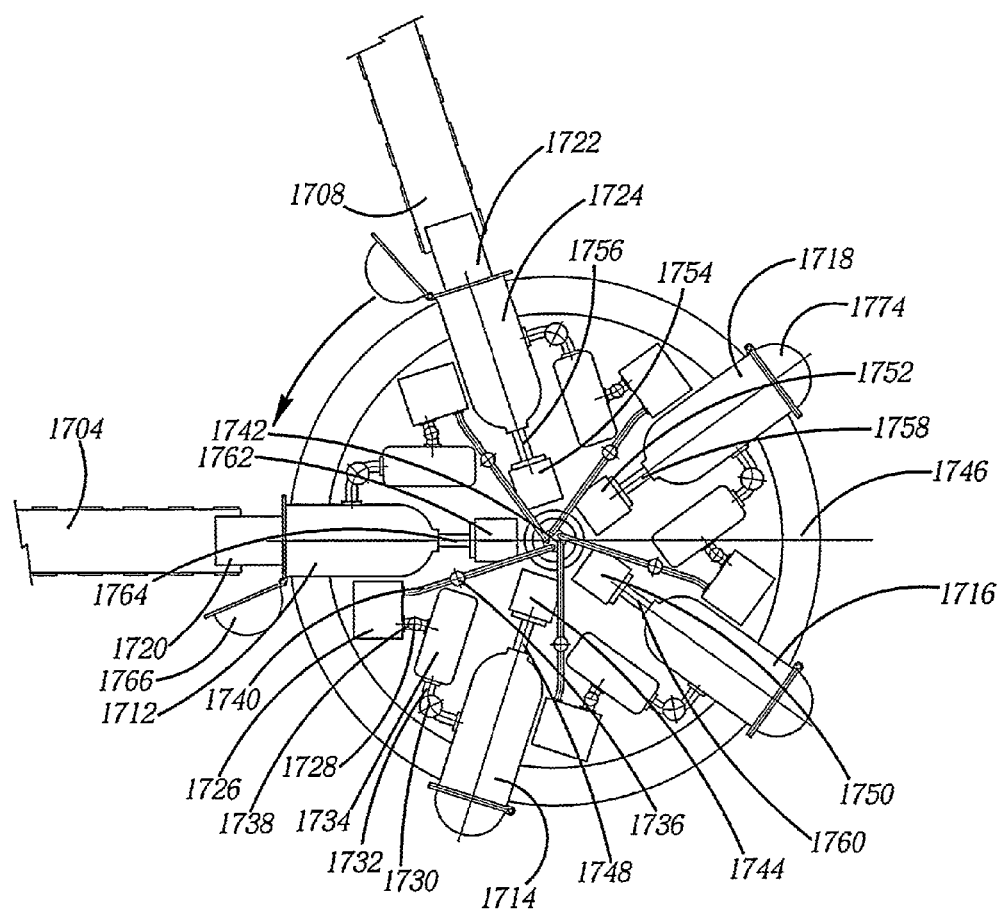
FIG. 26 shows a schematic illustration of an apparatus according to the present invention.

Referring now to FIG. 26 a carousel 1746 assembly is arranged with five pressure vessels 1712, 1714, 1716, 1718 and 1724. Carousel 1746 indexes by rotating in a counter-clockwise direction. Each pressure vessel can be constructed in a manner similar to the one that is described above and associated with FIG. 25, such that cages can be loaded, processed in the manner described above, and subsequently unloaded by an automated offloader. A compressor 1726, pressure vessel 1734, conduits 1740 and 1738, with valves 1736 and 1728, respectively, and conduit 1732 with valve 1730 connected to a carbon dioxide supply, are shown connected to each vessel. Drive motors 1762, 1744, 1750, 1752, and 1754 are connected to the frames inside of each vessel similar to the one shown in FIG. 25, via drive shafts 1764, 1748, 1760, 1758, and 1756, respectively.

The carousel assembly shown in FIG. 26 is arranged to rotate in an indexing manner so that after each indexing motion, a different vessel is arranged to carry out a different operation. Indexing refers to incrementally moving the carousel assembly about its axis so that after each movement, a different vessel is aligned with the loading and offloading conveyors. For example, the carousel assembly indexes after the loading of cage 1720 on conveyor 1704 into vessel 1712, while vessel 1724 is unloaded of cage 1722. End piece 1766 of vessel 1712 is then closed so as to seal the vessel 1712 in an airtight manner and carousel 1746 is then indexed in a counterclockwise direction so that the vessel 1724, which has just been unloaded of cage 1722 by unloading conveyor 1708, is then located in line and adjacent to loading conveyor 1704 in readiness to accept a new cage. Vessels that are not being loaded or unloaded can be in different stages of the processing described in association with FIG. 25. So for example, at station where vessel 1714 is located, carbon dioxide can be added. At station where vessel 1716 is located, driver motor 1750 can be rotating cage within vessel 1716, simultaneously being sprayed with water. At the station where vessel 1718 is located, vessel 1718, can be drained of water. It should also be appreciated that fat content and water content in meat can be controlled by adjustment of added water and carbon dioxide conditions.

Conveyor 1708 can be enclosed in a tunnel that is flooded with chilled filtered air, at a positive pressure, and wherein the enclosed tunnel connects directly to a temperature controlled packing room, where processed and decontaminated goods can be packed after decontamination, and in such a manner that other potential vectors of recontamination are minimized.

For the decontamination of plant material, wherein the plant material contains stomata; microorganisms, including bacteria, can inhabit the interior of the plant material by gaining access through these stomata. The stomata can close, thereby trapping the microorganisms in a location where it is difficult for decontamination agents to treat these microorganisms. Therefore, for decontaminating plant material, it is desirable to cause the stomata to open, thus allowing the decontamination agent, including carbonic acid, made from carbon dioxide and water at high pressure, to reach the microorganisms contained within the stomata of plants. The stomata can be opened prior to the treatment with the decontamination agent. Certain applications where this may be of use are in the decontamination of cabbage and broccoli, for example.

In certain instances, the processes disclosed herein can be used to fully pasteurize and eliminate the presence of pathogens from goods, such as meat. In these instances, the processed goods can be inoculated, after elimination of the harmful pathogens, with generic or spoilage bacteria that are not harmful to humans.

Figure 27:
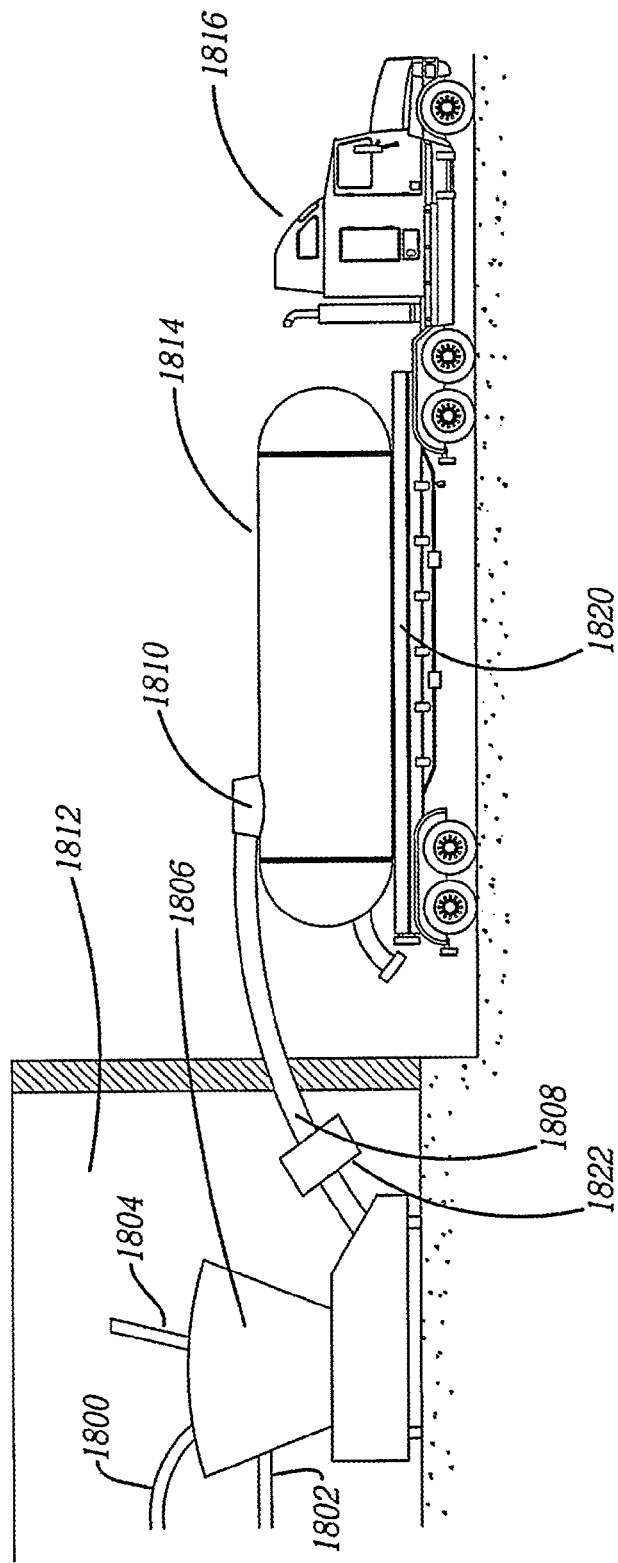
FIG. 27 shows a mobile apparatus according to the present invention.

Referring now to FIG. 27, equipment that can be used for handling, processing and transporting meat is illustrated. A meat pump 1806, has inlet conduits 1800, 1802, and 1804, and an outlet conduit 1808, which can attach to a tank 1814 carried on a trailer truck. Conduit 1808 is arranged to transfer meat pumped by pump 1806 into tank 1814 through a wall that separates tank 1814, from a refrigerated room 1812. Tank 1814 can be mounted on trailer 1820. Tank 1814 with trailer 1820 is attached to a prime mover 1816, such as a truck vehicle. Tank 1814 can be isolated by closing a valve on conduit 1810, and then the vehicle can travel along any highway or road, to another destination where the meat contained in tank 1814 can be removed and then further processed. A fat measuring device 1822, such as a model supplied by AVS-Safeline, can be located on conduit 1808 and used to measure the fat and lean content of meat transferred into tank 1814.

Figure 28:
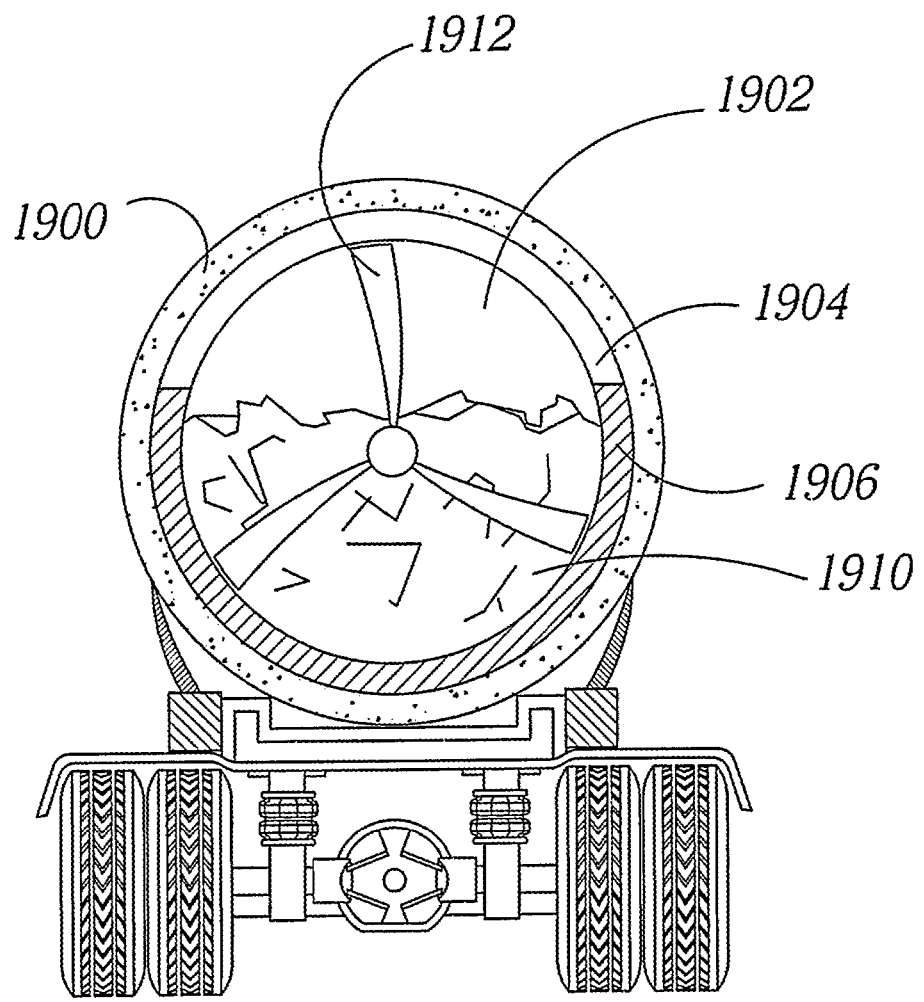
FIG. 28 shows a cross-sectional illustration of a mobile apparatus unit according to the present invention.

Referring now to FIG. 28, a mobile decontamination unit is illustrated. The unit can be used to apply a high pH alkaline solution to the surfaces of meat, such as boneless beef. The unit can also allow for immersing the meat in a low pH solution, wherein the low pH solution uses carbonic acid generated by combining carbon dioxide and water at high pressures. Immersion in alkaline solution ensures that the external surfaces of the meat are covered with the alkaline solution. The temperature of the meat may be about 40 degrees F. Immersion in a vessel containing sufficient alkaline solution can ensure the complete exposure of meat to the solution. As an alternative, the solution may also be sprayed onto the meat surfaces. The alkaline solution may have a pH ranging from greater than about 7 to about 14. Most of the bacteria can be killed using a pH of about 12 to about 14. However, it is anticipated that any bacteria that remains alive will become acclimatized to the alkaline solution. After exposure of the meat to the alkaline solution for an effective period of time, the meat can then be immersed in a low pH, acid solution. Any suitable acid can be used, including carbonic acid generated by dissolving carbon dioxide in water at high pressure. Acid solutions can be produced, ranging in pH from about 1 to less than about 7. By exposing the meat to a high pH alkaline solution, followed by exposure to a low pH acid solution, so that the difference between the highest pH and the lowest pH ranges anywhere from about 1 to about 13, the meat can be decontaminated of bacteria.

Referring once again to FIG. 28, an outer exterior insulating cover 1900 encloses a cavity 1904. Cavity 1904 may contain compressed gas or liquid 1906, including carbon dioxide or ammonia gas. The carbon dioxide and ammonia are pH modifying agents, meaning carbon dioxide can render a liquid acidic, and ammonia can render a liquid alkaline. The exterior cover 1900 also encloses an interior vessel 1902. The cavity 1904 is interposed between the outer exterior insulating cover 1900 and the vessel wall 1902. Meat 1910 is shown located within the interior of vessel 1902. Impeller 1912 is driven by a driver (not shown). A compressor or pump (not shown) with appropriate piping to the vessel 1902 can provide the force to move the pH modifying agent 1906 to and from cavity 1904 and vessel 1902. Valves can be provided where appropriate to allow the transfer of agent 1906 from cavity 1904 and into vessel 1902 at a controlled rate so as to provide the desired temperature and/or pH within vessel 1902. The compressor can also be used to compress excess gas that may accumulate in vessel 1902 and return compressed gas to cavity 1904 for storage. Impeller 1912 can mix the meat, thus ensuring the meat is exposed to the pH modifying agent. Impeller 1912 can be driven by any suitable driver and arranged to slowly agitate and mix the meat 1910 so as to expose substantially all the surfaces of the meat. The ammonia gas can react with water present in the meat to form ammonium hydroxide, which is a powerful alkali. Alternatively, water and ammonia can be added. The contents of vessel 1902 can, therefore, be exposed to ammonium hydroxide, a powerful alkali that can increase the pH at the surface of meat contained in vessel 1902 to a pH level of about 12 to about 14. Alternatively or additionally, a vessel containing compressed or liquid carbon dioxide may be provided such that, after processing with ammonia for an effective period of time, the contents of vessel 1902 can be exposed to carbon dioxide, which will form carbonic acid when coming in contact with water present in the meat. Alternatively, water and carbon dioxide can be added. Carbon dioxide and water can be added in amounts and under conditions to control the water content and fat content of meat, if so desired. The carbon dioxide gas (or liquid) may be provided at an elevated pressure, such as about 300 psia to about 500 psia or greater, thereby allowing production of carbonic acid. The meat contained in vessel 1902 can be processed while being transported, in a way that exposes the surfaces of the meat to a high pH, followed by a low pH. In one embodiment, the high pH can be in the range of about 12 to about 14, followed by a low pH in the range of about 1 to about 3. Additionally, other substances disclosed herein may be provided to adjust the pH. Such exposure to a high pH followed by a low pH will be lethal to bacteria. The exposure time to ammonia gas can be optimized so as to ensure that all bacteria are killed when the meat is secondly exposed to the low pH carbonic acid. Excess gasses used in vessel 1902 can be collected through a port (not shown) which can be located at the upper side of vessel 1902, compressed, and returned to the respective storage cavities or vessels and then reused as required or alternatively vented to the atmosphere.

The processes disclosed herein can provide an effective means for decontaminating meat, including boneless beef, by firstly exposing the meat to a very high pH anywhere in the range from about 12 to about 14 for a selected or effective period of time followed by exposure to a low pH anywhere in the range from about 1 to about 3 for a further selected or effective period of time. Such a process can be capable of killing microorganisms, and decontaminating or pasteurizing the meat while also maintaining the meat at a low temperature of about 40 degrees F. Additionally, carbon dioxide and water can be provided in amounts and under conditions described herein, to control the water content and fat content in meat.

Figure 29:
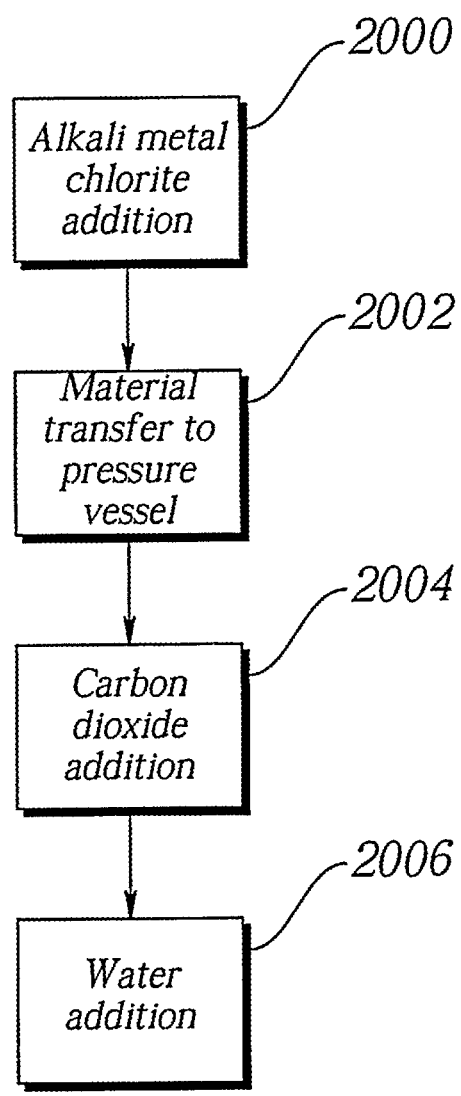
FIG. 29 shows a block diagram of one embodiment of a method according to the present invention.

Referring now to FIG. 29, one embodiment of a method according to the present invention is illustrated as a block diagram. For any process that advantageously uses carbon dioxide to generate carbonic acid, the process can be supplemented with the addition of an alkali metal chlorite agent, represented by block 2000. Any suitable alkali metal chlorite can be used, including potassium chlorite and sodium chlorite. The alkali metal chlorite may be supplied as a solid or in solution. The alkali metal chlorite addition, represented by block 2000, can take place prior to carbon dioxide addition, represented by block 2004. Any amount of alkali metal chlorite added to carbonic acid can reduce the pH below what is capable by carbon dioxide alone. In practice, the alkali metal chlorite agent should be applied to cover as much of the meat surface as is practicable, and also to ensure that the lowering of the pH is effective at inactivating the microorganisms.

Once an alkali metal chlorite has been applied, the meat containing the alkali metal chlorite is transferred to a pressure vessel, represented by block 2002. The pressure vessel can have an inlet and an outlet, and means to transfer the meat from the inlet to the outlet. Transfer apparatus may include conveyors, belts, and the like. However, meat can transfer through a vessel utilizing the force of gravity. The pressure vessel can be fitted with instrumentation to monitor the amount of meat passing the inlet and the outlet. The pressure vessel may also be fitted with fat and water measuring devices at all inlets and outlets that can measure the fat and lean content, and water, of the meat. The pressure vessel may also be fitted with any other suitable instrumentation to monitor the pressure and/or temperature and the liquid level in the pressure vessel. The pressure vessel may have any number of additional inlets for the addition of agents, including alkali metal chlorites, carbon dioxide, and water. Every inlet can be fitted with a measuring instrument to measure the amount of agent passing through the inlet. Every inlet can be fitted with a metering device, such as a control valve, to accurately meter the amount of agent passing into the pressure vessel.

Although FIG. 29 shows that alkali metal chlorite addition is ahead of the transfer of meat to the pressure vessel, block 2002, the alkali metal chlorite addition, block 2000, may take place after the meat is transferred to the pressure vessel, block 2002. The alkali metal chlorite addition step, block 2000, can occur apart from the carbon dioxide addition step, block 2004, so that alkali metal chlorite and carbon dioxide are not prematurely mixed with one another. In some embodiments, alkali metal chlorite addition can take place before carbon dioxide addition. In other embodiments, alkali metal chlorite addition can take place after carbon dioxide addition, and it may be possible that alkali metal chlorite addition can take place at the same time with carbon dioxide addition. However, in this case, the alkali metal chlorite is introduced via a separate supply conduit from carbon dioxide, so as to not prematurely cause a reaction of the alkali metal chlorite, thus wasting the chlorite. The pressure vessel may be fitted with a mixer to more adequately mix the meat to expose all the surfaces to the alkali metal chlorite and carbon dioxide, and water. The pressure vessel can be devoid of substantially all oxygen and replaced with any suitable gas, including nitrogen and carbon dioxide, for example.

Carbon dioxide can be added in sufficient quantities so that the carbon dioxide together with the alkali metal chlorite and a water phase present in or on the meat produce a carbonic acid/alkali metal chlorite solution of sufficiently low pH to cause inactivation of microorganisms. The carbon dioxide addition can occur after the alkali metal chlorite addition in order to prevent reaction between the alkali metal chlorite and the acid prior to their exposure to the meat. In this manner, the chlorite is conserved and used when present on the meat. The pressure vessel of block 2002 is pressure controlled within any of the pressure and temperature ranges described herein. Carbon dioxide addition may take place as a solid, a liquid, a gas, or as a supercritical fluid. The carbon dioxide is added in an amount that is effective to cause the desired lowering of the pH to within the ranges described herein effective to inactivate microorganisms, such as bacteria.

Referring once again to FIG. 29, the water addition step, represented by block 2006, may take place before, after, or during the addition of the alkali metal chlorite, block 2000. FIG. 29 should not be construed as limiting the order of the water addition step, as FIG. 29 is only one embodiment of the invention. Water addition, block 2006, may take place before, during, or after the meat transfer to a vessel, block 2002. Alternatively, water addition, block 2006, may take place before, during, or after carbon dioxide addition, block 2004. The water can be measured and metered to achieve the intended effect of lowering the pH, and additionally, water may be metered to provide the meat with any previous or anticipated moisture loss by compensating for any dehydration that may occur throughout all stages of processing. To this end, the pressure vessel may be fitted with moisture content analyzers for measuring the moisture content of the meat entering the pressure vessel as well as for measuring the moisture content of the meat exiting the pressure vessel.

In addition to alkali metal chlorite agents, any other suitable agent, such as sodium chloride, may also be added before, during, or after any of blocks 2000, 2002, 2004, and 2006.

The use of a "multiple hurdle" strategy for pathogen decontamination of goods, such as meat, is provided. According to the invention, each decontaminating hurdle may have a limited, but nevertheless unsubstantial deleterious effect on the quality of the food, and it is therefore desirable to minimize the intensity of each treatment. Multiple hurdle is a strategy with a series of multiple treatments of minimized intensity, thereby minimizing the overall combined deleterious effect, as compared to a single more aggressive treatment. For example, irradiation that pasteurizes the meat in a single treatment is more deleterious to the meat when compared to multiple, albeit, lesser intense treatments. Such a single treatment with irradiation, in the presence of air, would cause oxidation or rancidity that can otherwise be reduced with multiple treatments. Additionally, a multiple hurdle strategy may create virulent strains of a pathogen, not by "natural selection" but by "multiple hurdle selection". According to the invention, each hurdle is followed by a subsequent treatment within an effective period of time that does not allow the pathogens to adapt to an enhanced acid tolerance that would enable survival of the pathogen in a subsequent treatment.

The multiple hurdle processes herein disclosed provide for the decontamination of goods, such as meat, without substantial deleterious effect on the meat quality. The meat is packaged directly after decontaminating so as to reduce the possibility of recontamination. The processes also enable reproducibility, according to HACCP standards, using agents, such as "processing aids" as defined and allowed by USDA. The USDA definition of "processing aids" are those specified agents, used according to a HACCP method in a specified process, in a USDA acceptable decontamination process and wherein USDA allows the use of agent(s) without the requirement to disclose the use or presence of the agent(s) in the essential information shown on a label affixed to the finished and packaged meat product.

Sodium ions, naturally present in meat, such as in lean beef that contains about 0.1% sodium chloride, can assist in lowering the pH of the carbonic acid. Additionally, the natural acid "buffering effect" of meat can be minimized by adding an overwhelming amount of pressurized carbon dioxide, combined with any added sodium compound(s), including sodium chlorite. These conditions can cause production of a low pH acid at the meat surfaces, which is lethal to pathogens when the pathogens remain in this environment for an effective period of time. Mass-flow control of meat through the pressure vessel, in combination with control of carbon dioxide density and pressure, sodium ions, and water, within the vessel, enables the control of pathogens present at the meat surfaces. The exposure period is related to the residence time within the treatment vessel, which is determined by adjusting the mass flow rate of meat through the vessel. The low pH condition, can be enabled upon positive displacement pumping creating the desired high pressure and the very low pH condition can be terminated by pressure reduction upon extraction of the meat from the treatment vessel and into a controlled lower pressure vessel. Such pH control enables use of an acid shock treatment (AST) that is highly lethal to pathogens, while the deleterious effects to the meat, that over exposure to a pH of about 2 would otherwise cause, are substantially limited. This continuous decontamination process can be used to treat meat in combination with other suitable bactericidal treatments, such as irradiation.

The system according to the invention can measure the mass flow of the meat and proportionately add water and carbon dioxide. The amount of added water can be adjusted to compensate for moisture losses due to dehydration, and/or to ensure product labeling is not required.

In another embodiment, meat or vegetables, can be treated with ethanol and/or lactate prior to exposure to carbonic acid. The ethanol and/or lactate can be applied to the food, in a manner that will ensure exposure of substantially all surfaces to the ethanol/lactate, prior to transfer into a pressure vessel containing carbon dioxide and water, and at a pressure of about 550 psig or greater, and at a temperature of about 40° F.

Under such conditions, carbonic acid can have a pH of about 2 to about 3. The combination of ethanol and/or lactate with carbonic acid creates an environment lethal to pathogens, including any acid-adapted *Escherichia-coli* 0157:H7. When *E. coli* is exposed to an ethanol, of about 5%, and lactate combination at a pH of about 3, the collapse of the cytoplasmic pH can occur suggesting that cell membrane permeability to protons is compromised and/or the capacity to pump protons out of the cell is reduced, causing death to the bacteria. The conditions when goods, such as meat, are exposed to liquid and/or dense vapor carbon dioxide, can be comparable. The high solvent property of liquid carbon dioxide can be a perturbant (similar to that of ethanol) to the cell membrane and the pH of carbonic acid (formed by combination of carbon dioxide and water) at about 36 degrees F., and 600 psig is about 3. Therefore, when the goods are exposed to liquid carbon dioxide and/or very dense carbon dioxide vapor, the population of *E. coli* (and other bacteria) can be reduced by about 4 log, in about 5 minutes of exposure.

The density of the pressurized carbon dioxide can be at least about equal to or higher than about 20 lbs/cubic foot, such that when the meat and dense carbon dioxide are in contact and agitated and located together in a treatment pressure vessel and agitated, the carbon dioxide will assist in opening and separating any flaps, slits, cracks and/or leaves that may be enclosing pathogens in a location protected from exposure to the lethal agent or combination of agents intended to kill the pathogens. Following treatment with carbonic acid, as disclosed, the meat can be exposed to a low dosage irradiation source such as e-beam, or x-ray of sufficient intensity to kill substantially all remaining weakened pathogens.

Figure 30:
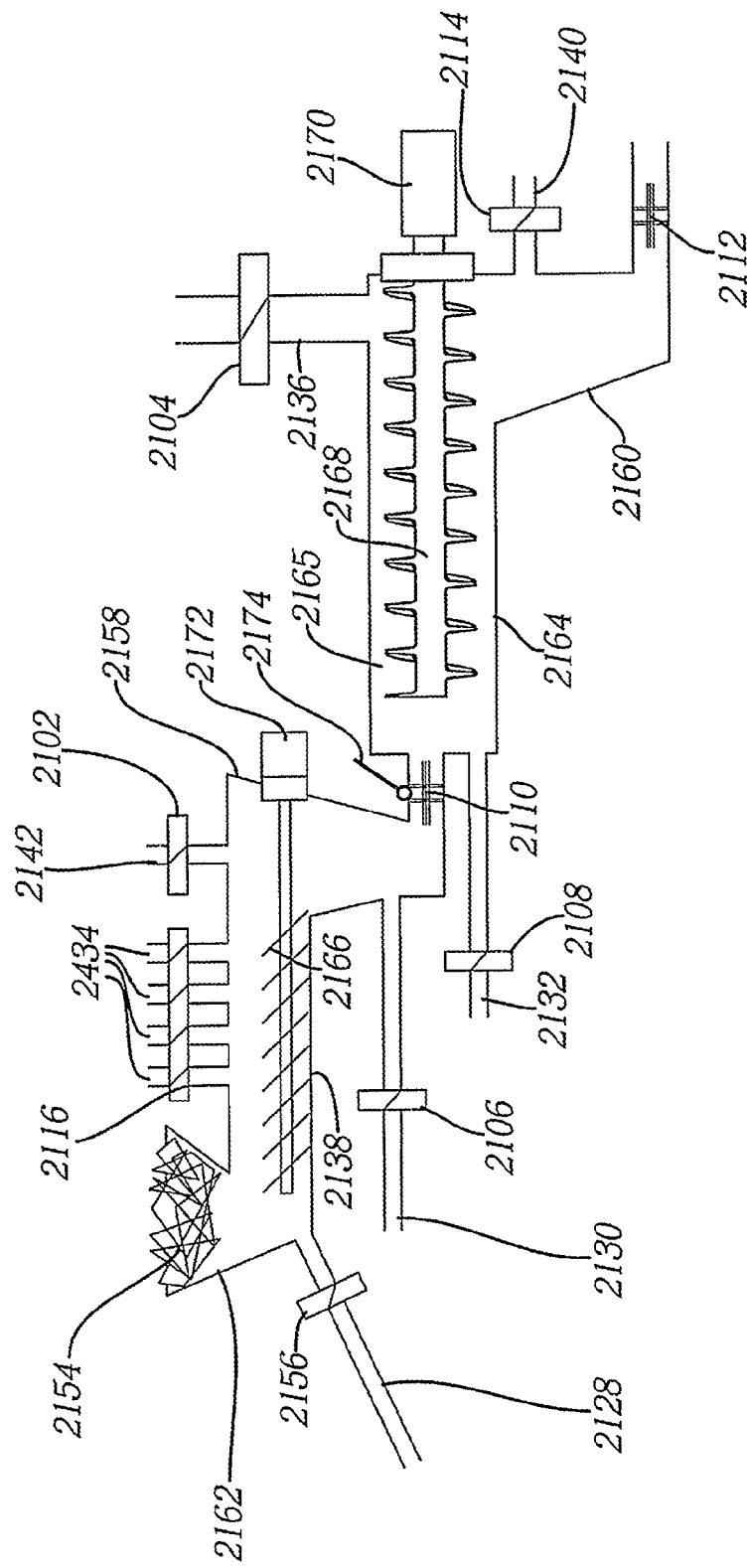
FIG. 30 shows a schematic illustration of an apparatus according to the present invention.

Referring now to FIG. 30, an apparatus arranged to process goods, such as meat including boneless beef, is schematically illustrated. Meat 2154 is loaded into hopper 2162. Hopper 2162 is connected to a horizontal conduit 2138. An auger 2166 is mounted within conduit 2138, and is attached to a drive motor 2172. Auger 2166 can carry meat through conduit 2138. A series of ports, 2434, 2142, 2128, and 2130, are connected to the horizontal conduit 2138 with valves 2116, 2102, 2156, and 2106, respectively, arranged to open and close when desired. Ports 2434 are arranged to allow a solution of sodium chlorite, which may be atomized to create a "fog," that is then transferred into conduit 2138 so as to contact the meat as the meat is transferred through conduit 2138 to expose the meat to the solution of sodium chlorite. Ports 2128 and 2130 are arranged to transfer carbon dioxide gas, so as to substantially displace all air that may be present within the conduit 2138. After transfer along the conduit 2138, the meat 2154 is deposited into hopper 2158, which is mounted directly above positive displacement pump 2110. Port 2174 is attached to a vacuum source so as to enable removal of gas that may be carried with the meat. The positive displacement pump 2110 is connected to a variable speed drive motor (not shown) so that meat 2154 can be pumped, at on elevated pressure of about 550 psig or greater, into pressure vessel 2164. Pressure vessel 2164 is horizontally disposed and is fitted with an auger 2168, connected to drive motor 2170. Ports 2132, 2140, and 2136 are connected to pressure vessel 2164 and are fitted with valves 2108, 2114, and 2104, respectively, that are arranged to open and close automatically. Port 2132 is arranged to transfer liquid carbon dioxide, into pressure vessel 2164 at a pressure of about 500 psig and port 2140 is arranged to extract liquid carbon dioxide from pressure vessel 2164. Port 2136 allows the escape of carbon dioxide gas, which can then be collected, and recycled into ports 2128, 2130 and 2132. A positive displacement pump 2112 is arranged to pump the meat into the next processing equipment, such as a grinder. The apparatus shown in FIG. 30 enables the decontamination of meat such as boneless beef, by exposing the surfaces of the meat to a very low pH acid having a pH of about 1 to about 2, for an effective period of time. The pH is achieved by mixing the meat with liquid carbon dioxide after having treated the surfaces of the meat with sodium chlorite. The pH of carbonic acid at about 550 psig is about 2 to about 3; however, with the addition of sodium ions (in the form of sodium chlorite solution), the pH can drop to about 1 to about 2. When the pressure is lowered after extraction of the meat, the pH can be elevated to about 5 to about 6. Meat can be treated for any selected period of time by controlling the mass flow of the meat into pressure vessel 2164 by pump 2110, and the speed of auger 2168 which transfers and mixes the meat with liquid carbon dioxide prior to direct transfer into hopper 2160. The meat from hopper 2160 is then transferred by pump 2112.

After grinding, the meat can be further treated by exposure to irradiation, including any e-beam treatment, while still being retained within a conduit substantially excluding oxygen of less than 5% by volume, or less than 3% by volume or less than 1% by volume or less than 300 ppm by volume.

Figure 31:
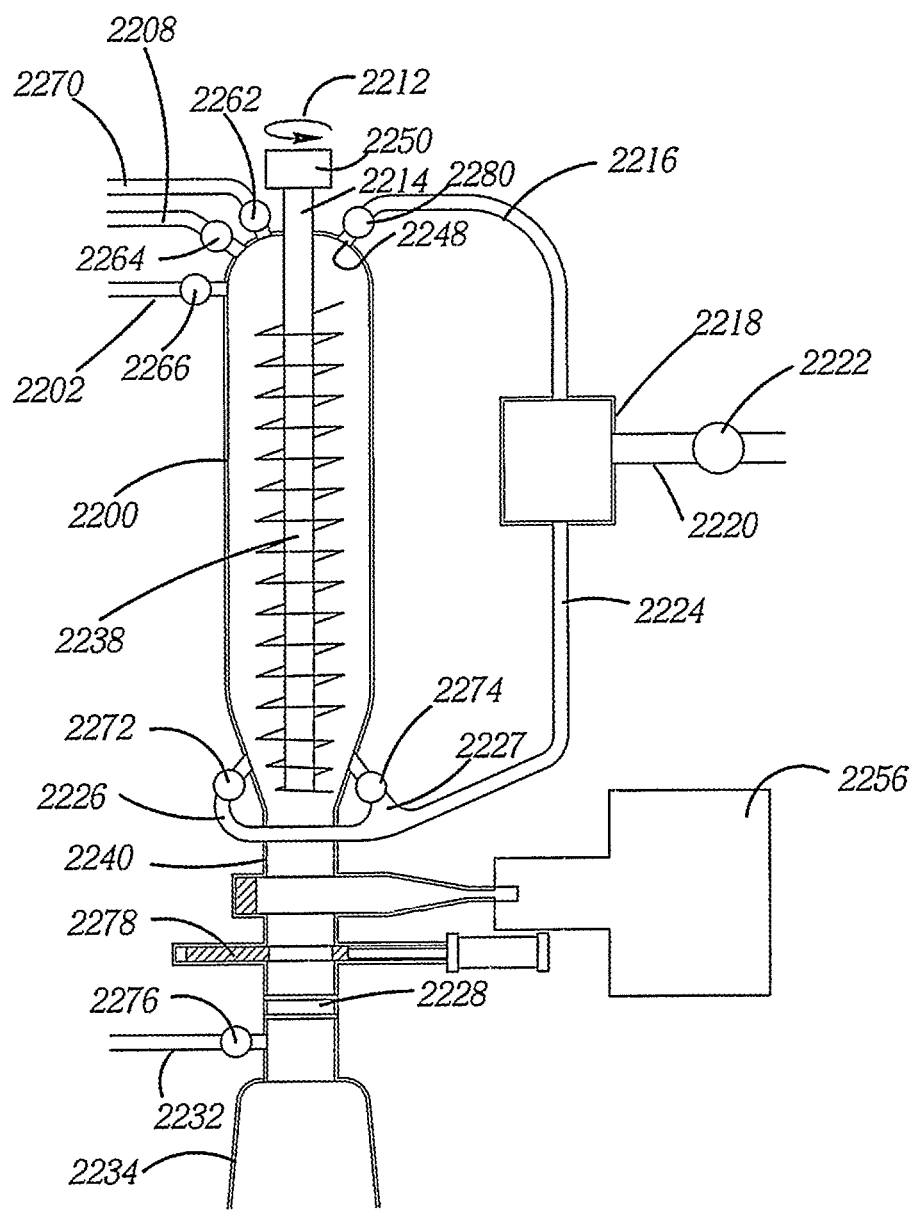
FIG. 31 shows a schematic illustration of an apparatus according to the present invention.

Referring now to FIG. 31, a cross section through an apparatus that can be used to decontaminate goods, including meat, is shown. A vertically disposed pressure vessel 2200 is arranged with a series of ports that communicate directly with the interior of vessel 2200. A centrally and vertically disposed stirring mechanism 2238 is attached to drive motor 2250 such that stirring mechanism 2238 rotates slowly in the direction shown by arrow 2212. A grinding plate 2228 is mounted in conduit 2240 with space allowed on the upstream and downstream sides of the grinding plate 2228. An e-beam generator 2256 can be located upstream of grinding plate 2228. Goods, such as meat, passing through conduit 2240 can therefore be irradiated before grinding. Exposure of goods to an e-beam can cause the death of any pathogens that may have survived the potentially lethal effects of the processing taking place in vessel 2200. The e-beam generator 2256 is shielded so as to protect any persons required to be present during the operation of the e-beam generator. A suitable irradiation generator includes a PRECISIONSCAN™ 500 Model, manufactured and sold by the Titan Corporation, of San Diego, Calif. 92121. Conduit 2240 is connected to an expansion vessel 2234 and a conduit 2232 is connected downstream of grinder 2228. Goods, including LFTB, can be pumped into conduit 2240 via conduit 2232. Goods pumped through conduit 2232 can be decontaminated prior to their introduction into conduit 2240. Other materials, including ingredients, that may be sensitive to decontamination by e-beam irradiation, and that may have been decontaminated by another method, such as by heat, can also be transferred into conduit 2240 at a controlled mass flow rate. A compressor 2218 is connected to an inlet conduit 2216, an outlet conduit 2224 and a pressure release conduit 2220. Pressure release conduit 2220 is fitted with a pressure release valve 2222, which allows the escape of carbon dioxide gas when the gas exceeds a pre-determined pressure setpoint. Carbon dioxide gas compressor 2218 extracts carbon dioxide gas via port 2248 from within vessel 2200. After compression of the carbon dioxide gas by compressor 2218, the compressed gas is then re-circulated into pressure vessel 2200, via conduit 2224 through ports 2226 and 2227 at the base of the vertically disposed pressure vessel 2200. Meat, such as boneless beef, is injected into the pressure vessel 2200 via conduit 2208 at a selected mass flow rate. A proportional quantity of carbon dioxide and water is injected via port 2202 into vessel 2200. The meat can be exposed to and blend with the water and carbon dioxide in vessel 2200. The meat will fill chamber 2200 to a pre-determined level before grinder plate 2228 commences grinding. In this way, the meat can be retained within pressure vessel 2200, for any selected and effective time. Carbon dioxide gas will be less dense than meat and water, and will therefore accumulate at the upper end of the vertically disposed pressure vessel 2200. Port 2248 is located and arranged to allow extraction of the dense carbon dioxide gas via conduit 2216. Compressor 2218 can raise the pressure of carbon dioxide by about 25 to about 50 psi and then recycle the compressed gas via conduit 2224, and through ports 2226 and 2227. The dense carbon dioxide gas can reticulate upwardly and blend with the meat held within pressure vessel 2200, which is agitated by agitator 2238, and in so doing can ensure that water contained within vessel 2200 is saturated with carbon dioxide, forming highly acidic carbonic acid. After an effective period, the meat can be extracted from the pressure vessel 2200 via conduit 2240, and pass by grinder 2228, which can be arranged to grind at a selected rate about equal to the rate of meat injected via conduit 2208. Conduit 2270 with valve 2262 is located at the upper end of pressure vessel 2200. Conduit 2270 can allow injection of any liquid or gas, such as carbon dioxide, at an elevated pressure, when valve 2262 is switched to an open position. Conduits 2208 and 2202 have valves 2264 and 2266, respectively. Ports 2226 and 2227 have valves 2272 and 2274, and conduit 2216 has valve 2280. Additionally, conduit 2232 has valve 2276, and conduit 2240 has valve gate 2278, wherein valve 2278 is interposed between grinder 2228 and vessel 2200. The purpose of valves 2264, 2266, 2262, 2280, 2272, and 2274, and gate valve 2278, is to isolate vessel 2200. Meat, water, and carbon dioxide are injected into vessel 2200 at a pressure of about 500 psia after closing gate valve 2278 and valves 2272, 2274, 2280. After substantially filling vessel 2200 with meat, water and carbon dioxide, valves 2266 and 2264 can be closed. In this condition, the pressure inside vessel 2200, is about 500 psia. Valve 2262 can be operated so that high pressure carbon dioxide gas and/or liquid can be transferred into vessel 2200. Carbon dioxide gas transferred through conduit 2270 can be at such pressure and volume so as to raise the pressure within vessel 2200 to a pressure higher than about 500 psia, such as about 850 psia to about 1000 psia. If required supercritical carbon dioxide can also be transferred into vessel 2200 via conduit 2270. By so doing, the pH of the carbonic acid and water at about 500 psig to about 850 psig, will decrease in a short amount of time to less than about 3. The increase in pressure can be produced suddenly to have a sudden and substantial pH reduction. When the pH of the liquid in contact with the meat is lowered, the reduction in pH can cause the death of pathogens, and decontamination of the meat. Other pathogens such as *salmonella* can also be killed in this manner. In addition, an e-beam generator 2256 can be arranged to irradiate the meat after processing in vessel 2200, and before grinding. The intensity of the electron beam generated by generator 2256 can be adjusted so as to enable goods in conduit 2240 to be exposed to the minimum intensity while still having sufficient capacity to kill any pathogens that may have survived the treatment in vessel 2200.

The process of e-beam irradiation has been used to kill pathogens on goods after packaging, therefore requiring that the packaging be also subjected to the e-beam irradiation. This results in an inefficient use of the expensive irradiation process. Packaging materials can be kept clean and without contamination by other less expensive decontamination processes (such as with the application of heat or Ultra Violet C). Accordingly, by decontaminating the goods and packaging materials separately, prior to assembly of the goods and packaging, a substantially more efficient method of decontamination is achieved. Efficiency is further improved when acid shock treatment and a reduced but adequate application of e-beam irradiation are combined.

Figure 32:
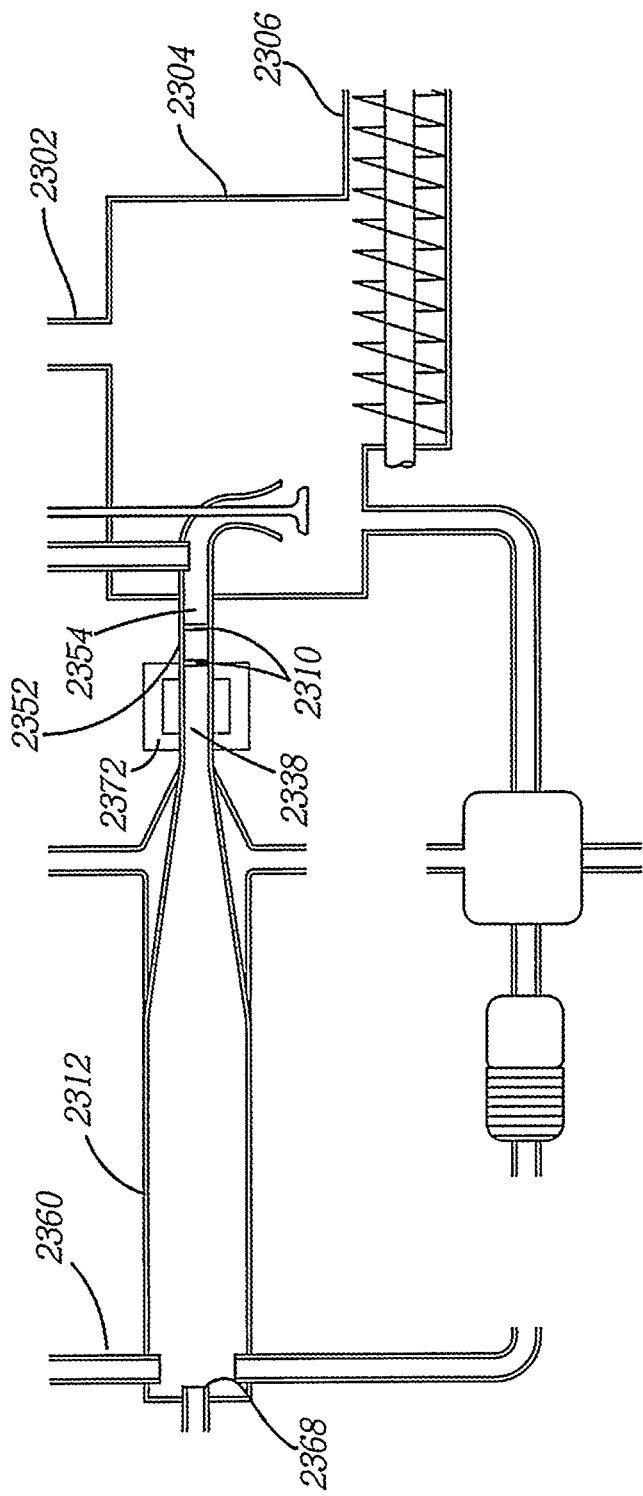
FIG. 32 shows a schematic illustration of an apparatus according to the present invention.

Referring now to FIG. 32, an apparatus constructed for use in decontaminating goods, such as meat, is shown. Two distinct but sequentially employed processes are combined wherein a first decontamination process incorporating pressurized carbon dioxide and water is arranged to precede a second decontamination process incorporating an electron beam (e-beam) generator.

The apparatus includes a first processing vessel 2312 having an entry port 2368 for the meat, and an entry port 2360 for carbon dioxide and water. The vessel 2312 can be operated at a pressure ranging from about 500 psia to about 800 psia. The vessel 2312 includes a transfer screw (not shown) to transfer the goods from the entry port 2368 at one end of the vessel to the opposite end. The transfer screw can additionally be configured to mix the goods. The vessel 2312 includes a narrow section that leads to a conduit 2338 of reduced diameter. The conduit 2338 has one or more grinders 2310. The conduit 2338 leads into a second vessel 2304. The vessel 2304 is operated at a reduced pressure as compared with the first vessel 2312. The vessel 2304 is operated at a pressure from about ambient pressure or about 15 psia to about 20 psia or any pressure that is below the pressure in vessel 2312. The vessel 2304 has a conduit 2302 located at an upper portion to vent any evolved gas or entrained moisture from the second vessel 2304. The second vessel 2304 also has an exit port 2306 for the meat.

In one embodiment, liquid carbon dioxide and liquid water are injected into port 2360 at a pressure from about 200 psia to about 500 psia or greater. The carbon dioxide and water can be measured and metered into vessel 2312. The amount of carbon dioxide can be based on the pH in the vessel, or on the pressure in the vessel, or based on the quantity of water or meat.

The horizontal vessel 2312 includes a transfer screw that may rotate about a longitudinal axis. This screw is arranged to cause the meat to blend and mix with the carbon dioxide and water at a pressure of about 500 psia or greater. The screw operates at a speed which will provide adequate retention time within the vessel 2312 to kill any microorganisms, including pathogens or bacteria, which may reside on the meat.

An electron beam generator 2372 can be integrated so as to enable the irradiation of meat, as the meat is transferred along the horizontal conduit 2352 and before the goods are ground by grinder 2310.

A blend of gases, including carbon dioxide with a small quantity of carbon monoxide can be used. Carbon monoxide causes a red color in pork, beef and other meats. The resultant color is a vivid bright red and will remain bright red for several weeks and well beyond the point in time when other red meat, not exposed to carbon monoxide, but normally exposed to oxygen or ambient atmosphere will normally become discolored. This discoloration is undesirable and occurs as a result of gray-brown colored metmyoglobin forming at the surface of the meat. Red meat intended for human consumption may be exposed to any approved gas, such as carbon dioxide, having a carbon monoxide content less than 0.5%. Such a small amount of carbon monoxide would not normally be sufficient to cause the vivid red color staining, however, the effect of carbon monoxide is cumulative, such that when meat is exposed for an effective period to a blend of gases containing 0.5% carbon monoxide and 99.5% carbon dioxide, the cumulative effect can enable the generation of the vivid red color. This can be accomplished when a blend of gases comprising an amount of carbon dioxide about 99.5% of the combined gas blend and an amount of 0.5% carbon monoxide is compressed and used in the process described herein. Accordingly, such a blend of gases can be used at such selected pressure and temperature that will enable decontamination as desired and can also enable color enhancement of the red meat so as to minimize discoloration.

Referring once again to FIG. 32, from the grinders 2310, the contents of the high pressure vessel 2312, including meat, carbon dioxide, and water, are emptied into a low pressure vessel 2304, via interposed conduits 2338, 2352, and 2354. The low pressure vessel 2304 is operated at a pressure which is lower than the high pressure vessel 2312. The pressure in vessel 2304 can be anywhere ranging from about atmospheric pressure to slightly below the pressure of the high pressure vessel 2312. Carbon dioxide is vented through an outlet port 2302 from the low pressure vessel 2304. The vented carbon dioxide may contain moisture. The decontaminated meat is transferred out of the low pressure vessel through a port 2306 located at the lower section of the vessel 2304, and can be further processed. Many of the components of the apparatus shown in FIG. 32 have not been discussed, but it is intended to have them operate in the manner described in association with FIGS. 3, 5, and 23. Processing with irradiation prior to packaging is advantageous when compared to the costs of irradiation of the same goods in the package. This is, in part, due to the inefficiencies created by the relative increase in the total volume of the packaged goods. Such increase is often at least 100% more than the volume of the goods alone. A range of packaging materials are suitable for processing by irradiation and are invariably more expensive than alternative materials that will not withstand irradiation. A material such as polypropylene can tolerate relatively high irradiation doses. Conversely, packaging materials such as UPVC and pPVC will become discolored and brittle. PVC will turn an unappealing brown color. Furthermore, the use of irradiation after packaging requires the displacement or removal of any oxygen from contacting goods, such as meat, that contain fats, that will quickly become rancid due to ozone production caused by the irradiation. Goods such as ground meat or sausage can be irradiated with electron beam, x-ray or gamma irradiation after loading in PVC, UPVC, and pPVC trays, and prior to stretch sealing with a web of lid material which may be low cost pPVC.

Figures 33, 34:
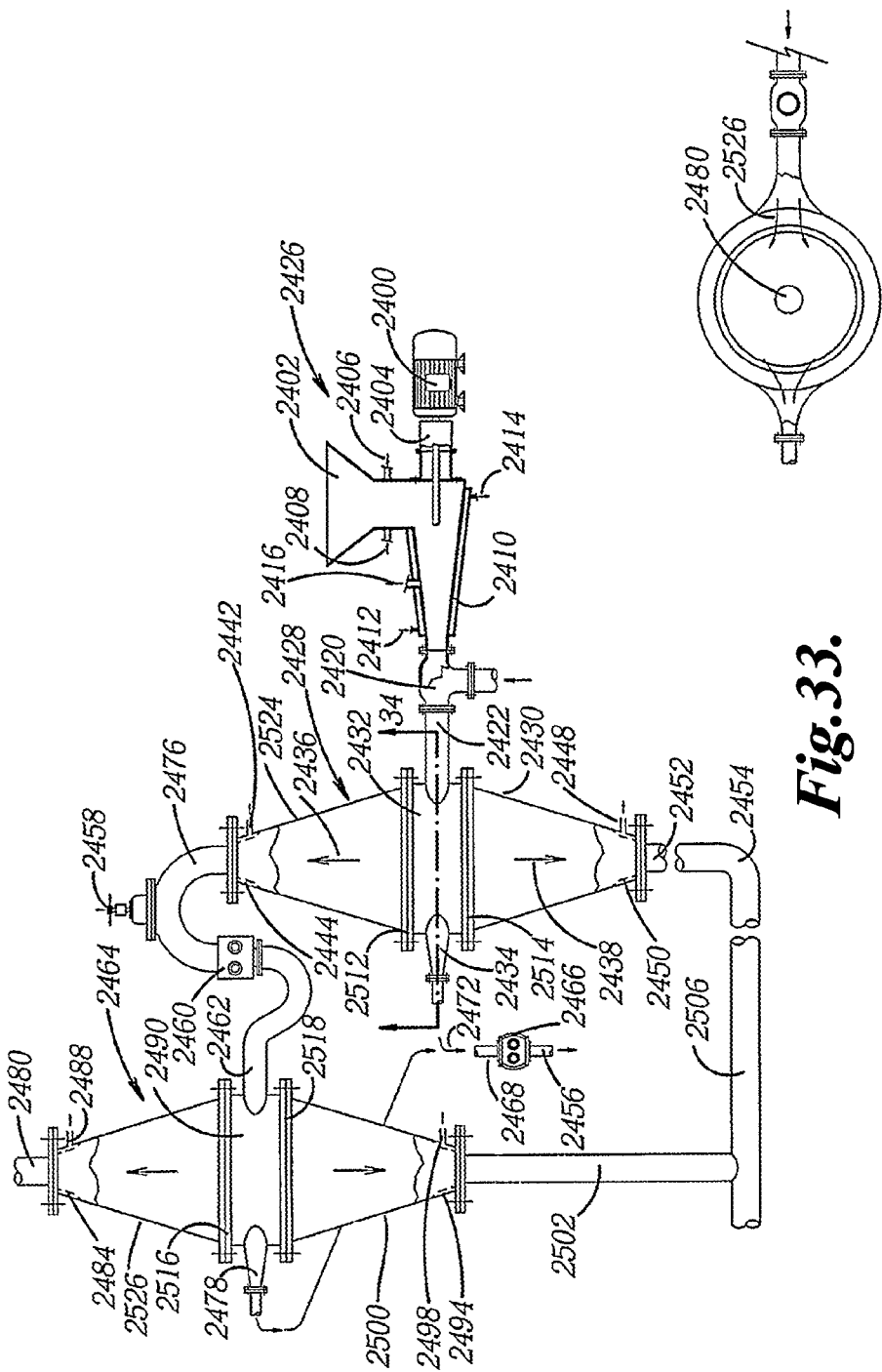
FIG. 33 shows a schematic illustration of an apparatus according to the present invention.
FIG. 34 shows a cross sectional illustration of the apparatus of FIG. 33.

Referring now to FIGS. 33 and 34, illustrations of equipment intended for use in the separation of lean meat from fat are provided. The equipment includes a grinder pump 2426, and two vessels 2428 and 2464 to operate in the manner described below. Grinder pump 2426 may be a modified Weiler pump Model No. 1109. A motor 2400, drives a screw (not shown) located within grinder pump 2426, via a gearbox 2404 to direct a fat stream with lean meat through a grinding plate which may have grind apertures about 1 inch in diameter, for example. The grinding plate is located between the mixing chamber 2420 and grinder pump 2426, and is not shown. A stream of mostly fat containing some lean meat is introduced through hopper 2402. A gas, such as carbon dioxide or any other suitable gas or blend of gases, is injected into hopper 2402 through ports 2406 and 2408. Such gas is provided at a pressure and volume that can displace air from hopper 2402. A vent nozzle 2416 allows excess gas to escape. The vent may be fitted with a valve to control the escaping gas. A water jacket 2410 is provided to inject heating or cooling media for temperature control of grinder pump 2426 and its contents. An inlet port and outlet port, 2412 and 2414, respectively for the medium are provided. The purpose of the jacket 2410 is to adjust the temperature of the grinder screw housing in such a way that heat transfer will adjust the temperature of the fat stream as it is transferred along the screw. Any suitable media may be used as a heat exchange medium, such as glycol. Ground fat and lean meat is transferred from grinder pump 2426, through grinding plate and into mixing chamber 2420. A fluid comprising a blend of liquid carbon dioxide and water is transferred along with fat and lean into mixing chamber 2420. The fluid can be blended at a pressure of about 600 psig and the pH of this fluid can be about 3. When combined with the fat and lean stream, the pH may drop to less than about 2 and will therefore assist in the decontamination of the fat lean stream. Reduction of pH can occur as a consequence of sodium ions that are present in the form of sodium chloride in the fat lean stream. Sodium chloride or any other suitable salt, including sodium chlorite, may be added. The quantity of fat lean grinds transferred into mixing chamber 2420 may be at any flow rate and the fluid flow rate (of the blended liquid carbon dioxide and water) may be a flow rate that is a multiple of the grinds flow rate, and can be about one-half to about four times the flow rate of the fat lean stream. The combined streams of fat lean and fluid are transferred along the conduit 2422. A separating vessel 2428 comprises a centrally disposed tube section 2432, with an upper cone 2524, and a lower cone 2430, both attached to tube section 2432 at flanges 2512 and 2514, respectively, in a pressure tight manner. The upper interior end of cone 2524, includes an annular space 2444, defined by a perforated wall located adjacent the outer wall of cone 2524, wherein the annular space 2444 is connected to port 2442. Similarly, at the lower interior end of lower cone 2430, an annular space 2450 is defined by a perforated wall connected to port 2448. The blended fat lean stream from grinder pump 2426 and fluid is transferred into the tube section 2432. The specific densities of water, fat, and lean meat are different and the differences in density can be used to separate the components in vessels 2428 and 2464. The specific density of water is about 1.0. The specific density of fat is less than 1.0, and the specific density of lean meat is greater than 1.0. Therefore, the fat lean stream will separate by components. Fat will move upward in cone 2524, and lean meat that will move downward in cone 2430. The specific density of the fluid may be adjusted (elevated) by adding sodium chloride, sodium chlorite, or any other suitable salt. For example, sodium chloride may be added to the carbon dioxide and water so as to adjust the specific density to be substantially the same or slightly less than lean meat. In this way, the fat component can separate more rapidly. Separating lean meat from the fluid can be achieved by extracting the fluid through the perforated section 2450 in the lower end of the cone 2430 through port 2448. Fluid can also be extracted through port 2442 at the upper end of cone 2524. The respective components of fat and lean are directed according to density so that the fat component will be drawn upwardly within cone 2524 and the lean component will be drawn downwardly through cone 2430. Additional fluid can be extracted through manifold 2434. The total amount of fluid extracted via ports 2442 and 2448, and manifold 2434, can be about equal to the volume of fluid blended with the fat lean stream in mixing chamber 2420. The separated fat component can be transferred upwardly and into conduit 2476 and the lean component will be transferred into conduits 2452 and continuing into conduits 2454 and 2506. Conduit 2476 can have a pressure relief valve 2458 at the uppermost location. Pressure relief valve 2458 can enable the venting of excess gas according to the pressure relief valve setting. A pump grinder 2460 can be located between conduit 2476 and conduit 2462 leading to a second separation vessel 2464. Pump grinder 2460 is arranged to grind the stream therethrough, with a grind size of less than one-half inch, for example. After grinding, the stream is transferred through conduit 2462, and into vessel 2464.

Vessel 2464 includes an annular tube section 2490 attached to an upper cone 2526 and a lower cone 2500, at flanges 2516 and 2518, respectively. Any lean meat in the stream transferred into vessel 2464 will be transferred downwardly into cone 2500, and the fat component will be transferred upwardly into cone 2526, and ultimately through conduit 2480. Such fat can be considered a waste stream that can be transferred to a rendering plant. Lean meat is transferred through conduit 2502. Annular space 2484 in upper cone 2526 is in communication directly with port 2488, allowing fluid to be extracted therethrough. Similarly, annular space 2494, located at the lower end of the lower cone 2500, is attached to port 2498 in such a manner as to allow extraction of fluid. Fluid transferred with the fat stream into tube section 2490 can be extracted through ports 2488 and 2498 and via manifold 2478. Fluid extracted through ports 2442, 2448, 2488, 2498, and manifolds 2478 and 2434, can be connected to a common pipe 2468, that leads directly to a compressing pump 2466, with downstream pipe 2456. Fluid thereby collected and transferred through pipe 2456 can be filtered, adjusted in temperature, and then transferred and measured, into mixing chamber 2420. Lean meat transferred through conduits 2502 and 2452, are combined together in conduit 2506. This combined lean stream product can be incorporated in the production of ground meat.

Valves and pressure release valves can be provided on all ports and arranged to open and close in a manner allowing transfer of material therethrough at selected flow rates that can be automated and controlled by a computer.

Agents for use in the present invention may include any selected temperature and pressure controlled, liquefied or vaporized gas or a blend of liquefied or vaporized gases including carbon dioxide and/or any atmospheric gas(es), carbon monoxide, ammonia or any other suitable gas or processing aid including water or any agent(s) including sodium citrate, sodium chlorite, tri-sodium phosphate and/or sodium chloride or any combination thereof, that may be dissolved in water (or carried as a suspension therein), and that can be mixed with any liquefied or vaporized gas or gases.

Carbon dioxide, at a pressure above about 1,056 psig and at a temperature above about 87.82° F., is at the critical temperature and pressure. Carbon dioxide cannot exist as a liquid under these conditions. Below 1,056 psig and 87.82° F., carbon dioxide can exist as a liquid and a gas or a saturated vapor. The specific volume (density) of carbon dioxide at 1,056 psig is about 0.03453 ft$^3$/lb (or 28.96 lbs per cubic foot). The maximum density of water occurs at 39.2° F. (4° C.) when 1 cubic foot weighs about 62.4 lbs. However, the density of carbon dioxide at 40° F. is about 55.99 lbs per cubic foot. Therefore, liquid carbon dioxide can float on water at 40° F. when the water is saturated with dissolved carbon dioxide. A temperature of about 109° F. is the maximum temperature of a beef carcass following death. Fresh beef will freeze, at least partially, when its temperature is reduced to below about 28.5° F. At about 26° F. or below, fresh meat will freeze. It is therefore desirable that the processing temperature range for meat is maintained at above about 28.5° F. and below about 109° F. The density of carbon dioxide at 28° F. is about 58.58 lbs/cubic foot. The density of fat is slightly lower than the density of water and the density of lean meat is slightly more than the density of water. In each case, the density of fat and beef will vary according to its water/moisture content.

One aspect of the invention provides a method to produce processed meats having a water content that can be controlled to within any limits. When exposed to ambient, dry, or refrigerated air, fresh beef will undergo dehydration at a rate of about 1% per 24-hour period. The dehydration rate can be used to calculate and meter water used as a processing aid to compensate for the water loss or to adjust the water content of meat to any selected level. As indicated in a Draft Directive recently issued by the FSIS division of the USDA, it is understood that USDA intends to impose new regulations that will allow compensation for loss of moisture due to such dehydration by addition of an amount of water, derived only from water contained in an agent as a processing aid of said agent. The natural, original weight of meat harvested from a freshly killed carcass, cannot be exceeded by 0.5% of its natural weight, and that any added water must be less than 0.5% of the original, natural weight of the beef.

Figure 35:
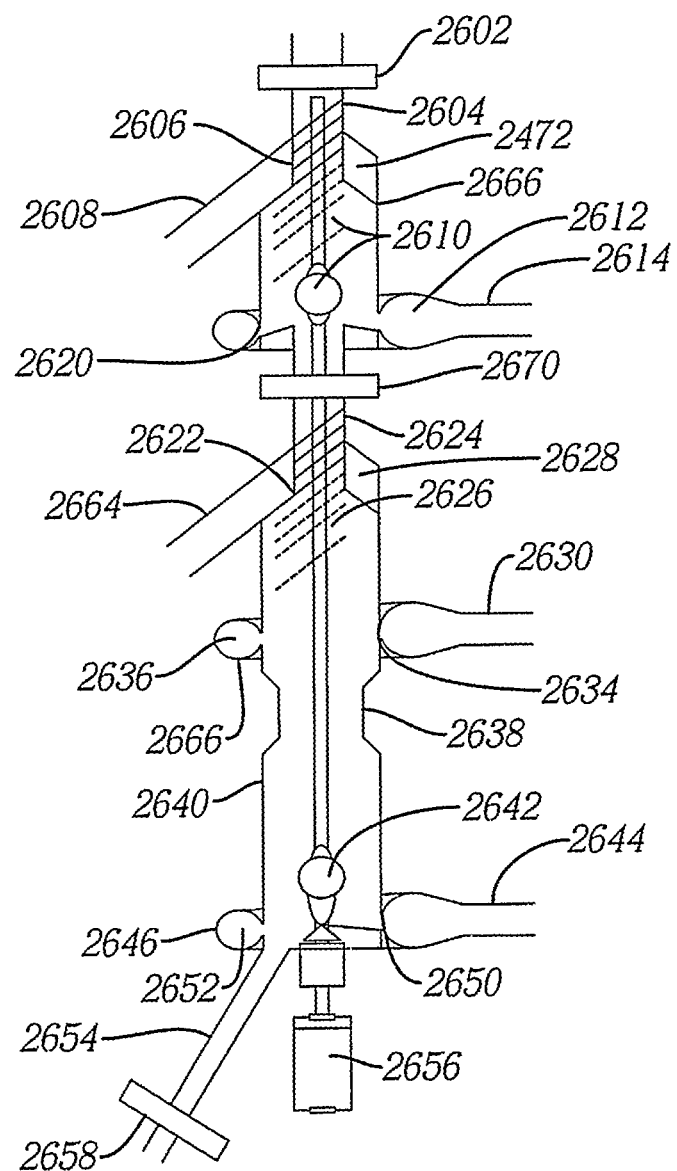
FIG. 35 is an illustration of one embodiment of an apparatus according to the present invention.

Referring now to FIG. 35, one embodiment of an apparatus, constructed for the purpose of processing food products, including meat, and in particular for separating fat from a continuous stream of lean meat and fat, is shown. Furthermore, the apparatus is arranged to apply suitable agents, to the stream of lean meat and fat, that can extend the shelf-life as compared with non-processed products by, for example, reducing the number of bacteria present with the food product(s), such as *E. coli* 0157:H7, *Salmonella*, *Listeria Monocytogenes*, and other pathogens and also by improving the appearance and/or color of the processed meat. After processing, the meat can be packaged immediately by direct transfer to a packaging system, via a continuous and enclosed conduit, without exposure to other vectors of recontamination (such as exposure to airborne *Listeria Monocytogenes*) that may otherwise reinfect the meat.

The processes disclosed herein will provide accurate temperature control of the agents, including the meat being processed, to below about 109° F. and above about 28.5° F. The pressure of any agent that comprises carbon dioxide, or a combination of agents including carbon dioxide, will be maintained within reasonable and safe limits, including not more than about 2000 psig. The amount of added water that remains with the meat, after processing can be controlled at any level.

Carbon dioxide can be useful for adjusting the fat content of a stream (or batch) of boneless meat. When carbon dioxide is held at a temperature and pressure above the critical point, the supercritical carbon dioxide fluid can act as a solvent that can remove fat from lean meat. When meat is exposed to carbon dioxide at or above the critical point, fat can be separated from lean meat by measuring the fat content (and the moisture content) of the meat prior to treatment, followed by treatment with accurately measured and controlled quantities of carbon dioxide above the critical point and at a specified temperature and pressure for an effective time period, and also treated with water alone or together with a processing aid, so that a specified quantity of fat can be removed from the meat, and the moisture content can be raised to the level before dehydration. In this way, when meat is exposed to a controlled quantity of supercritical carbon dioxide for a selected period of time, a predictable amount of fat can be removed from the meat.

Referring to FIG. 35, effective time can be adjusted by increasing or decreasing the mass flow of meat flowing through the treatment conduit 2640. The meat is extracted via conduit 2604 after having been processed through numerous treatment sections. By controlling the exposure time of meat to supercritical carbon dioxide, the fat content of the meat can be adjusted. Fat is removed from the conduit 2640 with supercritical carbon dioxide via ports 2608 and/or 2664. These streams of mixed fat and supercritical carbon dioxide can be separated into two streams, one substantially fat and one substantially carbon dioxide, followed by chilling and packaging or rendering the fat (tallow) and after conditioning, filtering, and compressing, the carbon dioxide can be recycled into the treatment conduit 2640.

In one aspect of the invention, a method is provided for measuring and recording the natural weight of post mortem beef, that is harvested from carcasses prior to significant weight loss due to dehydration. The weight data can be used to establish a typical weight loss due to dehydration that can occur during a refrigeration process. The meat can be hydrated through a process of controlled hydration from "processing aid" water contained with any decontaminating agent.

In one aspect of the invention, a method is described for separating fat from lean meat, and for simultaneously decontaminating the meat by reducing the bacteria on the surfaces of the meat with the carbon dioxide used to separate the fat.

In one aspect of the invention, a method is described for adjusting the fat content of meat, according to a specified fat content requirement, prior to grinding the meat to produce ground meat with a fat content as desired and within a tolerance of about +/−0.25% of the desired fat content. According to the invention, it would not be necessary to cut any fat cover from the meat prior to processing with carbon dioxide, since the fat will dissolve in the carbon dioxide and be removed therewith. The method of the invention has many benefits over the existing system of ground chuck production, for example. Firstly, the method according to the invention requires less labor to harvest the boneless beef chuck primal from the carcass and secondly, the method results in less contamination. The need for the commonly practiced process of LFTB production from the discarded fat stream produced in all beef boning operations, is eliminated. The problems associated with cross contamination and bacterial growth are also eliminated.

Additionally, the meat can be processed by exposing its surfaces to carbon monoxide so as to enhance the color of the meat wherein the carbon monoxide can be blended with another gas, including carbon dioxide, in proportions of not more than about 0.5% carbon monoxide with the balance being substantially carbon dioxide. Carbon monoxide can also serve as a decontaminating agent by killing or injuring bacteria that may be present at the meat surfaces.

Referring again to FIG. 35, a series of conduits capable of withstanding high pressure is connected together to enable continuous processing of meat. The apparatus is manufactured from heavy gauge stainless steel, or any other material of construction suitable for meat. The meat can be transferred through an inlet conduit 2654, and ultimately after processing, extracted via conduit 2604. Conduit 2640 is arranged with three inlet ports and two outlet ports. Product inlet conduit 2654 is attached to an end of conduit 2640, and has a moisture and fat analysis apparatus 2658 mounted thereon. Any suitable measuring equipment can be used, such as an apparatus referred to as GMS, and manufactured by Thermo Moisture Systems, of Chelmsford, Mass. 01824.

Ports 2644 and 2630 are arranged to communicate directly with the interior of conduit 2640 via annular connections 2646 and 2666, with annular spaces 2652 and 2636, respectively, which are connected via an annular slot or a series of slots 2650 and 2634, respectively. Ports 2664 and 2608 allow for the removal of agents and other materials extracted from the meat being processed in conduit 2640. Variable speed motor 2656 is mounted at an end of conduit 2640 and coupled directly to a shaft with paddles and screw fixtures 2642, 2626, and 2610. Processing conduit 2640 has a restriction 2638, which is a narrowing of the vessel 2640 diameter that can pressurize the meat being processed. Perforated section 2622 is provided and arranged to match screw profile 2626, in such a way that solids will be forced to follow conduit 2624, and liquids will pass through perforations into space 2628 and be exhausted through port 2664. Valves and pressure regulators are fitted on conduits to provide adjustments required for the processing of meat including the control of the residence time of the meat being processed in conduit 2640. The apparatus is controlled by a suitable PLC or computer, enabling automated operation according to any program developed and found to be suitable in the processing of the meat. The PLC or computer is arranged to control the mass flow rate of meat and any agents into conduit 2640, and extraction therefrom and also to control variable speed drive motor 2656. By adjusting the mass flow of meat and agents transferred into conduit 2640, the residence time and the effect of the agents on the meat being processed can be controlled accurately, and in a manner that will enable optimum production rates.

Conduit 2624 is connected to a second processing conduit 2666. A third agent inlet port 2614 is provided with connection to the annular space 2612 and annular slot 2620. Paddles and screws 2610 are arranged to mate with the perforated section 2606 so as to enable the extraction of liquids or gases from conduit 2666 in a manner similar to that described for conduit 2640. At this point, agents and meat can be divided into two streams, wherein the solid items are transferred along conduit 2604 and through moisture and fat measuring device 2602, and liquids and gases pass through perforations into space 2472 and then are exhausted through conduit 2608. With the above described apparatus, meat can be processed with agents that blend with the meat and are exhausted through conduits 2664 and 2608. Suitable agents may be liquids, solids, or gases or supercritical fluids, provided at any temperature and pressure for decontamination, separation, rehydration, or for any other purpose. The apparatus as described above can be used to process a range of food products, including meat, such as boneless beef, by exposure to carbon dioxide gas pressurized and heated to greater than about 1056 psig and above about 88° F. Such carbon dioxide can be provided through ports 2644, 2630, and 2614 at a pressure of about 1100 psig and at a temperature of about 90° F., and transferred into the processing conduits 2640 and 2666 to mix with the meat provided therein at a temperature of about 35° F. to about 40° F. The carbon dioxide, under these conditions, will enable the removal of fat from the meat, which can then be removed with the processing gas or liquid through conduits 2664 and 2608. The meat, which will then comprise lean meat having reduced quantities of fat, can be transferred through conduit 2624, into conduit 2666. As it is transferred through conduit 2624, the fat and moisture content can be measured by the measuring device 2670 prior to entry into conduit 2666. Based upon the measured fat and moisture content, additional carbon dioxide with a measured quantity of water can be transferred into conduit 2666 via port 2614 to further adjust the moisture and fat content of meat. Additionally, carbon dioxide can dissolve in water to produce carbonic acid of low pH that will cause inactivation of microorganisms, such as pathogens. Additional agents may be added to further decrease the pH. Agents, including sodium chloride, sodium chlorite, and any other salt, can be used. Carbon monoxide, water and buffered sodium citrate or sodium chloride may be added to carbon dioxide, for example. Carbon dioxide and water can be adjusted in pressure and temperature according to the measured amount of fat and moisture of the meat. Moisture can be added and fat removed through the process to produce a finished decontaminated product of desired fat and water, and thereafter measured to confirm the accuracy of the process.

The embodiment of the apparatus shown in FIG. 35 can be used as a series of similar vessels in sequence or can be used as a single processing apparatus.

In one aspect of the invention, the beef exiting conduit 2602 may further be decontaminated using x-ray or electron beam (e-beam). A series of these partially effective decontaminating steps when put together can combine for complete decontamination. Multiple hurdle decontamination may avoid damaging the meat as compared to any single-step decontamination technique. A series of mild decontaminating steps are as effective as a single, strong application of any decontaminating technique without having the detrimental effect of possibly damaging the meat.

The process provides simultaneous extraction of measured quantities of fat from a mass flow controlled stream of meat, enclosed in a sealed, pressurized, heated, and temperature controlled conduit to enable production of decontaminated meat having a selected fat and water content.

A sanitizing agent, including ozone, can be used to disinfect the apparatus without the need to open the vessel. To this end, the apparatus can be constructed without sharp corners to eliminate dead areas where meat may remain stagnant. The apparatus can be used with a clean-in-place system that does not require the apparatus to be opened for cleaning and sanitizing. Cleaning may be conducted with any suitable agent, such as steam or ozone.

Figure 36:
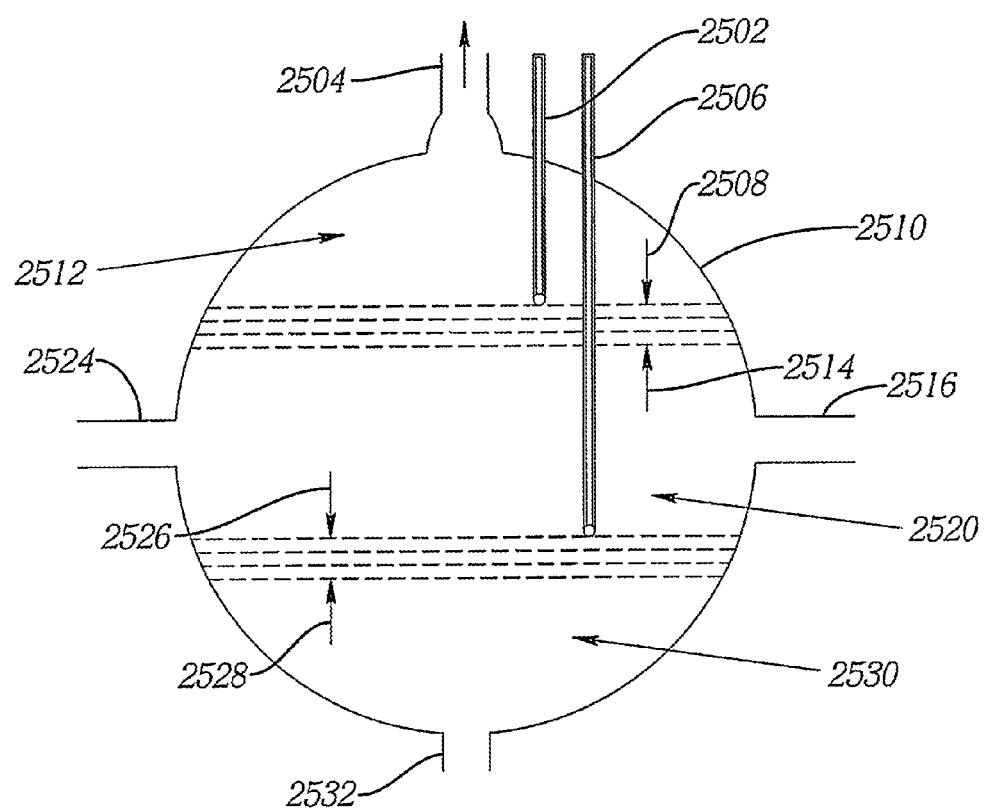
FIG. 36 shows a schematic illustration of an apparatus according to the present invention.

Referring now to FIG. 36, an illustration of a pressure vessel 2510 which can be used in the separation of fat from lean meat using supercritical carbon dioxide, is provided. The shape of the pressure vessel 2510 may be any suitable shape; however, in FIG. 3, the pressure vessel 2510 is shown generally as a spherical vessel to allow for efficiencies in construction and the capacity to safely withstand pressures in excess of 1056 psig, and in particular, the minimum pressure and temperature or any pressure and temperature at which carbon dioxide can exist in its supercritical phase. The pressure vessel 2510 is shown with a single inlet port 2516 and three outlet ports 2504, 2524, and 2532. However, the use of fewer or additional ports is permissible. The vessel enables the separation of fat from lean meat, with supercritical carbon dioxide. In the present apparatus, supercritical carbon dioxide is blended with a stream of fat that can contain less than about 50% lean meat. However, other embodiments may contain greater than 50% lean meat. Prior to introduction into vessel 2510, the stream of fat and lean meat can be passed through a squeezing mechanism (not shown) that crushes the fat, enabling rapid contact between the fat and the supercritical carbon dioxide. The mixture of fat, lean meat, and carbon dioxide is transferred along a conduit (not shown) while being held at a pressure in excess of about 1056 psig and a temperature in excess of about 87° F., or at such pressure and temperature that ensures the carbon dioxide transferred along the conduit is maintained in a supercritical condition. On exposure to supercritical carbon dioxide, fat will liquefy and blend with the carbon dioxide. However, lean meat will remain in a relatively unchanged condition. The mixture of supercritical carbon dioxide, fat, and lean meat, is pumped into the vessel via port 2516. Supercritical carbon dioxide has a specific density of about 25 pounds per cubic foot. Lean meat has a specific density greater than 63 pounds per cubic foot, and fat has a specific density less than the specific density of lean meat. Therefore, supercritical carbon dioxide will quite rapidly stratify to the upper level 2512. Lean meat will stratify by dropping to the lowest level 2530, and the liquefied fat will tend to remain in the central area 2520. Pressure vessel 2510 may be fitted with instrumentation for monitoring or metering any stream into or out of pressure vessel 2510. Instruments may determine fat, lean, and moisture content of any stream. Immediately prior to the transfer into pressure vessel 2510, the fat content of the stream is measured, and therefore, the quantity of lean meat can be estimated since the amount of carbon dioxide can also be measured. The amount of carbon dioxide mixed with the fat/lean meat stream can likewise be measured and therefore each stratified item can be extracted from vessel 2510 based on the known mass flow. The liquefied fat can be extracted via port 2524 in the center of vessel 2510. The carbon dioxide can be extracted via port 2504 in the upper section of vessel 2510, and the lean meat can be extracted via port 2532 in the lower section of vessel 2510. In order to assist in ensuring that only carbon dioxide is extracted via port 2504, a level measuring device 2502 is arranged to measure the upper level of liquefied fat between the broken lines shown between arrows 2508 and 2514. A second level measuring device 2506 is arranged to measure the lower level of liquefied fat between the broken lines shown between arrows 2526 and 2528. In this way, it can be ensured that carbon dioxide will be extracted via port 2504, and fat via port 2524, and lean meat through port 2532. Additionally, agents, including salts, decontaminating agents, processing aids, and water can be introduced by any port in any quantity.

Figure 37:
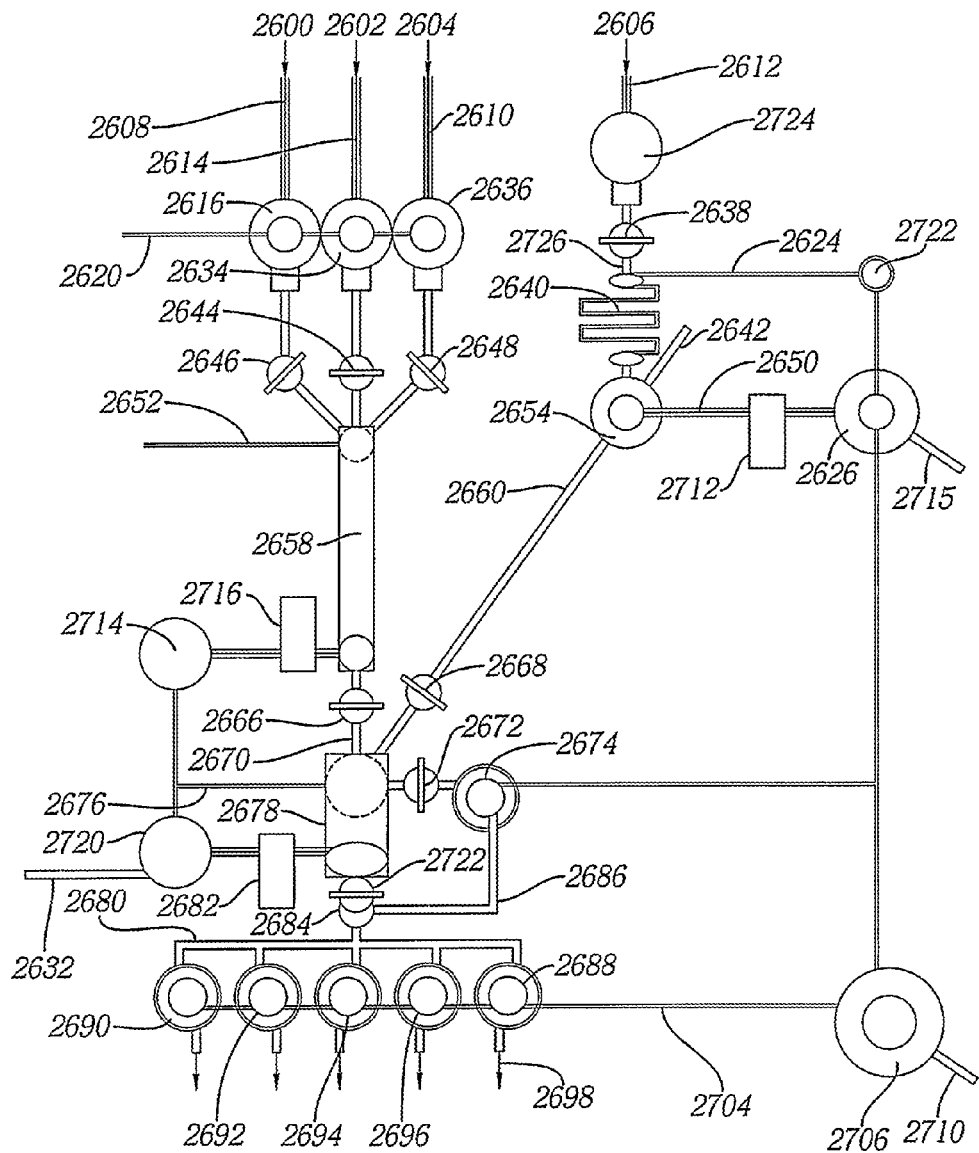
FIG. 37 shows a schematic illustration of an apparatus according to the present invention.

Referring now to FIG. 37, an arrangement of equipment to process meat, is illustrated. The equipment can be used in the production of multiple streams of ground meat 2698 having selected fat content after processing, which can be derived from four streams of meat 2600, 2602, 2604, and 2606. Each stream of meat 2600, 2602, 2604, and 2606 is pumped by pumps 2616, 2634, 2636, and 2724, respectively. Meat is contained within enclosed conduits for the full duration of processing into stream 2698 and a carbon dioxide atmosphere can be provided to fill or substantially exclude any air and particularly oxygen within the conduits. A high fat stream 2606 generated by boning processes is transferred along conveyor 2612, and into positive displacement pump 2724. Air can be extracted and exchanged with carbon dioxide gas. The moisture and fat content of the stream 2606 is measured by measuring device 2638. An example of a suitable measuring device is a GMS Microwave System. Alternatively, an ultrasonic means of analyzing the fat content of a continuous stream of ground beef or any boneless meat with fat and lean, can be arranged as follows: an ultrasonic emitter is rigidly attached to a first side of a conduit through which a continuous stream of boneless beef is transferred under controlled pressure and an ultrasonic collection device is rigidly attached and a position diametrically opposite the emitter on the same conduit such that the ultrasonic energy emitted by said first ultrasonic energy emitter can be collected by said collection device. In this way the profile of ultrasonic energy emitted by said ultrasonic sound emitter and transferred directly through the stream of ground meat within said pressurized conduit can be compared with the profile of the ultrasonic energy collected by said collection device and by evaluating the differences between the sonic input with the sonic output, the fat content can be determined. The fat content of ground beef can be accurately measured in this way in a continuous process. The ultrasonic method of fat analysis described herein above can be substituted for the GMS method as also described herein and in any other associated patent disclosures referenced herein. Carbon dioxide is pumped from conduit 2624, at a pressure above about 1056 psig and temperature above about 87° F., such that the carbon dioxide is in its supercritical phase. A crushing device 2726 blends the carbon dioxide and meat stream 2606 together prior to transferring into conduit 2640. Conduit 2640 comprises equipment as generally described in association with FIG. 38 below. After a sufficiently prolonged exposure of the meat to the supercritical carbon dioxide, during transfer along conduit 2640, the combined stream is transferred into pressure vessel 2654, where supercritical carbon dioxide is extracted via conduit 2650, and after compressing with compressor 2712, is transferred directly into storage pressure vessel 2626. Liquefied fat is extracted via conduit 2642. Lean beef with reduced fat content is transferred along conduit 2660, and measured with measuring device 2668 so as to determine the fat content of the meat in conduit 2660. Vessel 2654 can be the vessel described in association with FIG. 36. The quantity of lean meat transferred through conduit 2660 into continuous blender 2678 is controlled in proportion to a second stream from the combined streams 2600, 2602, 2604. Streams 2600, 2602, 2604 and 2606 are transferred through conduits into continuous blender 2678 to allow production of a stream of meat having a fat content as desired leaving continuous blender 2678.

Carbon dioxide is stored in vessel 2706. Conduit 2710 allows vessel 2706 to be filled with carbon dioxide from an exterior source. Conduit 2715 allows carbon dioxide gas to be transferred into pressure vessel 2626. Vessel 2722 is arranged with a heater to raise the temperature of carbon dioxide transferred along conduit 2624, to ensure that carbon dioxide delivered to conduit 2640 is at supercritical temperature and pressure. An additional carbon dioxide storage vessel 2720 is replenished by an outside source transferred from conduit 2632. Compressors 2716 and 2682 recycle carbon dioxide extracted from equipment 2658 and 2678, and transfer the carbon dioxide into vessels 2714 and 2720, in readiness for subsequent use. Conduit 2676 allows the transfer of carbon dioxide into continuous blender 2678. A supply of carbon dioxide gas is transferred along conduit 2620, into pumping vessels 2616, 2634, and 2636. A supply of carbon dioxide is supplied into equipment 2658 along conduit 2652. Pumping vessels 2616, 2634, 2636, and 2724, can be any suitable pump, such as meat pumps manufactured by Marlen. FIG. 37 shows three streams of boneless meat transferred along conveyors 2608, 2614, 2610, directly into meat pump vessels 2616, 2634, and 2636, filled with carbon dioxide. Each stream is pumped along conduits through GMS measuring devices 2646, 2644, and 2648, wherein fat and moisture can be measured prior to transfer into decontamination apparatus 2658. The mass flow of each stream is adjusted according to fat content and/or the moisture content to produce meat of a desired fat and moisture content. The mass flow of each stream can be adjusted according to its fat content in such a way that meat with a selected fat content can be transferred into apparatus 2658. Apparatus 2658 can decontaminate the meat. The decontaminated meat is transferred along conduit 2670 and through GMS measuring device 2666 into a continuous blender 2678, to enable continuous blending with a second stream of meat delivered via conduit 2660. Continuous blending ensures adequate mixing of the two streams in the continuous mixer 2678 prior to transfer therefrom, via measuring device 2722. The stream of blended meat is transferred into diverter valve 2684 which diverts the stream into vessels 2690, 2692, 2694, 2696, or 2688 through a distribution conduit 2680. Carbon dioxide from storage vessel 2706 can be introduced via conduit 2704 into any one of storage vessels 2690, 2692, 2694, 2696, and 2688. Any meat that does not meet requirements after measurement by measuring device 2722 can be transferred along conduit 2686 into vessel 2674, after being diverted by diverter valve 2684. Such meat not meeting specified requirements and stored in vessel 2674 can be transferred for blending at specified rate via measuring device 2672 into continuous blender 2678.

Figure 38:
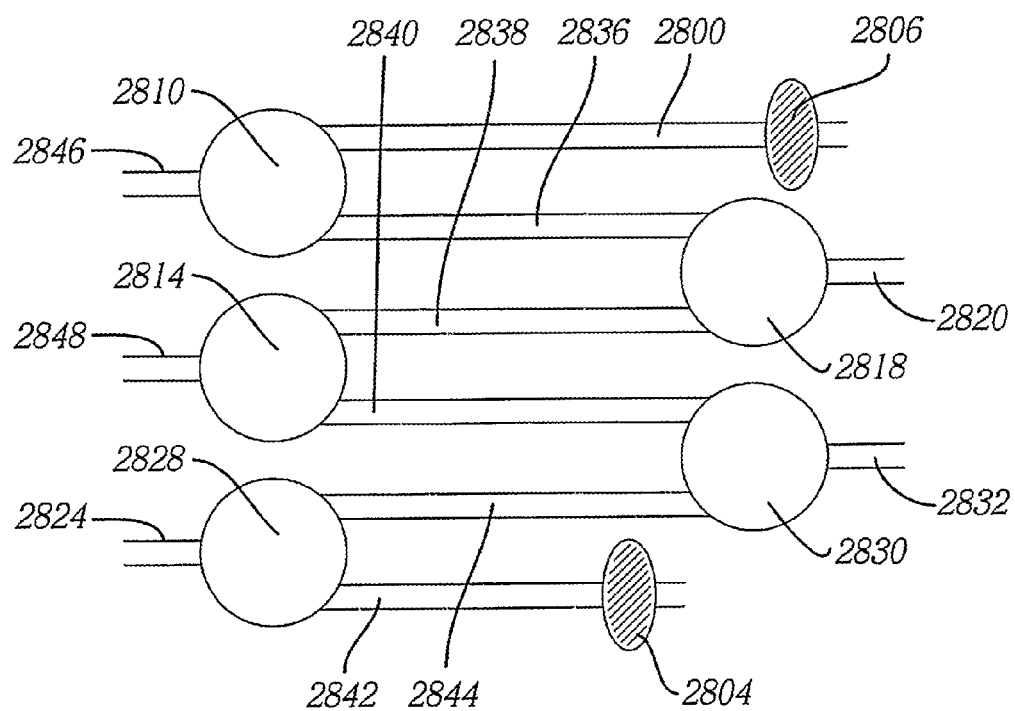
FIG. 38 shows a schematic illustration of an apparatus according to the present invention.

Referring now to FIG. 38, a series of conduits for treating meat with supercritical carbon dioxide, is illustrated. Blending device 2804 blends meat transferred therein along conduit 2842. Parallel conduits 2844, 2840, 2838, 2836, and 2800 are connected together via extraction vessels 2828, 2830, 2814, 2818, and 2810. Each extraction vessel is fitted with an extraction port to enable extraction of liquefied fat. Extraction ports 2824, 2848, 2846, 2848, 2820, and 2832, are arranged to allow extraction of the fat. The apparatus enables a high fat stream of meat to be treated with supercritical carbon dioxide to produce low fat meat transferred via conduit 2800. The fat content of the extracted meat stream is substantially less than the fat content of the stream transferred into conduit 2842. Blending device 2806 may be located at end of conduit 2800.

Figure 39:
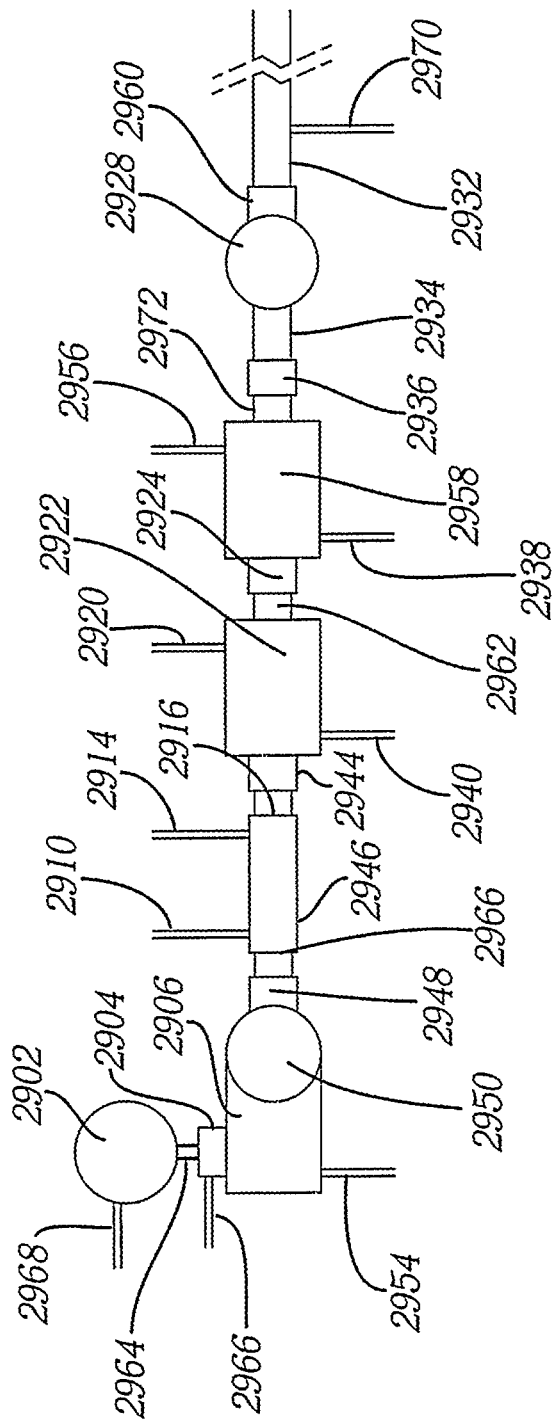
FIG. 39 shows a schematic illustration of an apparatus according to the present invention.

Referring now to FIG. 39, an apparatus for processing goods, including meat, is illustrated. The apparatus includes a series of pressure vessels that can be described as unsealed pressurized enclosures that hold pressure and allow the continuous transfer of meat.

Boneless meat is loaded into vessel 2902. The meat may be chilled prior to loading therein, to a temperature in the range of about 28° to about 45° F., but most preferably to a temperature of about 35° F.±1°. The apparatus is arranged to perform several functions that include the extraction of a measured quantity of fat from the meat that is transferred to vessel 2902. The processed meat can be transferred to a continuous blender, wherein the continuous blender may be arranged with a supply of two or more streams of meat.

The equipment is arranged to periodically and automatically test for and determine the presence of bacteria. Samples for testing can be extracted via extraction port 2968. The sample that is extracted may be a fluid that has accumulated at the base of vessel 2902. The fluid so removed can contain bacteria from the meat, and can be representative of the population of bacteria present within the meat. The extraction point will be arranged such that the fluid that is extracted is representative of the meat. The sample extracted can be automatically tested. The automatic testing apparatus, which is not shown in FIG. 39, is arranged to apply the samples continuously to a surface of a strip of indicator material. Samples are in full and intimate contact with the strip of indicator material for a sufficient and effective period of time that will result in a color change in the indicator material when bacteria are detected. The indicator material, is a continuous strip of engineered polymerized molecular film (hereinafter "EPMF"). The EPMF strip of material can be transparent so as to enable light to be projected therethrough, or alternatively reflected therefrom. After the samples have been in contact with the surface of EPMF for sufficient time to cause any color change as a result of the presence of a particular bacteria, the sample can be removed from the material and a source of light projected through the strip and onto a light receiver that forms part of a vision system capable of detecting color changes. Such color changes can be detected, and the presence of bacteria can be determined. The information regarding the presence of bacteria or other recognizable contaminants can be recorded and associated with the meat, and recorded in a database. The presence of bacteria may cause a signal or an alarm to sound, enabling the apparatus or operators to respond accordingly. However, in view of the automated capability of the apparatus, such meat that is detected to contain undesirable bacteria, can be directed to a vessel that is not shown in FIG. 39, but that would store the contaminated meat. The contaminated meat can subsequently be used for the production of cooked food products wherein the cooking process will kill any bacteria that is present. The apparatus described herein for automatic detection of undesirable bacteria can also be integrated at the end of the process where the processed meat is ejected, or alternatively as shown in FIG. 39 at extraction port 2970.

The process disclosed herein furthermore includes a method to decontaminate the meat of microorganisms, such as bacteria. A concentrated solution of sodium chlorite is injected into conduit 2964 in an amount that can be automatically adjusted, by, for example, the quantity of fat removed from the meat and the water content of the meat. The sodium chlorite solution is injected via port 2966. Vessel 2902 is connected directly to a meat pump capable of pumping at variable speeds to vary the meat flow rate through conduit 2964, and the pressure can also be controlled. A series of fat, water, and protein measuring devices, are shown as items 2904, 2948, 2944, 2924, 2936, and 2960. The measuring devices are integrated into the conduits to enable the automatic measuring of the meat properties, including, but not exclusively, flow rate, weight, water content, fat content, and lean meat content. Vessel 2906 is connected through measuring device 2948 and conduit 2966 to vessel 2946. Vessel 2946 is connected to vessel 2922 via conduit 2916. GMS measuring device 2944 is located on conduit 2916. Vessel 2922 is connected via conduit 2962 and measuring device 2924, to vessel 2958. Vessel 2958 is connected via conduit 2934 to pumping vessel 2928, which in turn transfers meat through measuring device 2960 and conduit 2932.

The meat pumped into vessel 2906 is blended with sodium chlorite solution injected via port 2966. Vessel 2906 is fitted with impellers that both mix the sodium chlorite solution and meat together, while transferring the meat stream into pump 2950. Carbon dioxide and water can be added to vessel 2906 via port 2954 at a selected pressure and temperature. The pressure maintained in vessel 2906 can be greater than or about 500 psig to about 850 psig. As the meat is transferred into vessel 2906, the water content, fat content, and lean meat content are measured by measuring device 2966. Pump 2950 transfers the meat and increases its pressure to about 1100 psig to about 2000 psig. The temperature at the surfaces of the boneless meat is elevated to greater than about 90° F. as it is transferred through vessel 2906. Heating can be by way of a steam jacket installed around vessel 2906, for example. The temperature of the meat can be maintained above about 90° F. and below about 109° F. Meat pumped by pump 2950 is transferred through measuring device 2948, and the mass flow and pressure are controlled as required by a mass flow regulator installed in conduit 2966. The heated meat is blended with the sodium chlorite solution in a manner that substantially ensures that the sodium chlorite solution thoroughly covers all surfaces of the meat and is forced into crevices, slits, cuts, and cracks in the meat and fat, in sufficient quantities. The meat transferred directly into pressure vessel 2946, is blended with a measured supply of supercritical carbon dioxide injected via port 2910. The blend of meat, sodium chlorite solution, and supercritical carbon dioxide, is continuously blended in pressure vessel 2946. The supercritical carbon dioxide can cause a rapid lowering of the pH on contact with the sodium chlorite solution at the surfaces of the meat. The pH can be about 2 to about 3. Under these conditions, carbonic acid, hypochlorous acid, and hydrochloric acid are produced at the meat surfaces. The combination of acids is lethal to pathogens, including *E. coli* 0157:H7, *salmonella*, and other pathogens. In addition to substantially killing the majority of the pathogens and bacteria, the supercritical carbon dioxide will dissolve fat. Supercritical carbon dioxide is an effective solvent and will dissolve fats at a predictable rate. The flow of supercritical carbon dioxide through port 2910 is controlled according to the fat content and water content of the meat. The dissolved fat with other contaminants therein, and a major portion of the sodium chlorite solution, are extracted via conduit 2914. Vessel 2946 can be arranged in a manner that enables the separation of the combined stream of materials flowing through vessel 2946, into two streams, wherein the first stream includes dissolved fat and is directed through port 2914, and a second stream includes meat that is transferred through mass flow regulator fitted in conduit 2916, and through measuring device 2948. The fat, water, and lean meat content of the meat stream are measured with measuring device 2948, before exposure to supercritical carbon dioxide in vessel 2946, and then again with measuring device 2944, after treatment in vessel 2946. The difference in fat, water, and lean meat content can be calculated. The information can be used to control the mass flow and pressure of the carbon dioxide and water provided to pressure vessel 2946. Most particularly, the fat and water content of the meat can be adjusted while substantially killing and removing surface pathogens and other contaminants. The treated meat is transferred through measuring device 2944 into vessel 2922, wherein a pressure drop from the specified gas pressure within vessel 2946 occurs. The pressure can drop from the higher level of about 1100 psig to about 2000 psig, to a lower pressure of about 500 psig to about 750 psig. Such a pressure drop will cause a rapid reduction in the meat surface temperature and pH. Vessel 2922 is therefore controlled at an internal pressure of about 500 psig to about 750 psig. The temperature of the meat can also be adjusted within vessel 2922 by injection of liquid or dense carbon dioxide gas via port 2940, and carbon dioxide gas can be extracted and recycled, via conduit 2920. If so desired, a pathogen and/or bacteria detection system, as described hereinabove, may be installed between vessel 2922 and vessel 2958. The treated meat is regulated from vessel 2922 through conduit 2962. The meat is then transferred through measuring device 2924 and into vessel 2958, which is substantially similar to vessel 2922, having port 2938 for the addition of carbon dioxide. Gas is extracted from vessel 2958 via port 2956. The temperature and pressure of the meat are measured at selected points. Adjustments can be automated and executed by a computer. Data or measurements can be recorded and associated with the meat as it is transferred through the vessels so that the meat from different animals remains associated with the data pertaining to the animal and tracked throughout the process. The method for identification of the meat with an animal is enabled by controlling mass flow, and with volumetric measurement, the location of any identifiable portion of meat can be tracked to the animal. The data collected can be recorded in a database, wherein said database is accessible by multiple users. The meat's properties, including its origin, age, and all other properties, can be associated with any package containing the meat and a label containing any information can be attached to the package.

The meat is then transferred from vessel 2958, through conduit 2972, through measuring device 2936, followed by transfer through conduit 2934, and into vessel 2928. A pump enables pumping of the treated meat through measuring device 2960, and into conduit 2932. Conduit 2932 can be attached directly to an enclosed storage vessel (not shown), which is temperature controlled, and filled with a selected gas, enabling storage of the processed meat in readiness for subsequent processing or packaging.

A pressure drop between vessel 2922 and vessel 2958, can occur to lower the pressure in the range of about 50 psig to about atmospheric pressure. Such lowering of pressure will result in a temperature drop. Port 2938, for example, may provide a gas, such as carbon dioxide, at a temperature that enables adjustment of the temperature of the meat. Such temperature adjustment may require elevation or reduction according to the original temperature of the boneless meat provided into vessel 2902.

The sodium chlorite solution applied to the surfaces of boneless meat in vessel 2902 may be applied, in concentrations from 500 ppm to 1200 ppm according to USDA regulation 21 C.F.R. §173.325. However, given the effective removal of a substantial proportion of the added sodium chlorite solution with the liquefied fat extracted from vessel 2946, it is anticipated that higher concentrations of the sodium chlorite solution may be used. For example, a concentration above 1,200 ppm, such as about 2,500 ppm to about 3,000 ppm and above, should be possible according to the invention.

The increased quantities of sodium chlorite will enable application of increased quantities of water, resulting in significantly improved antimicrobial effects.

In one embodiment of the invention, after application of a sodium chlorite solution of concentration from 500 ppm to 1200 ppm in accordance with USDA regulation 21 C.F.R. §173.325 in vessels 2902 and 2906, the removal of substantially all sodium chlorite solution (including excess water) during processing in vessel 2946 is possible. Therefore, a second application of sodium chlorite solution, at a selected and automatically adjusted concentration, can be injected at a controlled mass flow rate via port 2940 in vessel 2922. Carbon dioxide gas at about 550 psig and water can be introduced via another port, such as a bottom port in the lower sections of vessel 2922. The carbon dioxide addition can be combined with a heating system to elevate the temperature of carbon dioxide to a temperature of about 90° F. to about 109° F. Carbonic acid is produced having a pH of about 2 to about 3. The treatment according to the invention ensures that the pathogen population is reduced to an undetectable level.

Sodium chlorite solution with water and carbon dioxide can be extracted via port 2920. The fat and sodium compound(s) with excess water can be extracted via port 2932. Excess water is removed, in part, by entrainment with the carbon dioxide gas when vented.

The extracted liquid fat can then be separated from the sodium compound solution removed therewith by centrifuge or a separation column. Fat can then be pasteurized by elevating the temperature to a range of about 140° to about 160° F., filtered, and processed, such as by freeze-drying.

The apparatus can enable the application of high concentrations of sodium chlorite solution mixed with the meat to ensure adequate contact and saturated coverage of all exposed surfaces of meat, followed by adequate concentrations of carbonic acid solution at a pH of about 2 to about 3, thereby enabling reduction of pathogens to an undetectable pathogen population in the finished boneless meat.

Another aspect of the invention relates to a method and apparatus for processing meat by providing at least two input streams of ground meat to a mixer, controlling the mass flow of each stream, measuring at least the fat content of each stream, and combining the streams into a single output stream and measuring the fat content of the combined stream; adjusting the mass flow of the input streams to produce blended ground meat with a selected proportion of fat, lean, and water. The present invention can provide for the detection of measurement readings that have drifted from actual, and the manipulation of measurement readings to provide more accurate control of the controlled variable in meat, whether it is fat, lean, or water.

The methods and apparatus use measuring devices that may require periodic calibration. Such calibration has hitherto required an intervention procedure resulting in lost production time and the need to occasionally reprocess "out of specification" ground meat that has been produced with defective measuring devices that have not been correctly calibrated.

The present invention provides a method of operation and an automated process to enable calibration of measuring devices used in the automatic production of ground meat.

According to one embodiment of the invention, a method of controlling the rate of a pump for an input stream to a mixer having a plurality of input streams being mixed into an output stream is provided. The method includes obtaining a plurality of composition measurements of an input meat stream being transferred by a pump. The method includes calculating a representative measurement based on the plurality of measurements. The method includes determining the flow rate capacity of the pump based on a controllable pump factor. The pump factor can include the speed. The method includes calculating the controllable pump factor that is calculated to give an input meat flow rate that will provide a meat product within a composition range and a flow rate range, wherein the meat product is comprised from at least two input meat streams of different compositions. The input meat flow rate is obtained by solving a mass balance equation around the mixer using the representative measurement to solve for the input meat flow rate.

According to another embodiment of the invention, a method of selecting one measurement reading from a pair of measurement readings, to use as a measured variable in the control of an input stream to a mixer having a plurality of input streams being mixed into an outlet stream, is provided. The method includes obtaining the composition measurement readings from input streams and the output stream around the mixer. The method includes calculating obtaining the flow rates of input streams and the output stream around the mixer. The method includes calculating a predicted input stream composition by solving a mass balance equation around the mixer using the flow rates and the composition measurement readings, but for the one composition being solved. The method includes calculating the difference between the predicted input stream composition and the composition measurement reading from a measuring device from the same input stream. The method includes selecting the measurement reading from a redundant measuring device for use as the measured variable when the absolute value of the difference is outside of a threshold.

According to one embodiment of the invention, a method of detecting inaccuracy in a measuring device of an input stream to a mixer having a plurality of input streams being mixed into an output stream is provided. The method includes obtaining composition measurement readings from input streams and an output stream around the mixer. The method includes obtaining the flow rates of input streams and the output stream. The method includes calculating a predicted input stream composition by solving a mass balance equation around the mixer using the flow rates of the composition measurement readings, but for the one composition being solved. The method includes calculating the difference between the predicted input stream composition and the composition measurement reading from a measuring device from the same input stream. The method includes determining if the measuring device is inaccurate when the absolute value of the difference is outside of a threshold.

According to one embodiment of the invention, a method of calibrating a first measuring device from a second measuring device on an input stream to a mixer having a plurality of input streams being mixed into an output stream, is provided. The method includes obtaining composition measurement readings from input streams and an output stream around the mixer. The method includes obtaining the flow rates of input streams and the output stream around the mixer. The method includes calculating a predicted input stream composition by solving a mass balance equation around the mixer using the flow rates and the composition measurement readings, but for the one composition being solved. The method includes calculating the difference between the predicted input stream's composition and the composition measurement reading from a measuring device from the same input stream, and assigning the measurement reading from the second measuring device to the first measuring device when the absolute value of the difference is outside of a threshold.

In all the above alternative embodiments, measurement readings can be taken from all input streams and output streams. In all the above embodiments, the flow rates of input and output streams can be determined from a controllable pump factor or by measuring. Alternatively, some input streams will have a known and substantially unvarying composition. Also, their flow rate can be substantially unvarying. These known factors can still be used in solving the mass balance equation. However, due to their unvarying composition and flow rate, the composition need not be measured nor their flow rate determined.

The methods and procedures disclosed herein enable automated calibration of each measuring device during the normal operation of the apparatus, when measuring the content of each stream.

Automated production of ground meat, having a specified amount of fat, lean, and water content in any desired ratio, is enabled by combining at least two input streams of ground meat, pumped through conduits by variable-speed pumps, and mixed together to provide one output stream having the controlled variable within a specified range. The output stream can be produced within a specified flow rate range. The pumps are capable of adjusting the mass flow of each input stream to achieve an output stream within a specified composition and flow rate range. The mass flow of each input stream is adjusted according to the measured fat, lean, and/or water content of each input stream so that, when the streams are combined into a single output stream, the resultant fat, lean, or water ratio in the combined output stream is controlled within the specified range. The pumps are monitored for flow rate in an effort to maintain the output stream within a specified flow rate range. Pumps can be constrained from exceeding the upper limit of the output stream's flow rate. Pumps can also be constrained from dropping the output stream's rate below the lower limit of the output stream's flow rate range. It is not entirely necessary to maintain the input streams at any specified constant ratio prior to mixing the streams together. The variable that is desired to be controlled in the output stream may be allowed to vary in the input streams because the measuring devices measuring the input stream's composition immediately downstream of the pumps will adjust the flow rate of each input stream in the correct proportions to produce a mixed output stream having a controlled amount of fat, lean, or water, in any desired range. Measuring devices are installed in each of the input streams and also in the combined output stream. Mass flow adjustment of each stream is controlled by a computer that processes data received from each measuring device, and then directs adjustment of each pump's speed independently, according to the measured content of each stream, so as to produce an output stream of specified ground meat. The processing of data from the measuring devices in the manner described herein is useful to control the input stream meat pumps, or in detecting drift seen in some measuring devices, or in selecting one from a pair of measuring devices. The method for automated ground meat production, according to the invention, has been found to be a significant improvement compared with other production methods. However the accuracy of the streams' content measurement reading is affected by a gradual divergence from a calibrated setting and recalibration may be required periodically. In one embodiment, the present invention provides a method for detecting when a measurement reading has drifted, and selecting an alternative reading. Drift when used in the context of measuring devices refers to deviation of measurement readings from the true reading, which may occur gradually.

Figure 40:
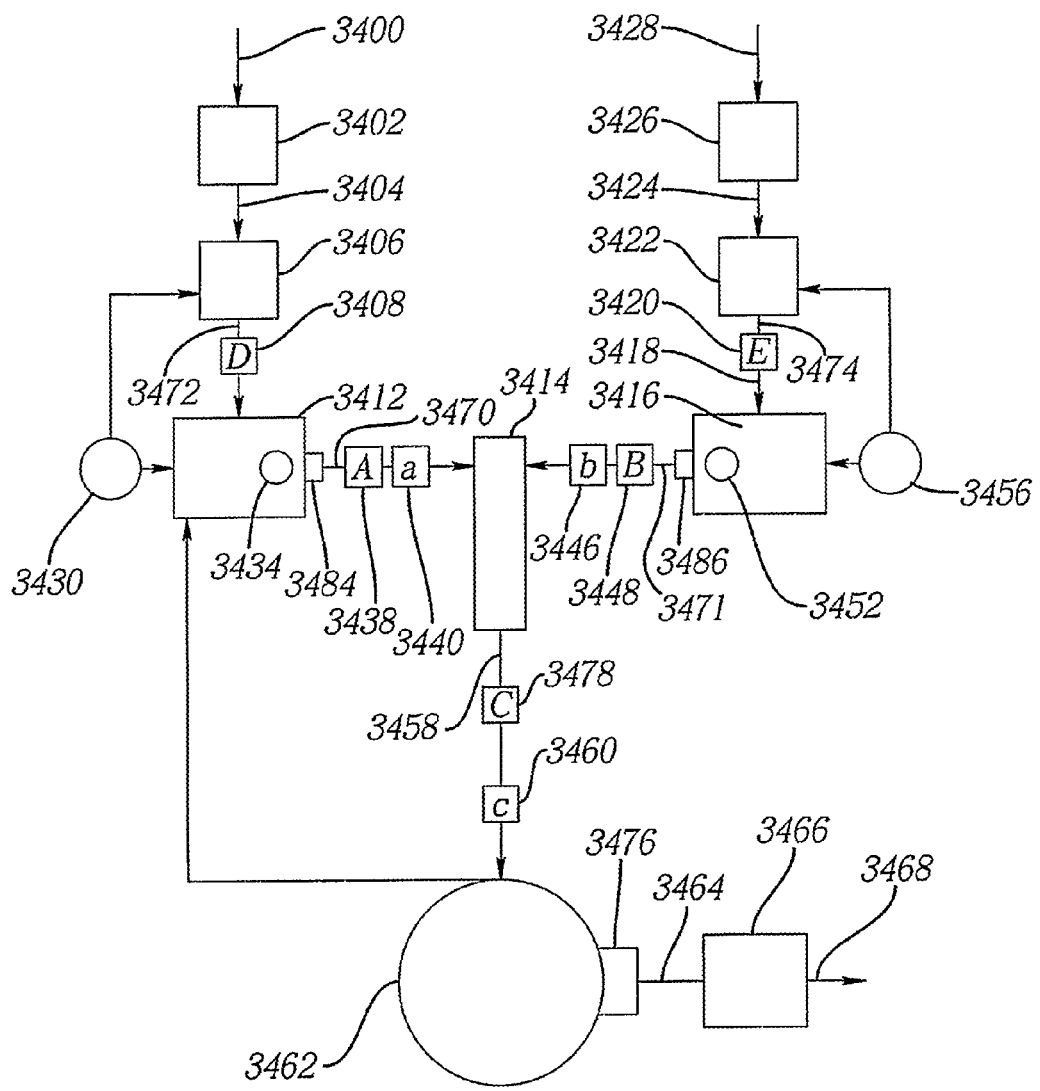
FIG. 40 shows a schematic illustration of an apparatus according to the present invention.

Referring to FIG. 40, one embodiment of an apparatus is illustrated for the processing of goods, including boneless beef, or boneless meat of any kind, including pork, poultry, and any other protein containing fat, wherein the meat is derived from an animal source, and the fat, lean meat, and water content is unknown after harvesting from the animal's skeleton. The apparatus includes a series of pressure vessels that may be described as unsealed pressurized enclosures arranged to process two streams of meat. However, it should be appreciated that other embodiments may have more than two input streams. Some embodiments may have more than one output stream, and other embodiments may have one or more recycle streams. In other embodiments, additives can be provided to the input streams, including spices, particularly for sausages. "An unsealed pressurized enclosure" refers, in part, to the vessels' ability to process the meat in a continuous mode under positive pressure (at least from grinder to end of mixer). In one embodiment, the apparatus includes two input streams for processing beef from a grinder to a mixer to form a single output stream. The apparatus associated with each stream includes at least a grinder, a preblender (which mixes an input stream), a pump, and connecting conduits. Measuring devices may be located between grinder and preblender, and after the pump. The grinders, preblenders, pumps, and mixer can be provided by the Wenger Company. The apparatus is capable of grinding the separate streams of boneless meat, measuring the fat, lean, and water content of each stream, and adjusting the flow of each input stream according to a measured variable content of the respective streams. The two streams are combined together to form a single output stream, which is also measured to confirm the combined content of fat, lean, and water therein.

In one embodiment, two separate quantities of boneless meat with differing quantities of fat, lean, or water, are loaded into loaders 3402 and 3426. Boneless meat, such as beef, may be chilled prior to loading, to a temperature in the range of about 28° to about 45° F., but most preferably to a temperature of about 35° F.±1° F.

The second stream of boneless meat represented by arrow 3428 is processed in much the same manner as is the first stream of boneless meat represented by arrow 3400.

The first stream of boneless meat is loaded into a variable-speed meat grinder 3406 by loader 3402 and conveyor 3404, which may be fitted with a metal detector. Grinder 3406 is driven most preferably by a variable-speed motor, which may be a hydraulic motor, and in such a manner that will enable a continuous flow of meat to be ground at a mass flow that can be varied as required to adjust to the demands of the system and, more particularly, the proportioned flow into continuous blender 3414. For example, grinder 3406 may have level-indicating devices that monitor the levels in the meat grinder vessel and the grinder can be sped up or slowed down to maintain the level within a suitable range. Grinder 3406 is arranged to transfer ground meat along an enclosed conduit 3472 through measuring device 3408 and into preblender 3412. Grinder 3406 can be covered, apart from an open section to allow meat to drop into the hopper. The measuring device 3408 can measure the fat, lean, and water content in the first stream of meat. Preblender vessel 3412 receives product pumped therein, and blends the stream of ground meat while transferring said meat to the continuous mixer 3414. The preblender vessel 3412 is fitted with impellers mounted internally that are arranged to blend meat transferred therein and also to carry it toward the continuous mixer 3414. The impellers mounted in preblender vessel 3412 may be arranged with any suitable profile including paddles and Archimedes screw sections to enable efficient blending and removal of gas that may otherwise become entrapped within the meat stream as it is transferred into conduit 3470 by pump 3484. The meat pump 3484 can be a positive displacement piston-type pump, vane pump, or screw pump that may be a matching twin screw or single screw, having a parallel or conical profile, to increase pressure. The preblender vessel 3412 can also be provided with level indicators that will indicate the level of the meat in the vessel. If the level indicators indicate a high level, the grinder 3406 may be slowed down or temporarily stopped. Alternatively, the pump 3484 may be sped up to decrease the level in the preblender.

The type of pump 3484 may be selected from any number of pumps and may comprise, for example, a pair of counter- or corotating, meshed, conical screws arranged to compress the stream of meat and diminish any gas voids contained within the meat stream. Such gas inclusions can comprise a large proportion of carbon dioxide, which can dissolve into the water and oils contained in the meat when suitably compressed. Preblender vessel 3412 is also fitted with an exhaust duct 3484 so as to allow extraction of gases, such as carbon dioxide, that can be injected into vessel 3412 through bottom injectors, which can also enable the adjustment of the temperature of the meat blended therein. Gas supply source 3430 will supply liquid carbon dioxide to vessels 3412 and 3406. Carbon dioxide liquid will vaporize immediately after release by control valves, which can be used to control the temperature. Exhaust duct 3434 for vessel 3412 can be fitted with an extractor fan or may have a butterfly valve to maintain or control a selected pressure in the vessel. Exhaust duct 3434 will thusly carry any vaporized amount of water and can be used to control the water content in the meat stream.

From pump 3484, meat is transferred through conduit 3470 with measuring devices 3438 and 3440 conveniently mounted therein, and into the continuous blender 3414. Continuous blender 3414 is a mixer to mix the first and second input streams.

The second stream of boneless meat is loaded into a variable-speed meat grinder 3422 by loader 3426 and conveyor 3424, which may be fitted with a metal detector. Grinder 3422 is driven most preferably by a variable-speed motor that may be a hydraulic motor and in such a manner that will enable a continuous flow of meat to be ground at a mass flow that can be varied as required to adjust to the demands of the system and, more particularly, the proportioned flow into continuous blender 3414. For example, grinder 3422 may have level-indicating devices that monitor the levels in the meat grinder vessel and the grinder can be sped up or slowed down to maintain the level within a suitable range. Grinder 3422 is arranged to transfer ground meat along enclosed conduit 3474 through measuring device 3420 and into preblender 3416. Grinder 3422 can be covered, apart from an open section to allow meat to drop into the hopper. The measuring device 3420 can measure the fat, lean, and water content in the second stream of meat. Preblender vessel 3416 receives product pumped therein, and blends the stream of ground meat while transferring said meat to the continuous mixer 3414. The preblender vessel 3416 is fitted with impellers mounted internally that are arranged to blend meat transferred therein and also carry it toward the continuous mixer 3414. The impellers mounted in preblender vessel 3416 may be arranged with any suitable profile including paddles and Archimedes screw sections to enable efficient blending and removal of gas that may otherwise become enclosed within the meat stream as it is transferred into conduit 3471 by pump 3486. The meat pump 3486 can be a positive displacement piston-type pump, vane pump, or screw pump, which may be a matching twin screw or single screw having a parallel or conical profile to increase pressure. The preblender vessel 3416 can also be provided with level indicators that will indicate the level of the meat in the vessel. If the level indicators indicate a high level, the grinder 3422 may be slowed down or temporarily stopped. Alternatively, the pump 3486 may be sped up to decrease the level in the preblender.

The type of pump 3486 may be selected from any number of pumps and may comprise, for example, a pair of counter- or corotating, meshed, conical screws arranged to compress the stream of meat and diminish any gas voids contained within the meat stream. Such gas inclusions can comprise a large proportion of carbon dioxide that can dissolve into the water and oils contained in the meat when suitably compressed. Preblender vessel 3416 is also fitted with an exhaust duct 3452 so as to allow extraction of gases, such as carbon dioxide, that can be injected into vessel 3416 through bottom injectors, which can also enable the adjustment of the temperature of the meat blended therein. Gas supply source 3456 can supply liquid carbon dioxide to vessels 3416 and 3422. Carbon dioxide liquid will vaporize immediately after opening of control valves to control the temperature. Exhaust duct 3452 for vessel 3416 can be fitted with an extractor fan or may have a butterfly valve to maintain or control the pressure in the vessel. Exhaust duct 3452 will thusly carry any vaporized amount of water and can be used to control the water content in the meat stream. Gas supplies 3430 and 3456 are fed to grinders 3406 and 3422 and preblenders 3412 and 3416 to displace air and oxygen.

From pump 3486, meat is transferred through conduit 3471 with measuring devices 3446 and 3448 conveniently mounted therein, and into the continuous blender 3414. Continuous blender 3414 is a mixer to mix the input streams. Continuous blender 3414 is preferably controlled within a specified flow rate range. Accordingly, the control of pumps 3484 and 3486 may be arranged to cooperatively produce a combined flow rate that will neither exceed the upper limit of the range nor drop the flow rate below the lower limit of the range. For example, one pump can be selected as the master of the combined flow controller; however, if the pomp were to reach its operating limit, the slave or second pump may be engaged in combined flow control mode. Pumps will typically operate in composition control mode, but flow will be monitored and controlled as well. Operation of the pumps may result in constraining the pump speed not to increase or decrease if it would result in the combined output stream being outside the combined Output composition range. Back pressure in conduits 3470 and 3471 is created by controlling the flow of combined streams through the continuous blender 3414.

Each stream of boneless beef that has been ground is preferably fed into preblenders 3412 and 3416. Blending each stream in isolation, prior to combining with another stream, can provide a substantially homogenous stream of meat that can decrease the variation in measurements taken by measuring devices 3438, 3440, 3446, and 3448, respectively. The pressure in the preblenders can be elevated by controlled restriction of the exhaust, which will prevent ingress of atmospheric oxygen.

The equipment is arranged to automatically measure at least one component of each stream of meat coming into the continuous blender. The measured component may be fat, lean, and water or any other component or characteristic of the meat. The measurements are made as the streams are transferred through measuring devices 3438, 3440, 3446, and 3448, installed after pumps 3484 and 3486, measuring devices 3408 and 3420 installed after grinders 3406 and 3422, and measuring devices 3478 and 3460 installed after the continuous mixer. The measuring devices can be GMS and/or AVS devices. The measuring devices, which are preferably of the GMS type, are integrated into the conduits to enable automatic measuring of the meat properties, which may include but are not limited to, weight, water content, fat content, and lean content, thereby enabling the automatic adjustment of the pumps 3484 and 3486.

Additionally, all vessels, equipment, and connecting conduits can be filled with selected gases as required. The gas may comprise at least carbon dioxide or nitrogen. But in any event, the gas should have reduced amounts of oxygen in proportions lower than normal air. The continuous blender 3414 is driven by a variable-speed motor, thereby combining first and second streams into a single stream that is transferred through blender 3414 and mixed therein by screws enclosed therein. The combined and blended stream of meat can be transferred through conduit 3458 and through measuring devices 3478 and 3460. Conduit 3458 is connected to hopper 3462 with an optional positive displacement pump 3476 at one outlet. It should be noted that the continuous blender 3414 has adequate capacity to pump the combined streams and a fine grinder could be mounted directly to the exit end of the continuous blender if so desired. Pump 3476, optionally can be provided with a grinder to finely grind meat. Hopper 3462 can be arranged with a conical profiled side elevation and can be fitted with a mixer mounted therein. The variable-speed, positive-displacement pump 3476 is connected directly to the base of the conical profiled hopper 3462 so as to enable a controlled pumping of the stream of meat into conduit 3464. Conduit 3464 may be arranged with an outer jacket in a manner to allow heated water to pass therethrough, enabling the heating of the conduit 3464. Such heating can minimize the buildup of fat on the internal walls of the conduit 3464, which may otherwise accumulate excessively.

In one embodiment, conduit 3464 is connected to a chub packaging apparatus 3466 with a chub clipping and transfer section. Filled, clipped, and sealed, substantially oxygen-free chubs, which may also be evacuated, are then transferred onto conveyor 3468. Conveyor 3468 is arranged to transfer finished chub packages into a refrigerated storage room and labeling station, and/or further packaged into cartons that can then be loaded onto pallets in readiness for shipping. Chub packages can be labeled or marked with an identification mark that is associated with all types of information that can be retrieved via a computer.

Continuous blender 3414 may be provided with an enclosed screw-style transfer and blender driven by a variable-speed driver. Alternative mixing devices can be integrated into the automated ground meat production system, as herein described. For example, grinders 3406 and 3422 may be used to blend the combined first and second streams of meat.

Measuring devices 3408, 3420, 3438, 3440, 3446, 3448, 3478, and 3460 may be used to measure the fat, water, and/or lean content of meat streams transferred therethrough. However, when GMS measuring devices are installed in close proximity to each other, the operation of each device, when taking a measurement reading, should be staggered so that only a single device is actively measuring at any one time. The GMS devices utilize microwave (radio frequency) and interference can occur between the devices when operated at the same time. Staggering the operation of the devices may avoid interference. The GMS devices are capable of actively measuring at a rate of approximately 1-2 times per second. For example, device 3408 may be activated to read a first measurement followed in sequence by device 3438, then 3440, 3420, 3448, 3446, 3478, and 2460. Following the completion of such a sequence of measurements, the sequence can be repeated for any number of cycles. However, it should be appreciated that the order of measurements may be altered in any manner. In one embodiment, every measurement reading from one device is added and divided by the number of readings taken from the device to arrive at an average reading. Other embodiments may obtain the median reading of all the measurement readings. Both the average and median readings are representative readings from a sampling of the readings taken from one measuring device. It is also possible to have more than one measuring device at one stream, i.e., pairs of measuring devices or redundant measuring devices. The readings from one or from all measuring devices on one stream can be used to obtain an average measurement or a median measurement. The representative reading obtained from a plurality of readings is used in computations to control the apparatus, as further described below. Additionally, it should be noted that the measurements are taken while each stream of meat is in motion. The average quantity of meat measured can vary according to the mass flow of each stream. Therefore, it is preferable to vary the sequence of measurements for every cycle and, preferably, a random order can be performed from a virtually infinite combination of sequences.

During each sequence or series of measurements, the data from each measuring device is recorded in isolation from other device measurements. In this way, a progressive history of measurements can be recorded in a computer. The computer can include a database structure stored in memory. The memory can comprise a RAM component and also a storage hard drive component. In this way, any number of selected measurements from any particular measuring device can be accumulated and a representative measurement is calculated for each measuring device. The representative measurement can be an average or median, or any other measure derived from a sampling of readings that is representative. In one embodiment, for example, the sum of three consecutive measurements from any one measuring device can be selected and averaged to yield the average of the three consecutive measurements. In other embodiments, the measurements of pairs of measuring devices are added and divided by the number of measurements taken from both instruments. The representative measurement, from the subject measuring device or devices, having measured one particular stream of meat, can then be used in the computations for the adjustment of the pump associated with the stream with improved accuracy.

Similarly, selected consecutive measurements from any and all measuring devices can be stored, and processed to provide representative measurements that can then be used to adjust the flow of the associated stream with pumps. Furthermore, the sum of any number of consecutive measurements can be averaged, over time, to provide such measurements for mass flow control of each stream. Alternating measurements from two or more measuring devices according to any pattern, random or otherwise, can be accumulated, and averaged to achieve an improved performance of the automated apparatus for ground meat production. Any trends that may be caused by measuring device malfunction or meat variations can be identified and adjusted as needed without the intervention of an apparatus operator, according to the invention. Examples of recorded measurement data manipulation, for the purpose of improving ground meat production efficiency, can involve programming of the computer to perform numerous simultaneous calculations so as to optimize use of the recorded measurement data that, for example, can include the continuous calibration or adjustment of the measuring devices.

In practice, accumulating data from several consecutive measurements, followed by an averaging of the accumulated measurements is a preferred method to achieve an improved homogenized blend of ground meat. The data can also be used to check and then calibrate or adjust the paired devices, determine when a device has drifted, select an alternate device, and control the mass flow of the pumps based on the correctly functioning device. In FIG. 40, a preferred embodiment shows a total of eight measuring devices integrated into a production apparatus wherein two input streams of ground meat are transferred to a mixer and combined into a single output stream. For the purposes of facilitating an explanation of the operation of the apparatus, each measuring device can be assigned a letter. Each input and output stream will also have a flow rate associated with it. The input streams, are combined to produce the output stream that is discharged from the mixer 3414. In the first stream, a measuring device is located in conduit 3472. Conduit 3472 is connected directly to the pre-blender 3412 with the measuring device D located therein. Thereafter, the first stream is transferred through conduit 3470 with consecutively positioned measuring devices A and a. The first stream terminates when it is combined with the second stream in the mixer 3414. The second stream is transferred via conduit 3474, through measuring device E, into preblender 3416 and then through conduit 3471 with measuring devices B and b located therein. After transferring input streams 3400 and 3428 to mixer 3414, the combined Output stream is measured again by devices C and c. By conservation of mass, the mass of input streams will equal the mass of the output stream, allowing for time for the input streams to arrive at the output stream. Assuming all measuring devices are operating accurately and reading the mass fraction of one component, the measurements of one component passing through devices A and B should be equal to C, allowing for sufficient time for the mass leaving devices A and B to arrive at location C. Therefore, this simple mass balance calculation can be used to check the accuracy and drift of the measuring devices. Assuming that measuring devices measure a mass fraction of a component, the need to obtain the mass flow rates arises. Flow rates can be measured by instrument or assumed from the pump speed. In some embodiments, pumps may pump a certain volumetric flow rate for every rotation of the pump impeller taking into account only slippage. This correlation can, many times be provided by the pump vendor, or can be determined through simple experimentation. The speed, as measured by revolutions per minute, or any other factor that is directly controllable can be correlated to a volumetric or mass flow rate by including density, passing through the pump. Additionally, the accuracy of a measurement recorded by device A can be checked after allowing time for transfer of the measured stream section to device C by subtracting the value of a measurement made by device B. Equations can be solved for every device A, a, B, b, C, c, D, and E. Patterns and trends can be recognized when measurements are noticed to be drifting when all other measurements are remaining steady, or nearly so. A sequence of measurements followed by a series of calculations can be performed by a computer processor to check the accuracy of each measuring device by solving mass balance equations using the measurement readings and the flow rates for every one of the input streams and the output stream except for the quantity that is being solved. The solution to a mass balance equation is the predicted value of what the measurement reading from the measuring device should be. If the absolute value of the difference between the predicted measurement and the actual or representative measurement from the measuring device is greater than a predetermined limit, the measuring device can be determined to be inaccurate. This is, of course, after verifying that all other measuring devices are reading within acceptable limits. If there is more than one measuring device on any one stream, the measuring device that has drifted can be calibrated by assigning the value of the accurate measuring device to the inaccurate measuring device. In this manner, the measuring device that has drifted, or become inaccurate, can be recalibrated. In other embodiments, the measuring device determined to have drifted will be put out of service, and its redundant pair, or alternate, will be used in controlling the pump. In other embodiments, the measuring device with the least amount of error will be the one selected from which to control the pump. It will also be appreciated that it is not necessary to incorporate the number of devices as are shown to achieve the accuracy needed during normal operation of the apparatus. However if each pair of devices is reduced to a single measuring device, the malfunction of any single device would most probably require the apparatus to be shut down to enable replacement of the malfunctioning device. Such a shutdown and device replacement can be delayed to a convenient time when redundant devices or pairs are installed in adjacent locations.

Referring again to the devices shown as A, a, B, b, C, and c, other calculations can be programmed into the computer processor. For example, in addition to the calculation of $A+B=C$, the following equations can be used to check accuracy and performance of any individual device, wherein any letter represents a mass quantity, calculated by multiplying mass fraction with mass flow or by any other determination.

$$C-A=B$$

$$C-B=A$$

$$a+b=c$$

$$[(A+a)+(B+b)]/2=C$$

$$C-(A+a)/2=(B+b)/2$$

$$A=a$$

$$B=b$$

$$C=c$$

$$(C+c)/2=A+B$$

$$a_1=c_1-b_1;\ b_1=c_1-a_1;\ c_1=a_1+b_1$$

$a_2=c_2-b_2; \quad b_2=c_2-a_2; \quad c_2=a_2+b_2$ $a_3=c_3-b_3; \quad b_3=c_3-a_3; \quad c_3=a_3+b_3$ In the event that any particular device is found to malfunction, it can be recalibrated, meaning that, if a measuring device is determined to be reading inaccurately, the signal by the malfunctioning device, is set to equal the measurement of the properly functioning device. Alternatively, the malfunctioning device can be excluded from subsequent calculations until it can be replaced or repaired, and the functioning device can be selected to take its place.

Any of the vessels disclosed herein for treatment requiring the addition of carbon dioxide can be arranged in any suitable disposition, horizontal, vertical, or inclined to enable, in particular, the efficient separation of any agent, but most notably liquid or very dense carbon dioxide, and which may include a measured/determined quantity of added water, and meat. For example, it may be more suitable to treat the meat in a horizontally disposed vessel with paddles therein, and then extract the treated meat from the horizontal vessel, after any suitable treatment with any selected agent, with a vertically or inclined screw, such that the meat has gaps between the pieces allowing the agent, such as liquid carbon dioxide, to remain in the lower portion of the vessel. In this way, the liquid or dense gas carbon dioxide can be substantially removed from the meat prior to any compression of the meat.

It is believed that the composition of bacteria cell walls (at least with respect to the cell walls of the pathogens *E. coli* 0157-H7, *salmonella*, and *listeria monocytogenes*) is a complex arrangement of lipids (fats). Given that liquid carbon dioxide, such as supercritical carbon dioxide, is a powerful solvent and will dissolve fats very aggressively, it may be that the carbon dioxide dissolves the bacteria cell walls thereby, selectively, killing these pathogens and dissolving fat, such as in the meat, at the same time. The dissolution of lipids in cell walls can occur very rapidly, and can enable the size of the treatment vessel to be greatly reduced when compared to a vessel relying only upon lowering of the pH of the carbonic acid to kill the bacteria.

According to one embodiment of the invention, the goods, such as meat, can be treated in a first chamber with liquid carbon dioxide at a temperature above the freezing point of water, such as in the range of about 34 to about 40° F., and at a pressure of about 500 psig to about 750 psig, or greater. Liquid carbon dioxide can liquefy fat which can be extracted therewith. The goods, such as meat, are treated in a second chamber wherein a measured amount of water is added with additional carbon dioxide to produce carbon acid having a pH of about 2 to about 3. Thereafter, the meat can be further processed, such as by grinding. Grinding meat greatly increases the amount of surface area, and therefore it is more effective to treat the meat prior to any substantial increase in the surface area.

The water added to the meat must not exceed an amount equal to the lost water plus less than 0.5% to avoid labeling retail packaged meat with the amount of added water (to the nearest whole number), or alternatively if the amount of added water exceeds the lost water (which has been lost due to evaporation and/or sublimation of frozen, natural water/ice content of the meat) by an amount greater than 0.5%, and less than 1%, a retail package containing the meat must be labeled with the words "1% added water" and so on.

Figure 41:
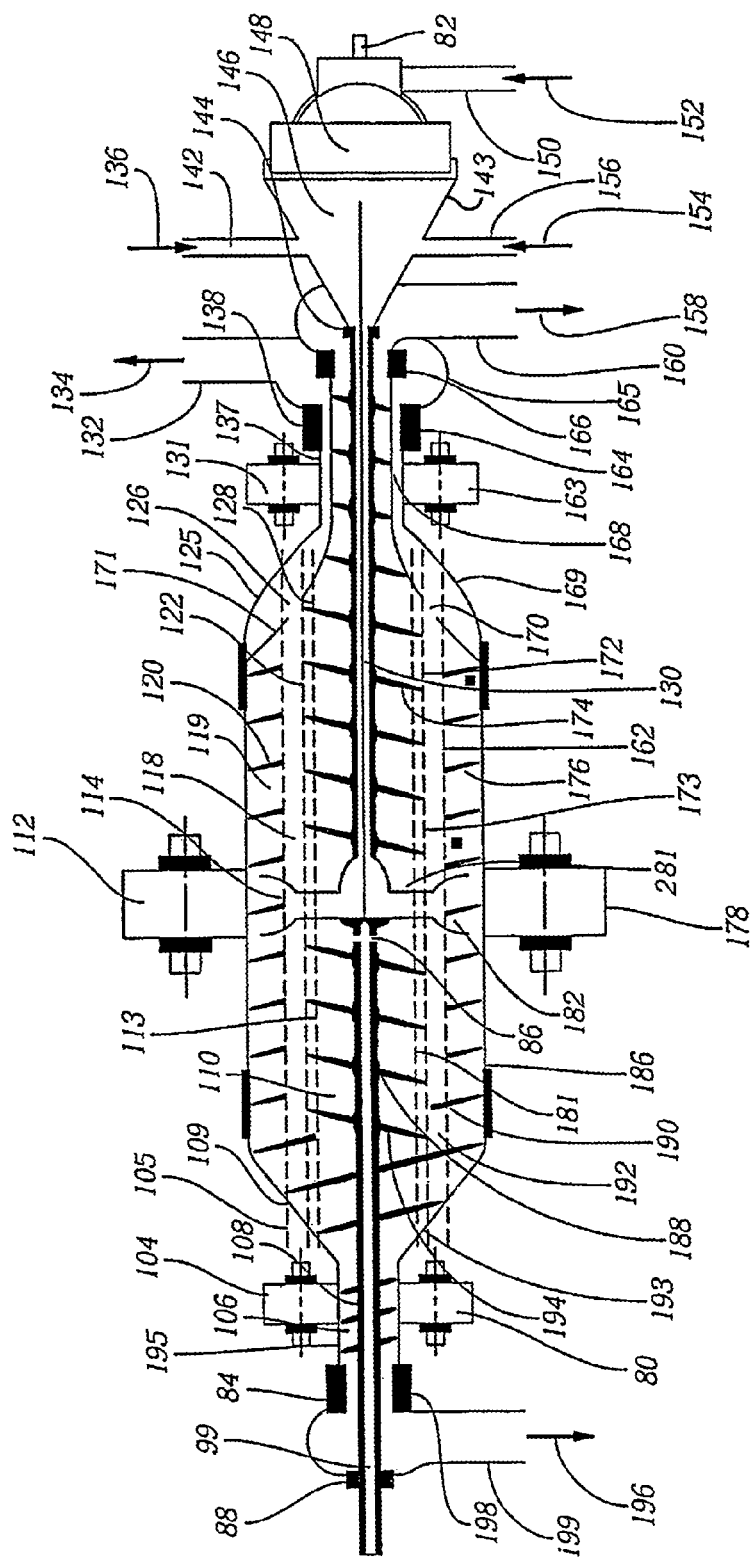
FIG. 41 shows a schematic illustration of an apparatus according to the present invention.

Referring now to FIG. 41 a diagrammatic representation of a cross section through an apparatus is shown wherein processing and grinding meat in meat grinder 148 followed by blending the stream of ground meat in space 146 of pressurized vessel 143 with any suitable fluid such as carbon dioxide. The suitable fluid, such as carbon dioxide, is transferred in directions such as are shown by arrows 136 and 154 into space 146 via any suitable number of conduits such as 142 and 156. The streams of carbon dioxide are transferred into space 146 via said conduits at a selected and suitable pressure and mass flow rate under controlled positive displacement by any suitable positive displacement pump or plurality of pumps. The combined, blended stream of ground meat and fluid carbon dioxide is then transferred along conduit 130 at a controlled pressure and rate of mass flow into the enclosed space defined by the conduit 186. Said defined space 186 comprises a space enclosed by a conduit manufactured from any suitable material such as stainless steel having a round cross section with enclosed ends defined by at least one cone shaped section which in turn is connected directly to a smaller diameter section of conduit such as 195. At ends of the conduit 186 conduits are connected directly thereto which in turn are connected to further series of conduits through which ground meat and carbon dioxide are transferred after processing and separating within the space defined by conduit 186. The single stream of ground meat mixed with a controlled and adjustable proportion of liquid carbon dioxide, after transfer along conduit 130 into the space defined by conduit 186, is separated into two, three or more separate layers. Most preferably the carbon dioxide fluid will be controlled to any suitable pressure and most preferably at about 480 psig such that the specific density of said carbon dioxide is less than the specific density of the lean meat portion and greater than the specific density of the fat portion of the ground meat blended therewith. The conduit 186 is rotated by any suitable variable speed motor such as an electric or hydraulic motor which is attached thereto in such a manner that enables the rotating of conduit 186 at a controlled speed (revolutions per minute) such as at 500 rpm, 1000 rpm, 300 rpm or more or less but most preferably at such a speed (rpm) that will cause an artificial gravitation to be applied to the fluid and ground meat transferred into conduit 186. It can therefore be seen that the apparatus shown in FIG. 41 is arranged to allow the input of boneless meat and carbon dioxide, such as boneless beef transferred via conduit 150 in the direction shown by arrow 152 and fluid carbon dioxide via conduits 142 and 156 in directions shown by arrows 136 and 154 at proportionally controlled combined rate of mass flow and pressure. Suitable variable speed positive displacement pumps are connected directly to all input and output conduits connected to space 110 in such a way that a selected pressure can be maintained within space 110. Pumps transferring ground meat and carbon dioxide goods into space 110 via conduit 130 are controlled to provide a selected input combined mass flow while extraction positive displacement pumps are connected to output conduits so as to enable the extraction of processed goods via conduits such as 132 in the direction shown by arrow 134, conduit 160 in the direction shown by arrow 158 and through space 106 and then in the direction shown by arrow 196. The controlled pressure in space 110 is arranged such that the specific density of the fluid carbon dioxide is maintained at a selected value such as 57 lbs per cubic foot or more or less. The goods transferred into space 110 are also maintained at a selected temperature which can be adjusted by several means including adjusting the pressure within space 110. Said beef transferred into space 110 can be maintained at a pressure of about 500 psig. Conduit 186 is of round cross section and having a space also of round internal profile such that when the conduit 186 is rotated at a selected speed any fluid goods transferred into space 110 will stratify with the most dense materials closest to the internal surface of conduit 186 and the least dense materials closest to the center of conduit 186.

After separation, a first stream of fat can be extracted via conduit 160 in the direction shown by arrow 158, and a second stream of lean beef can be extracted via a conduit in the direction shown by arrow 196. The apparatus shown in FIG. 41 comprises a conduit 186 most preferably manufactured from stainless steel, carbon steel or any other suitable rigid material capable of withstanding the pressure required. The diameter of conduit 186 may be in the order of 30 inches and is rigidly attached at each end to conical profiled members each tapering and connecting to conduits having a smaller diameter than conduit 186 and parallel thereto. Cone 109 has an internal face 193 and cone 169 has an internal face 171 and such internal faces are commonly known as "beach" laces such that when an Archimedes screw shown as 190 is rotated relative to beach face 193, the lean meat which by centrifugal force has accumulated against the internal face of conduit 186 is transferred along the conduit internal faces and toward the conduit enclosed space 106 by the rotating action of the screw. The dotted lines 113 and 181 define a central annular, space 110 which can be filled with pressurized carbon dioxide gas having been transferred therein via conduit 108 at a suitable pressure such as about 480 psig or less or more, and such that when lean meat is transferred across the internal beach lace of cone 109, the dense fluid (liquid) carbon dioxide which occupies the annular space defined by dotted lines 173 and 162 is not carried with the lean meat and is displaced by gaseous carbon dioxide and in such a way that the lean meat (beef) transferred into and through conduit 195 along space 106 does not carry excessive quantities of carbon dioxide therewith.

The annular space defined by and between dotted line 162 and the internal face of conduit 186 shows a fraction of the internal space of conduit 186 where the most dense material, i.e., lean meat such as lean beef will accumulate; the dotted lines 162 and 172 define the outer extremities of an annular space wherein fluid and/or liquid carbon dioxide will accumulate and the annular space defined between dotted lines 172 and 181 comprises the annular space in which the least dense ground meat fat component will accumulate after centrifuging therein.

The assembly shown in FIG. 41, comprising conduit 186, cone 109, conduit 195, and cone 169 with conduit 137, are rigidly connected to provide the outer sealed and gas tight vessel 186 and which is located and held captive by drive wheels 104, 80, 112, 178, 131, and 163 which can provide a means to drive the centrifuge vessel 186 at any suitable selected speed and as required. The main centrifuge conduit 186 can in this way be driven by drive wheels 112 and 178 such that conduit 186 rotates at a selected speed such as 500 rpm or more or less and in such a way that a centrifugal force which can be measured in units of G-force wherein 1G is the equivalent of the gravitational force of the earth. Drive wheels 112 and 178 may have the capacity to rotate centrifuge conduit 186 at such speed that a separating force equal to as much as 3000G can be applied to goods transferred into space 110 and as defined by the internal surface of conduit 186. In this instance the centrifuge assembly as shown in FIG. 41 is arranged such that the internal space can be pressurized up to any suitable pressure but most preferably in this instance, in the order of approximately 480 psi or less or more. Inlet conduits and extraction ports are all connected to positive displacement pumps or suitable valves arranged such that a controlled quantity of goods can be transferred into space such as 118 and extracted there from under controlled inlet and outlet pressures corresponding to an input mass flow and an output mass flow. The total quantity of goods transferred therein are maintained at a controlled and adjustable pressure of between 300 psig and 1100 psig but most preferably at about 480 psig (and temperature of about 38° F.) and at a rate of, for example 250 gallons per minute (gpm), and therefore a similar quantity will therefore be extracted. A grinder 148 driven via a drive 82 connected to a variable speed motor that may be hydraulic or servo electric of suitable horse power such as 100 hp is arranged such that boneless beef transferred there through via conduit 150 is ejected into space 146. Space 146 is enclosed by a suitable profiled pressure vessel 143 to which conduits 156 and 142 are rigidly connected to enable the transfer of pressure and temperature controlled liquid carbon dioxide in the direction shown by arrows 136 and 154 into space 146 and in such a way that the liquid carbon dioxide and ground meat will mix thoroughly in part due to an aggressive turbulence created by the streams of ground meat and liquid CO2 combining at a confluence in space 146 and in such volume that a substantially thoroughly blended mix is transferred along conduit 130 through space 174. A hearing 144 is provided to allow conduit 130 to rotate freely as required while maintaining a suitable gas tight pressure seal so as to ensure that goods and/or fluid or liquid CO2 does not escape. Other such bearings arranged so as to be sealed, thereby preventing escape of CO2 gas or fluid are provided at 166, 164, and 138, 198 and 84, and at any other places where required. A series of paddles in the form of an Archimedes screw are arranged in an assembly contained within conduit 186 such that after the centrifugal processing of ground meat into separate stratified concentric, annular layers, the fat component can be extracted via conduit 160 and the lean component extracted via conduit 199. A shaft comprising section 108 and 130 are attached to provide a fabrication wherein an Archimedes screw comprising at least one continuous spiral member such as shown as 194, 188, 128, and arranged such that goods stratifying at annular space 122 forming an annular ring around the center of the Archimedes screw are transferred from space 110 and ultimately through conduit 160 in the direction shown by arrow 158. The Archimedes screw assembly is arranged with a first internal screw and a second external screw. Said first internal screw comprising a continuous stainless steel spiral including 194 and 128 which can be rigidly attached relative to external Archimedes screw member shown at 190 and 120, however an annular space indicated by 125 and 192 (and located between the innermost boundary of the lean outer section at dotted line 105 and dotted line 173 which marks the outermost boundary of the annular space 122 in which fat can accumulate) comprises predominantly liquid carbon dioxide other than lean or fat particles that are in transit during the ground beef separation process. The Archimedes screw fabrication can also be provided with a hollow central conduit wherein a first conduit section 174 allows the input of ground meat blended with carbon dioxide there through and into the internal space of conduit 186 via ports 114 and 182, immediately following transfer into space in conduit 186, ground meat is carried by the rotating motion of conduit 186 thereby generating a centrifugal gravitational force that results in the stratification in concentric annular spaces such as shown at 122, where the least dense material, comprising fat, will tend to accumulate; concentric annular space 193 in which liquid carbon dioxide will tend to accumulate; and space at 118 in which the most dense, lean, component of the ground meat, will accumulate. Another centrally disposed annular space 110 can be filled with gaseous carbon dioxide, transferred therein, at conduit 99 and through aperture such as 86 at controlled pressure and corresponding density. In this way the Archimedes screw fabrication is driven by a suitable means attached via shaft 108 at end 88 such that the rotation of the two concentric Archimedes screws shown as 188 for the inner screw for fat transfer into conduit 160 and 120 for outer screw for lean transfer into conduit 199, are arranged to correspond with the rotating of centrifuge conduit 186. In the first disclosed embodiment both screws are fixed rigidly together and therefore must rotate in the same direction while also facilitating the transfer of the fat and lean opposite directions. This is enabled by the direction of each screw in that if a first concentric Archimedes screw has a left handed spiral, then the other concentric Archimedes screw must be a right handed screw. However, it should be noted that two independent screws, independently driven and having the same hand and direction of spiral must both be driven by independent driving means in opposite rotating directions to enable transfer of fat in a first direction and lean in the opposite direction; such a configuration can be provided.

More particularly, a planetary gear arrangement can be provided so as to connect the outer conduit 186 via an end section and shaft 108, through a planetary gear arrangement having a suitable ratio such that the Archimedes screw assembly will rotate relative to 186 at a speed sufficient to transfer all stratified goods from within the centrifuge at a suitable rate approximately equal to the rate of mass flow of goods transferred into said conduit 186. Ground meat and liquid carbon dioxide transferred into spaces such as 118 and 110 will stratify in such a manner that the lean component of the ground meat being of greater density than the fat component, will stratify within space defined by the outer annular ring defined by dotted lines 105 and 162 and against the inner surface of conduit 186 such as into space 176 and generally between the inner surface of 186 and a line shown by dotted lines 162 and 105. Fat component will stratify generally within dotted lines shown on either side of space 122 and 172. Liquid CO2 will accumulate in the space 118 defined by dotted lines 105 and 113 and in space 172 flanked by dotted lines 173 and 181. As the Archimedes screw assembly rotates, lean meat is carried by the Archimedes screw comprising at least one continuous spiral strip of steel such as shown by 190 and 120 thereby transferring the lean beef along the internal surface of cone 109 toward a centrally disposed conduit 106 across face 193 and into conduit space 106 and there from through conduit 199 in the direction shown by arrow 196. A positive displacement pump is connected directly to conduit 199 and transfers goods there through at a controlled rate proportional to the ground meat being transferred into the space in conduit 186. Ports 126 and 170 in conduits 169 and 125 allow surplus liquid CO2 to be transferred through space 168 into annular manifold 165 and through conduit 132 in the direction shown by arrow 134. Conduit 132 is connected directly to a pressure and mass flow controlling, second positive displacement pump. A third pressure and mass flow controlling, positive displacement pump is connected directly to conduit 160 such that fat can be extracted there through in the direction shown by arrow 158. It can therefore be seen that first, second and third positive displacement pumps (not shown) respectively connected directly to conduits 199, 132 and 160, are controlled via a central computerized controlling system in such a manner that goods transferred by means of controlled variable speed positive displacement pumping in the direction shown by arrow 152 and through grinder 148, plus liquid carbon dioxide transferred through conduits 156 and 142 which is also transferred there through by positive displacement pumping means are substantially of equal mass and balanced such that the mass of goods pumped into space within conduit 186 are equal to the mass of goods pumped from the space within conduit 186. Additionally, conduit 108 provides a means of injecting gaseous phase carbon dioxide into space such as 110 via apertures such as 204. In this way, the quantity of liquid CO2 that is transferred from the vessel 186 with goods can be minimized. Gaseous phase carbon dioxide or any other suitable gas such as nitrogen and/or a blend of carbon dioxide and carbon monoxide, wherein the carbon monoxide content is not more than 0.4% by volume (or weight) is transferred into space 110 at a controlled mass flow and maintained at a suitable volume in space 110. In summary it can be seen that fat accumulating at layer 122 and 172 can be transferred from the apparatus via conduit 160 by rotating the Archimedes screw assembly and simultaneously lean meat accumulating in spaces at 176 and 119 is transferred through conduit 195 into space 106 and via conduit 199 in the direction shown by arrow 196, and liquid carbon dioxide is extracted via conduit 132 in the direction shown by arrow 134. The combined mass flow of goods extracted through conduits 199, 132, and 160 is measured by positive displacement and controlled in direct proportion to the goods transferred through grinder 148 and space 146, blended with liquid carbon dioxide and pumped into the space within the separating system including space 192 and or 110, for example. Liquid carbon dioxide extracted via conduit 132 can be recycled after sanitizing, filtering and adjusting so as to meet specified pressure and temperature settings as required, and into conduits 142 or 156 by positive displacement pumping from and into the spaces within the centrifuge body 186. The temperature of liquid CO2 is generally required to be maintained in the order of about 38° F. or less or more.

In yet another preferred embodiment a pair of (two) separators, similar to the apparatus shown in FIG. 41, can be arranged such that meat processed in a first separator can be transferred under selected pressure, directly into pre-blender 3412 via a sealed, gas tight first conduit and a second stream of processed meat can be transferred under pressure from either the first separator or a second separator directly into pre-blender 3416. In this way, two streams of processed meat can be further measured, combined and/or treated according to the disclosure associated with FIG. 40 while the processing takes place under any selected pressure (and controlled temperature). Either or both of the streams transferred into pre-blenders 3412 and/or 3416 from a single or two independent separators (as shown in FIG. 41) can be transferred directly from a first separator such as from extraction conduit shown with arrow 196 therein or for example conduit 160 in the direction shown by arrow 154, directly to any suitable pre-blender such as 3412 and 3416 shown in FIG. 40. Positive displacement pumps provided so as to control mass flow of material streams transferred via any of the conduits connected to equipment disclosed in association with FIGS. 40 and/or 41 can be provided to control input and output pressures as required.

Centrifuges and most particularly "decanting" style centrifuge equipment such as equipment, manufactured by B & P Process Equipment, which can be seen at website http://www.bpprocess.com/ or as manufactured by Centrisys Corporation, 9586 58th Place Kenosha, Wis. 53144, which can be seen at website http://www.centrifuge-systems.com/ do not provide for pressurized, temperature controlled and enclosed processing capability for the "3 phase" separation of two solids and one liquid. The equipment disclosed herein does provide for the separation of two solids (i.e., fat and lean beef) and one liquid (liquid CO2) and wherein the liquid (CO2) is a gas at ambient atmospheric conditions. In this way the liquid CO2 can be used as an agent facilitating the separation of the two solids (fat and lean beef) and after use of the liquid for this purpose, the liquid evaporates leaving no residue with the solids.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for separating lean meat from lean meat-containing material, comprising:
   providing lean meat-containing material having lean meat and fat;
   before reducing the lean meat-containing material into particles, chilling the lean meat-containing material while avoiding freezing the surface of the lean meat;
   while the surface of the lean meat is non-frozen, reducing the lean meat-containing material into particles, wherein the particles include particles that have a majority of lean meat and particles that have a majority of fat;
   combining the particles with a fluid, wherein the fluid includes water and carbon dioxide;
   introducing the particles and the fluid into a centrifuge;
   in the centrifuge, separating a first stream comprising the particles that have a majority of lean meat, a second stream comprising the particles that have a majority of fat, and a third stream comprising the fluid;
   sanitizing the fluid and recycling the sanitized fluid; and
   treating the first stream comprising the particles that have a majority of lean meat to reduce pathogens via a method that does not result in raising the temperature above 109° F.

2. The method of claim 1, wherein the density of the fluid is adjusted by the addition of water.

3. The method of claim 1, wherein the density of the fluid is increased by the addition of water and sodium chloride.

4. The method of claim 1, further comprising adjusting the temperature of the lean meat to not below about 26° F. to prevent substantial freezing prior to reducing the lean meat-containing material into particles.

5. The method of claim 1, further comprising introducing one of sodium chloride, sodium chlorite, carbon monoxide, sodium citrate, or a combination thereof.

6. The method of claim 1, wherein during combining the particles with the fluid, the fluid has a pH less than 7.

7. The method of claim 1, further comprising treating the first stream comprising the particles that have a majority of lean meat via x-ray, gamma, or e-beam radiation.

8. The method of claim 1, wherein the second stream comprising the particles that have a majority of fat are pasteurized at a temperature in a range of about 140° to about 160° F.

9. The method of claim 1, further comprising rendering the particles that have a majority of fat.

10. A method for separating lean meat from lean meat-containing material, comprising:
    providing lean meat-containing material having lean meat and fat;
    before reducing the lean meat-containing material into particles, chilling the lean meat-containing material while avoiding freezing the surface of the lean meat;
    while the surface of the lean meat is non-frozen, reducing the lean meat-containing material into particles, wherein the particles include particles that have a majority of lean meat and particles that have a majority of fat;
    combining the particles with a first fluid, wherein the first fluid includes water and carbon dioxide;
    introducing the particles and the first fluid into a centrifuge;
    in the centrifuge, separating a first stream comprising the particles that have a majority of lean meat, a second stream comprising the particles that have a majority of fat, and a third stream comprising the first fluid;
    sanitizing the first fluid and recycling the sanitized first fluid; and
    treating with a second carbon dioxide fluid, the first stream comprising the particles that have a majority of lean meat to reduce pathogens via a method that does not result in raising the temperature above 109° F.

11. The method of claim 1, further comprising pasteurizing the second stream comprising the particles that have a majority of fat by elevating the temperature.

* * * * *

UNITED STATES PATENT AND TRADEMARK OFFICE
CERTIFICATE OF CORRECTION

PATENT NO. : 9,131,707 B2  
APPLICATION NO. : 12/968045  
DATED : September 15, 2015  
INVENTOR(S) : A. J. Garwood Page 1 of 1

It is certified that error appears in the above-identified patent and that said Letters Patent is hereby corrected as shown below:

On The Title Page,

Item (60) Related U.S. Application Data, Column 1, Line 4, "60/469,644," should read --60/429,644,--

Signed and Sealed this
Twenty-fourth Day of May, 2016

Michelle K. Lee
*Director of the United States Patent and Trademark Office*